(12) United States Patent
Umetsu et al.

(10) Patent No.: US 10,403,447 B2
(45) Date of Patent: Sep. 3, 2019

(54) NONAQUEOUS LITHIUM STORAGE ELEMENT

(71) Applicant: Asahi Kasei Kabushiki Kaisha, Tokyo (JP)

(72) Inventors: Kazuteru Umetsu, Tokyo (JP); Takeshi Kamijo, Tokyo (JP); Yuichiro Hirakawa, Tokyo (JP); Keita Kusuzaka, Tokyo (JP); Nobuhiro Okada, Tokyo (JP); Taku Suetomi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/070,327

(22) PCT Filed: Jan. 20, 2017

(86) PCT No.: PCT/JP2017/002005
§ 371 (c)(1),
(2) Date: Jul. 16, 2018

(87) PCT Pub. No.: WO2017/126686
PCT Pub. Date: Jul. 27, 2017

(65) Prior Publication Data
US 2019/0027319 A1    Jan. 24, 2019

(30) Foreign Application Priority Data

Jan. 22, 2016  (JP) ................................ 2016-010895
Aug. 8, 2016   (JP) ................................ 2016-155461
(Continued)

(51) Int. Cl.
*H01M 10/0525*    (2010.01)
*H01M 10/0567*    (2010.01)
(Continued)

(52) U.S. Cl.
CPC ............. *H01G 11/06* (2013.01); *H01G 11/24* (2013.01); *H01G 11/28* (2013.01); *H01G 11/50* (2013.01);
(Continued)

(58) Field of Classification Search
CPC ........... H01M 4/1393; H01M 10/0525; H01M 10/0567; H01M 10/0585
See application file for complete search history.

(56) References Cited

U.S. PATENT DOCUMENTS 5,427,875 A     6/1995  Yamamoto et al.
5,702,843 A  * 12/1997  Mitate .................. H01M 4/136
                                                                429/221
(Continued)

FOREIGN PATENT DOCUMENTS

EP    2219247 A1    8/2010
EP    2485303 A1    8/2012
(Continued)

OTHER PUBLICATIONS

Barrett et al., "The Determination of Pore Volume and Area Distributions in Porous Substances: Computations from Nitrogen Isotherms," The Journal of the American Chemical Society, 73: 373-380 (1951).
(Continued)

*Primary Examiner* — Carlos Barcena
(74) *Attorney, Agent, or Firm* — Morgan, Lewis & Bockius LLP

(57) ABSTRACT

The disclosure relates to a lithium storage element containing a positive electrode that contains a lithium compound other than an active material, a negative electrode, a separator, and a nonaqueous electrolytic solution containing lithium ions, for which an active material is applied on both surfaces of a nonporous positive electrode power collector,
(Continued)

and a negative electrode active material capable of storing and releasing lithium ions is applied on both surfaces of a nonporous negative electrode power collector.

31 Claims, 3 Drawing Sheets

(30) Foreign Application Priority Data

Sep. 30, 2016 (JP) ................. 2016-192439
Sep. 30, 2016 (JP) ................. 2016-192621

(51) Int. Cl.
*H01M 10/0585* (2010.01)
*H01M 4/1393* (2010.01)
*H01G 11/06* (2013.01)
*H01G 11/24* (2013.01)
*H01G 11/50* (2013.01)
*H01M 10/052* (2010.01)
*H01G 11/28* (2013.01)
*H01G 11/26* (2013.01)
*H01G 11/70* (2013.01)

(52) U.S. Cl.
CPC ....... *H01M 4/1393* (2013.01); *H01M 10/052* (2013.01); *H01M 10/0525* (2013.01); *H01M 10/0567* (2013.01); *H01M 10/0585* (2013.01); *H01G 11/26* (2013.01); *H01G 11/70* (2013.01); *Y02E 60/13* (2013.01); *Y02T 10/7022* (2013.01)

(56) References Cited

U.S. PATENT DOCUMENTS

| | | | | |
|---|---|---|---|---|
| 5,928,812 | A * | 7/1999 | Xue | H01M 4/13 429/231.95 |
| 2004/0023118 | A1 | 2/2004 | Kinoshita et al. | |
| 2004/0126659 | A1* | 7/2004 | Graetz | H01G 9/155 429/218.1 |
| 2005/0130043 | A1 | 6/2005 | Gao et al. | |
| 2005/0233218 | A1* | 10/2005 | Ogawa | H01M 4/587 429/231.8 |
| 2005/0271944 | A1 | 12/2005 | Suhara et al. | |
| 2006/0105242 | A1* | 5/2006 | Sato | H01M 4/13 429/231.95 |
| 2006/0134517 | A1 | 6/2006 | Sawa et al. | |
| 2006/0209493 | A1 | 9/2006 | Fujino et al. | |
| 2007/0281216 | A1* | 12/2007 | Petrat | H01M 4/133 429/324 |
| 2008/0055819 | A1 | 3/2008 | Taguchi et al. | |
| 2010/0255377 | A1* | 10/2010 | Tsubata | H01M 4/587 429/231.8 |
| 2011/0039160 | A1 | 2/2011 | Takahata et al. | |
| 2011/0159382 | A1* | 6/2011 | Matsui | H01M 10/0569 429/338 |
| 2012/0050950 | A1 | 3/2012 | Kim et al. | |
| 2012/0094177 | A1 | 4/2012 | Honoki et al. | |
| 2012/0212186 | A1 | 8/2012 | Fujii et al. | |
| 2013/0208404 | A1 | 8/2013 | Yasuda et al. | |
| 2015/0311002 | A1 | 10/2015 | Okada et al. | |
| 2017/0207459 | A1 | 7/2017 | Okada et al. | |
| 2017/0244098 | A1 | 8/2017 | Duong et al. | |

FOREIGN PATENT DOCUMENTS

| | | |
|---|---|---|
| JP | H04-328278 A | 11/1992 |
| JP | H08-107048 A | 4/1996 |
| JP | 2001-126718 A | 5/2001 |
| JP | 2001-167767 A | 6/2001 |
| JP | 2001-229926 A | 8/2001 |
| JP | 2003-297424 A | 10/2003 |
| JP | 2003-346801 A | 12/2003 |
| JP | 2003-346802 A | 12/2003 |
| JP | 2004-095188 A | 3/2004 |
| JP | 2004-362859 A | 12/2004 |
| JP | 2008-177263 A | 7/2008 |
| JP | 2008-181830 A | 8/2008 |
| JP | 2010-205827 A | 9/2010 |
| JP | 2010-267875 A | 11/2010 |
| JP | 2012-074467 A | 4/2012 |
| JP | 2012-174437 A | 9/2012 |
| JP | 2014-022334 A | 2/2014 |
| JP | 2014-199723 A | 10/2014 |
| JP | 2016-012620 A | 1/2016 |
| WO | 02/41420 A1 | 5/2002 |
| WO | 2012/063545 A1 | 5/2012 |
| WO | 2014/088074 A1 | 6/2014 |
| WO | 2016/006632 A1 | 1/2016 |

OTHER PUBLICATIONS

Lippens et al., "Studies on Pore Systems in Catalysts: The t Method," Journal of Catalysts, 4: 319-323 (1965).

Mikhail et al., "Investigations of a Complete Pore Structure Analysis: Analysis of Micropores," Journal of Colloid and Interface Science, 26: 45-53 (1968).

Takahashi et al., "Fabrication of a High Energy Density Hybrid Capacitor Using Li Pre-doped Si Anode" 55th battery symposium summary p. 198 (Nov. 19-21, 2014) (see English abstract).

International Search Report issued in corresponding International Patent Application No. PCT/JP2017/002005 dated Apr. 18, 2017.

International Preliminary Report on Patentability and Written Opinion issued in corresponding International Patent Application No. PCT/JP2017/002005 dated Aug. 2, 2018.

Decision to Grant issued in corresponding Japanese Patent Application No. 2017-509052 dated Nov. 28, 2017.

Supplemental European Search Report issued related European Patent Application No. 17741563.5 dated Dec. 21, 2018.

Supplemental European Search Report issued in related European Patent Application No. 17741564.3 dated Nov. 23, 2018.

\* cited by examiner

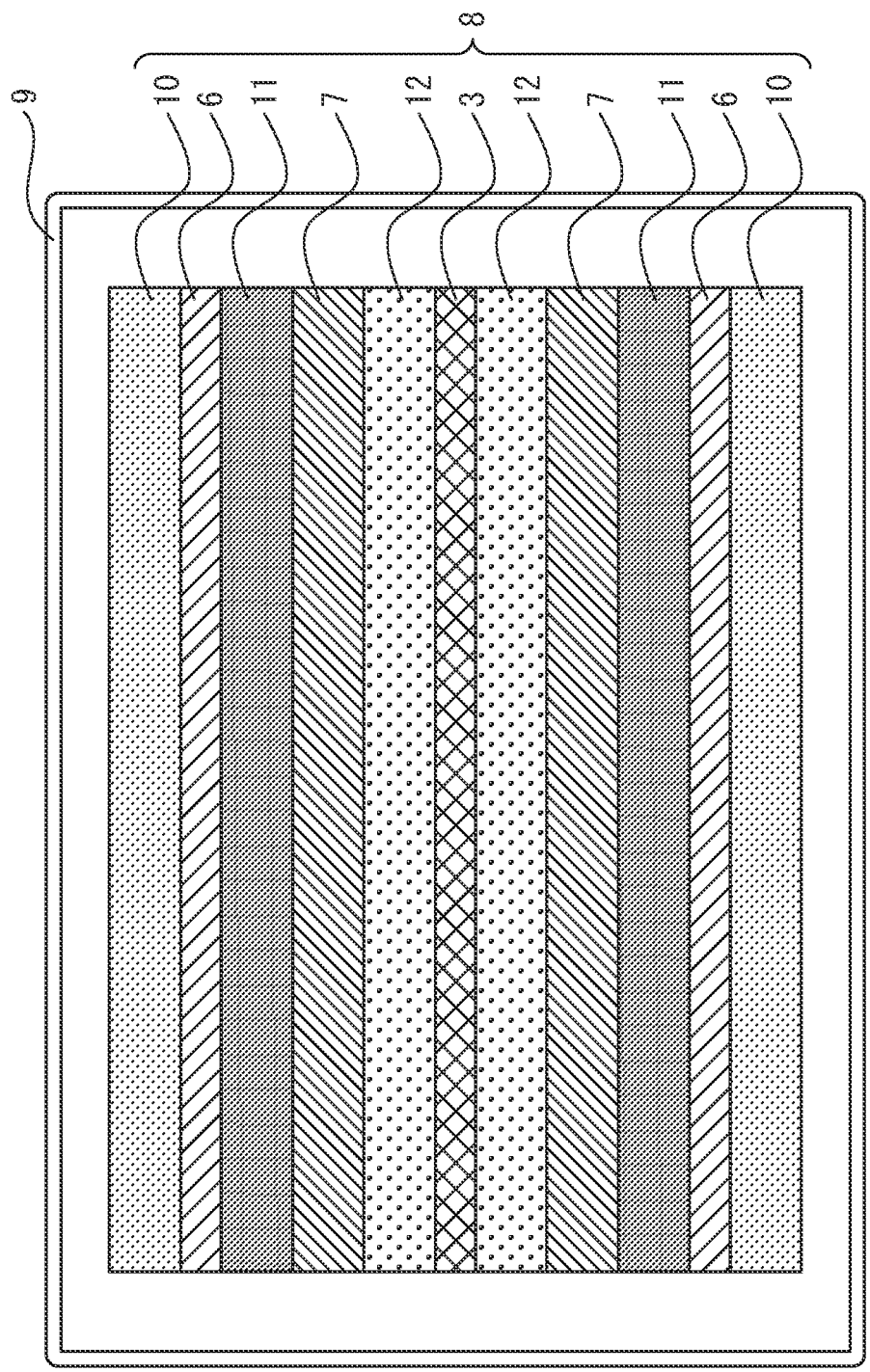

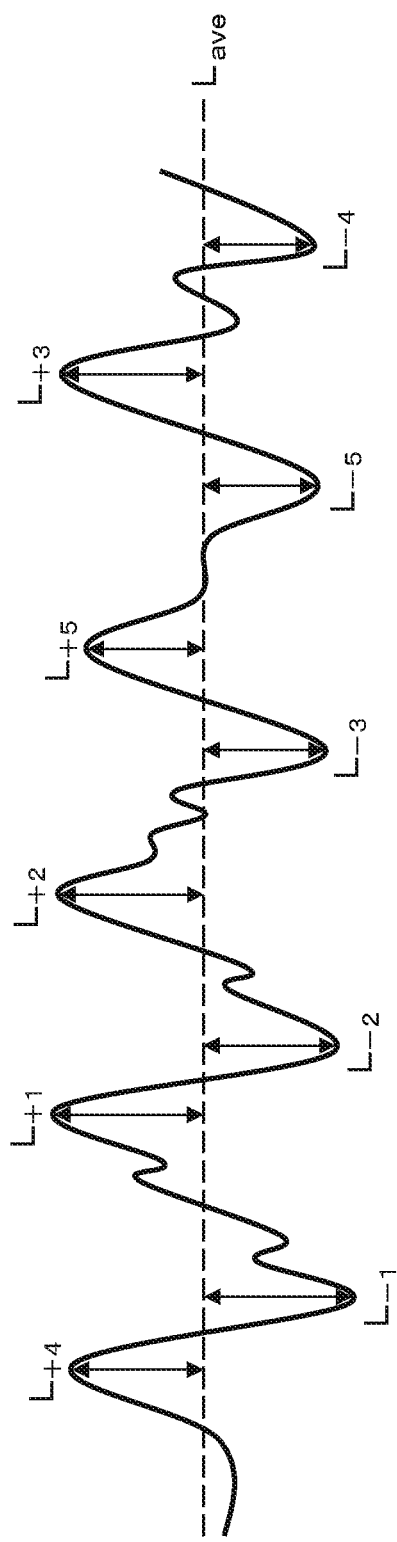

NONAQUEOUS LITHIUM STORAGE ELEMENT

FIELD

The present invention relates to a nonaqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is therefore advancing at a rapid pace, as an effective strategy for cells with high energy density that can meet this requirement.

The second requirement is a high output characteristic. For example, in a combination of a high efficiency engine and a power storage system (such as in a hybrid electric vehicle), or a combination of a fuel cell and a power storage system (such as in a fuel cell electric vehicle), the power storage system must exhibit a high output discharge characteristic during acceleration.

Electrical double layer capacitors and nickel hydrogen cells are currently under development as high output power storage devices.

Electrical double layer capacitors that employ activated carbon in the electrodes have output characteristics of about 0.5 to 1 kW/L. Such electrical double layer capacitors not only have a high output characteristic but also high durability (especially cycle characteristics and high-temperature storage characteristics) and have been considered optimal devices for fields requiring the high output mentioned above. However, their energy densities are no greater than about 1 to 5 Wh/L. A need therefore exists for even higher energy density.

On the other hand, nickel hydrogen batteries commonly employed in existing hybrid electric vehicles exhibit high output equivalent to electrical double layer capacitors, and have energy densities of about 160 Wh/L. Still, research is being actively pursued toward further increasing their energy density and output characteristic and increasing their durability (especially stability at elevated temperatures).

Research is also advancing toward increased outputs for lithium ion batteries as well. For example, lithium ion batteries are being developed that yield high output exceeding 3 kW/L at 50% depth of discharge (the percentage (%) of discharge with respect to the service capacity of a power storage element). However, the energy density is 100 Wh/L or lower, and the design is such that the high energy density, which is the major feature of a lithium ion battery, is reduced. The durability (cycle characteristic and high-temperature storage characteristic) is inferior to that of an electrical double layer capacitor. In order to provide practical durability for such a lithium ion battery, therefore, they are used with a depth of discharge in a narrower range than 0 to 100%. Because the usable capacity is even lower, research is actively being pursued toward further increasing durability.

There is a strong demand for implementation of power storage elements exhibiting high energy density, high output characteristics and high durability, as mentioned above. Nevertheless, the existing power storage elements mentioned above have their advantages and disadvantages. New power storage elements are therefore desired that can meet these technical requirements. Promising candidates are power storage elements known as lithium ion capacitors, which are being actively developed in recent years.

A lithium ion capacitor is a type of power storage element using a nonaqueous electrolytic solution comprising a lithium salt (hereunder also referred to as "nonaqueous lithium power storage element"), wherein charge/discharge is accomplished by non-Faraday reaction by adsorption and desorption of anions similar to an electrical double layer capacitor at about 3 V or higher, at the positive electrode, and Faraday reaction by intercalation and release of lithium ions similar to a lithium ion battery, at the negative electrode.

To summarize the electrode materials commonly used in power storage elements, and their characteristics: usually, when charge/–discharge is carried out using a material such as activated carbon as an electrode, by adsorption and desorption of ions on the activated carbon surface (non-Faraday reaction), it is possible to obtain high output and high durability, but with lower energy density (for example, 1×). On the other hand, when charge/discharge is carried out by Faraday reaction using an oxide or carbon material as the electrode, the energy density is higher (for example, 10 times that of non-Faraday reaction using activated carbon), but then durability and output characteristic become issues.

Electrical double layer capacitors that combine these electrode materials employ activated carbon as the positive electrode and negative electrode (energy density: one-fold) and carry out charge/discharge by non-Faraday reaction at both the positive and negative electrodes and are therefore characterized by having high output and high durability, but also low energy density (positive electrode: one-fold×negative electrode: one-fold=1).

Lithium ion secondary batteries use a lithium transition metal oxide for the positive electrode (energy density: 10-fold) and a carbon material (energy density: 10-fold) for the negative electrode), carrying out charge/discharge by Faraday reaction at both the positive and negative electrodes, and therefore have high energy density (positive electrode: 10-fold×negative electrode: 10-fold=100), but have issues in terms of output characteristic and durability. In addition, the depth of discharge must be restricted in order to satisfy the high durability required for hybrid electric vehicles, and with lithium ion secondary batteries only 10 to 50% of the energy can be utilized.

A lithium ion capacitor is a type of asymmetric capacitor that employs activated carbon (energy density: one-fold) for the positive electrode and a carbon material (energy density: 10-fold) for the negative electrode, and it is characterized by carrying out charge/discharge by non-Faraday reaction at the positive electrode and Faraday reaction at the negative electrode and having the characteristics of both an electrical double layer capacitor and a lithium ion secondary battery. Moreover, a lithium ion capacitor exhibits high output and high durability, while also having high energy density (positive electrode: one-fold×negative electrode: 10-fold=10) and requiring no restrictions on depth of discharge as with a lithium ion secondary battery.

Various researches have been conducted in regard to positive electrodes for the power storage elements mentioned above (especially lithium ion secondary batteries).

In PTL 1 there is proposed a lithium ion secondary battery using a positive electrode containing lithium carbonate in the positive electrode and having a current shielding mechanism that operates in response to increased internal pressure in the battery. In PTL 2 there is proposed a lithium ion secondary battery employing a lithium complex oxide such as lithium manganate as the positive electrode, and with reduced elution of manganese by including lithium carbonate in the positive electrode. In PTL 3 there is proposed a method of causing restoration of the capacitance of a deteriorated power storage element by oxidizing various lithium compounds as coated oxides at the positive electrode. However, the positive electrodes described in PTLs 1 to 3 still have room for improvement in terms of their application to asymmetric capacitors such as lithium ion capacitors, and absolutely no research has been conducted on their suppression of decomposition of lithium compounds in the positive electrode and suppression of gas generation and increased resistance, particularly during high-load charge/discharge cycling of nonaqueous lithium power storage elements. Moreover, the electrodes described in PTLs 1 to 3 still have room for improvement in terms of their application to nonaqueous power storage elements including electrode laminated bodies or wound electrodes that have complex multilayer structures, and in particular, absolutely no research has been conducted on suppressing all of thermal runaway during internal short circuiting of nonaqueous lithium power storage elements, increased resistance in high-load charge/discharge cycling, and gas generation in high-temperature, high-voltage environments. PTL 4 proposes a lithium ion capacitor having low deviation in thickness of the electrode layer on the front and back sides. However, suppression of thermal runaway during internal short circuiting has not been considered in any way with the electrode described in PTL 4.

On the other hand, PTL 5 proposes a power storage element employing activated carbon as the positive electrode active material, and as the negative electrode active material, a carbonaceous material obtained by intercalating lithium by a chemical process or electrochemical process in a carbon material capable of intercalating and releasing lithium in an ionized state. In PTL 5, the carbon materials mentioned are natural graphite, artificial graphite, graphitized mesophase carbon microspheres, graphitized mesophase carbon fibers, graphite whiskers, graphitized carbon fibers, thermal decomposition products of furfuryl alcohol resin or novolac resin, and thermal decomposition products of polycyclic hydrocarbon condensation polymer compounds such as pitch coke.

PTLs 6 to 10 each propose electrodes and a power storage element using activated carbon as the positive electrode active material and using as the negative electrode active material a composite porous material with a carbonaceous material covering the surface of activated carbon, where the negative electrode active material has been doped with lithium in a predetermined amount. The lithium ion capacitors using these negative electrode active materials have low internal resistance compared to lithium ion capacitors using other materials such as graphite for the negative electrode active material, and therefore high input/output characteristics are obtained.

The purposes for which lithium ion capacitors are used include power storage elements for railways, construction machines and automobiles, for example. Further improvement in energy density is being sought for such purposes, while still maintaining a high input/output characteristic and a high load charge/discharge cycle characteristic.

One method for increasing the energy density is to lower the thickness of the negative electrode active material layer to reduce the cell volume, while maintaining the same energy. With decreasing thicknesses of negative electrode active material layers, the weight of the negative electrode active material per unit area of the negative electrode decreases, and therefore the utilizable capacity per unit weight of the negative electrode active material during charge/discharge of the lithium ion capacitor increases. In other words, when the negative electrode active material layer is to be formed as a thin-film it is preferred to use a negative electrode material with a large reversible capacitance. Such negative electrode materials include alloy-type negative electrode materials such as silicon, silicon oxide and tin, that form alloys with lithium.

NPL 1 discloses a lithium ion capacitor employing activated carbon as the positive electrode active material and silicon as the negative electrode active material. However, investigation by the present inventors has demonstrated that when such lithium ion capacitors are used for charge/discharge cycling several times with a very high current (hereunder also referred to as "high-load charge/discharge cycling"), the capacitance markedly decreases, and that the tendency is more notable the smaller the film thickness of the negative electrode active material layer.

CITATION LIST

Patent Literature

[PTL 1] Japanese Unexamined Patent Publication No. 1992 (H4)-328278
[PTL 2] Japanese Unexamined Patent Publication No. 2001-167767
[PTL 3] Japanese Unexamined Patent Publication No. 2012-174437
[PTL 4] International Patent Publication No. WO2012/63545
[PTL 5] Japanese Unexamined Patent Publication No. 1996 (H8)-107048
[PTL 6] Japanese Unexamined Patent Publication No. 2001-229926
[PTL 7] International Patent Publication No. WO2002/041420
[PTL 8] Japanese Unexamined Patent Publication No. 2003-346801
[PTL 9] Japanese Unexamined Patent Publication No. 2003-346802
[PTL 10] Japanese Unexamined Patent Publication No. 2010-267875

Non-Patent Literature

[NPL 1] Takahashi, K. et al., "Creation of high-capacitance hybrid capacitor utilizing Li-pre-doped Si negative electrode", Tokyo University of Agriculture and Technology, Electric Power Research Institute, 55th Debate on Batteries, Nov. 19-21, 2014, P198.

SUMMARY

Technical Problem

In light of the circumstances described above, the problem to be solved by the present invention is that of providing a nonaqueous lithium power storage element wherein thermal runaway during internal short circuiting is suppressed, resistance increase during high-load charge/discharge cycling is suppressed, and gas generation due to decomposition of lithium compound under high-temperature environmental conditions is suppressed, the element having high energy density while exhibiting a high high-load charge/discharge cycle characteristic. The present invention has been devised on the basis of this discovery.

Solution to Problem

The aforementioned problem is solved by the following technical means.

Specifically, the present invention provides the following.

[1]

A nonaqueous lithium power storage element comprising:
at least one positive electrode that contains a lithium compound other than an active material;
at least one negative electrode;
a separator; and
a lithium ion-containing nonaqueous electrolytic solution;
wherein the active material is coated onto both sides of a nonporous positive electrode power collector of the positive electrode,
a negative electrode active material capable of intercalating and releasing lithium ions is coated onto both sides of a nonporous negative electrode power collector of the negative electrode,
$C_{x1}/C_{y1}$ is 0.85 to 1.15, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side),
$A_{x1}/A_{y1}$ is 0.85 to 1.15, and $(A_{x1}+C_{x1})/(A_{y1}+C_{y1})$ is 0.80 to 1.20, where $A_{y1}$ (g/m$^2$) is the basis weight of the negative electrode active material layer of one side ($A_y$ side) of the negative electrode that is facing the $C_y$ side, and $A_{x1}$ (g/m$^2$) is the basis weight of the negative electrode active material layer on the other side ($A_x$ side), and
$C_{x2}$ and $C_{y2}$ are each 0.1 to 18, and $C_{y2}/C_{x2}$ and $C_{x2}/C_{y2}$ are each 0.60 to 1.70, where $C_{x2}$ (g/m$^2$) is an amount of the lithium compound per area on the $C_x$ side and $C_{y2}$ (g/m$^2$) is an amount of the lithium compound per area on the $C_y$ side.

[2]

The nonaqueous lithium power storage element according to [1], wherein $(C_{x1}+C_{x2}+A_{y1})/(C_{y1}+C_{y2}+A_{x1})$ is 0.70 to 1.30.

[3]

The nonaqueous lithium power storage element according to [1] or [2], wherein $(C_{x1}+C_{x2}+A_{y1})/(C_{y1}+C_{y2}+A_{x1})$ is 0.80 to 1.20.

[4]

A nonaqueous lithium power storage element according to any one of [1] to [3], wherein
the positive electrode contains one or more compounds selected from the group consisting of compounds represented by the following formulas (1) to (3):

$$LiX^1\text{—}OR^1O\text{—}X^2Li \quad (1)$$

{where $R^1$ is an alkylene group of 1 to 4 carbon atoms or a halogenated alkylene group of 1 to 4 carbon atoms, and $X^1$ and $X^2$ respectively and independently represent —(COO)$_n$ (where n is 0 or 1)}, $$LiX^1\text{—}OR^1O\text{—}X^2R^2 \quad (2)$$

{where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —(COO)$_n$ (where n is 0 or 1)}, and $$R^2X^1\text{—}OR^1O\text{—}X^2R^3 \quad (3)$$

{where $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —(COO)$_n$ (where n is 0 or 1)},
at $1.60 \times 10^{-4}$ mol/g to $300 \times 10^{-4}$ mol/g per unit weight of the positive electrode active material layer.

[5]

The nonaqueous lithium power storage element according to [4], wherein $C_{y3}$ is $1.60 \times 10^{-4}$ to $300 \times 10^{-4}$, where $C_{y3}$ (mol/g) is the content of compounds represented by formulas (1) to (3) per unit weight of the $C_y$ side.

[6]

The nonaqueous lithium power storage element according to [5], wherein $C_{y3}/A_{y3}$ is 0.2 to 20, where $A_{y3}$ (mol/g) is the content of the compound represented by formulas (1) to (3) on the $A_y$ side.

[7]

The nonaqueous lithium power storage element according to any one of [1] to [6], wherein the lithium compound is one or more types selected from the group consisting of lithium carbonate, lithium oxide and lithium hydroxide.

[8]

The nonaqueous lithium power storage element according to any one of [1] to [6], wherein
the lithium compound is lithium carbonate, and
$S_x$ and $S_y$ are each 1 to 40 and $S_x/S_y$ is 0.5 to 1.5, where $S_x$ % and $S_y$ % are, respectively, the area ratios in carbonate ion mapping of the $C_x$ side and $C_y$ side for an image obtained by microscopic Raman spectroscopy of the $C_x$ side and $C_y$ side.

[9]

The nonaqueous lithium power storage element according to any one of [1] to [8], wherein
the nonaqueous lithium power storage element contains an electrode laminated body or wound electrode comprising a positive electrode and negative electrode either laminated or wound via a separator,
the electrode laminated body or wound electrode contains a negative electrode as at least one outermost layer, the negative electrode which is the outermost layer having a negative electrode active material layer $A_w$ side that does not face the positive electrode, and
$A_{w1}/A_{z1}$ is 0.01 to 0.45, where $A_{w1}$ (mol/m$^2$) is the amount of lithium ion per area on the $A_w$ side, the $A_z$ side is the negative electrode active material layer on the back side of the $A_w$ side, and $A_{z1}$ (mol/m$^2$) is the amount of lithium ion per area on the $A_z$ side.

[10]

The nonaqueous lithium power storage element according to [9], wherein the amount of active material $C_{z1}$ (g/m$^2$) per area on the $C_z$ side is 10 to 50, the amount of lithium compound $C_{z2}$ (g/m$^2$) per area on the $C_z$ side is 0.1 to 18.0, and $C_{z2}/C_{z1}$ is 0.03 to 0.5, where the $C_z$ side is the positive electrode active material layer facing the $A_z$ side.

[11]

The nonaqueous lithium power storage element according to [9] or [10], wherein the ratio $A_{w2}/A_{z2}$, of the amount of negative electrode active material $A_{w2}$ (g/m²) per area on the $A_w$ side and the amount of negative electrode active material $A_{z2}$ (g/m²) per area on the $A_z$ side, is 0.85 to 1.15.

[12]

The nonaqueous lithium power storage element according to [10], wherein the lithium compound is lithium carbonate, and in an image obtained by microscopic Raman spectroscopy of the $C_z$ side, $S_z$ is 1 to 40, where $S_z$ % is the area ratio of carbonate ion mapping.

[13]

The nonaqueous lithium power storage element according to [10], wherein the $C_z$ side contains one or more compounds selected from the group consisting of compounds represented by the following formulas (1) to (3):

$$LiX^1\text{—}OR^1O\text{—}X^2Li \quad (1)$$

{where $R^1$ is an alkylene group of 1 to 4 carbon atoms or a halogenated alkylene group of 1 to 4 carbon atoms, and $X^1$ and $X^2$ respectively and independently represent —(COO)$_n$ (where n is 0 or 1)}, $$LiX^1\text{—}OR^1O\text{—}X^2R^2 \quad (2)$$

{where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —(COO)$_n$ (where n is 0 or 1)}, and $$R^2X^1\text{—}OR^1O\text{—}X^2R^3 \quad \text{formula (3)}$$

{where $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —(COO)$_n$ (where n is 0 or 1)}, and $C_{z3}$ is $1.60 \times 10^{-4}$ to $300 \times 10^{-4}$, where $C_{z3}$ (mol/g) is the content of the compound represented by formulas (1) to (3) per unit weight on the $C_z$ side.

[14]

The nonaqueous lithium power storage element according to [13], wherein $C_{z3}/A_{z3}$ is 0.2 to 20, where $A_{z3}$ (mol/g) is the content of the compound represented by formulas (1) to (3) per unit weight on the $A_z$ side of the negative electrode active material layer.

[15]

The nonaqueous lithium power storage element according to any one of [1] to [14], wherein the lithium ion doping amount in the negative electrode active material is 530 mAh/g to 2,500 mAh/g per unit weight of the negative electrode active material.

[16]

The nonaqueous lithium power storage element according to [15], wherein the BET specific surface area of the negative electrode active material is 100 m²/g to 1,500 m²/g.

[17]

The nonaqueous lithium power storage element according to any one of [1] to [14], wherein the lithium ion doping amount in the negative electrode active material is 50 mAh/g to 700 mAh/g per unit weight of the negative electrode active material.

[18]

The nonaqueous lithium power storage element according to [17], wherein the BET specific surface area of the negative electrode active material is 1 m²/g to 50 m²/g.

[19]

The nonaqueous lithium power storage element according to any one of [1] to [14], [17] and [18], wherein the mean particle diameter of the negative electrode active material is 1 μm to 10 μm.

[20]

The nonaqueous lithium power storage element according to any one of [1] to [19], wherein the positive electrode active material in the positive electrode active material layer contains activated carbon, and the negative electrode active material contains an alloy-type negative electrode material that forms an alloy with lithium.

[21]

The nonaqueous lithium power storage element according to [20], wherein the alloy-type negative electrode material is one or more selected from the group consisting of silicon, silicon compound, tin, tin compounds, and composite materials of these with carbon or carbonaceous materials.

[22]

The nonaqueous lithium power storage element according to [20] or [21], wherein the content ratio of the lithium compound in the positive electrode is 1 weight % to 50 weights % based on the total weight of the positive electrode active material layer.

[23]

The nonaqueous lithium power storage element according to any one of [20] to [22], wherein the mean particle diameter of the lithium compound is 0.1 μm to 10 μm.

[24]

The nonaqueous lithium power storage element according to any one of [20] to [23], wherein the thickness of the negative electrode active material layer is 1 μm to 30 μm for each side.

[25]

The nonaqueous lithium power storage element according to any one of [20] to [24], wherein Wh/Vi is 15 to 50, where Wh (Wh) is the electrical energy of the nonaqueous lithium power storage element and Vi (L) is the volume of the power storage element, and for charge/discharge cycling of the nonaqueous lithium power storage element conducted 60,000 times at an environmental temperature of 25° C. and a rate of 300 C, in a cell voltage range from 2.2 V to 3.8 V, Rb/Ra is 0.9 to 2.0, where Rb (Ω) is the internal resistance after the charge/discharge cycling and Ra (Ω) is the internal resistance before the charge/discharge cycling.

[26]

The nonaqueous lithium power storage element according to any one of [20] to [25], wherein the activated carbon satisfies $0.3 < V_1 \leq 0.8$ and $0.5 \leq V_2 \leq 1.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m²/g to 3,000 m²/g, as measured by the BET method.

[27]

The nonaqueous lithium power storage element according to any one of [20] to [25], wherein the activated carbon satisfies $0.8<V_1\leq 2.5$ and $0.8<V_2\leq 3.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 2,300 m²/g to 4,000 m²/g, as measured by the BET method.

[28]

A power storage module containing a nonaqueous lithium power storage element according to any one of [1] to [27].

[29]

A power regenerating system containing a nonaqueous lithium power storage element according to any one of [1] to [27].

[30]

A power load-leveling system containing a nonaqueous lithium power storage element according to any one of [1] to [27].

[31]

An uninterruptable power source system containing a nonaqueous lithium power storage element according to any one of [1] to [27].

[32]

A non-contact power supply system containing a nonaqueous lithium power storage element according to any one of [1] to [27].

[33]

An energy harvesting system containing a nonaqueous lithium power storage element according to any one of [1] to [27].

[34]

A power storage system containing a nonaqueous lithium power storage element according to any one of [1] to [27].

Advantageous Effects of Invention

According to the invention there is provided a nonaqueous lithium power storage element wherein thermal runaway during internal short circuiting is suppressed, gas generation due to decomposition of lithium compound under high-temperature environmental conditions is reduced and resistance increase during high-load charge/discharge cycling is suppressed, and that has high energy density while exhibiting a high-load charge/discharge cycle characteristic.

BRIEF DESCRIPTION OF DRAWINGS

FIG. 2 is a cross-sectional schematic drawing of a non-aqueous lithium power storage element according to the second embodiment of the invention, in the direction of thickness.

FIG. 3 is a schematic diagram of a cross-sectional curve for measurement of the ten-point average height of ruggedness $R_{zjis}$ of a negative electrode power collector according to a third embodiment of the invention.

DESCRIPTION OF EMBODIMENTS

Figure 1:
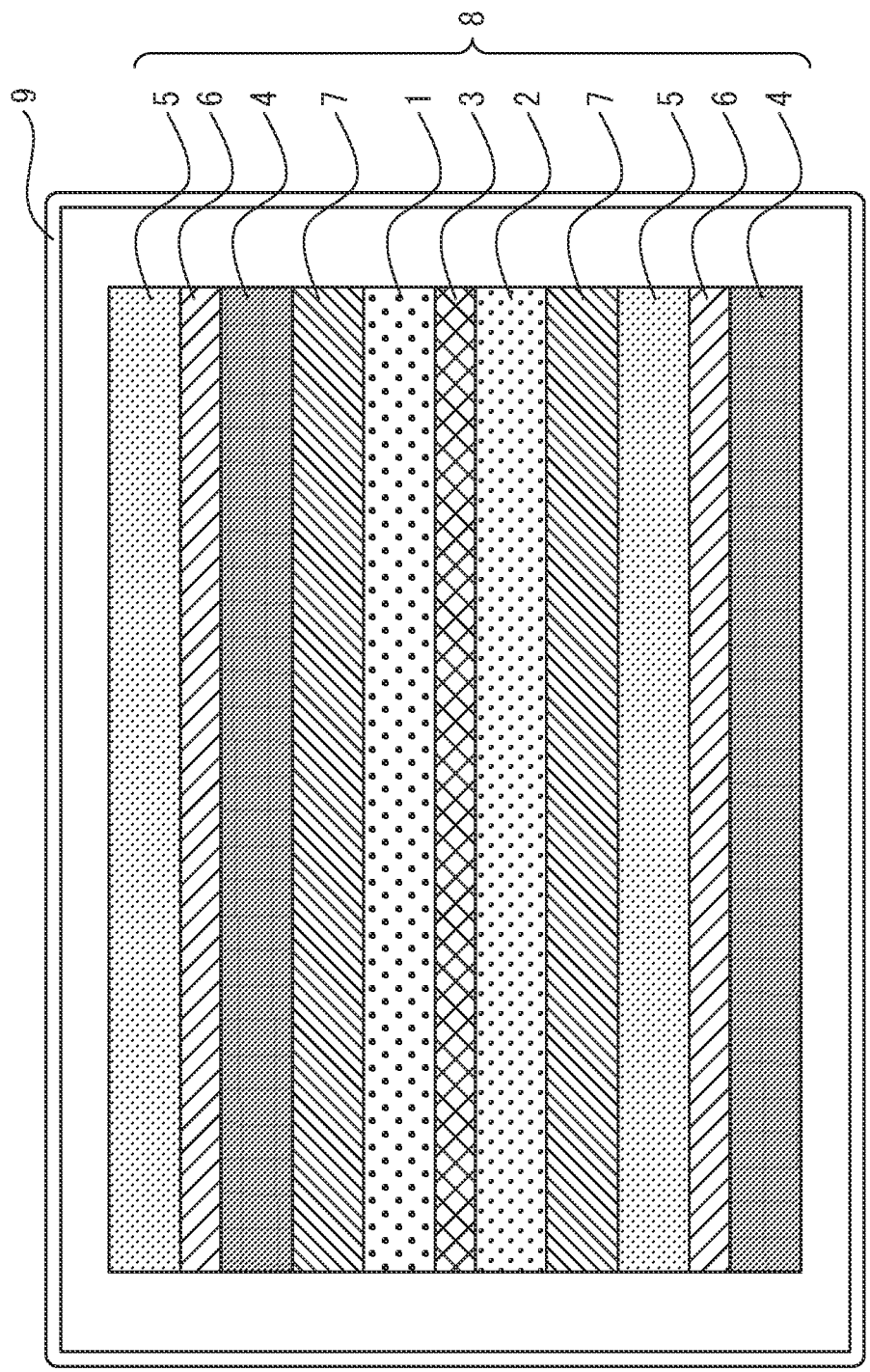
FIG. 1 is a diagram showing the facing states of the $C_x$ side and $C_y$ side of a positive electrode active material layer and the $A_x$ side and $A_y$ side of a negative electrode active material layer, in a cross-section of an electrode laminated body according to a first embodiment of the invention.

An embodiment of the invention (hereunder referred to as "this embodiment") will now be explained in detail as an example, with the understanding that the invention is not limited to this embodiment. The upper limits and lower limits for the numerical ranges for this embodiment may be combined as desired to constitute any desired numerical ranges.

A nonaqueous lithium power storage element generally comprises a positive electrode, a negative electrode, a separator and an electrolytic solution, as the major constituent elements. The electrolytic solution used is an organic solvent containing lithium ions (hereunder also referred to as "nonaqueous electrolytic solution").

FIG. 1 shows a state where positive electrode active material layer sides and negative electrode active material layer sides of a nonaqueous lithium power storage element of the first embodiment of the invention are facing each other. An electrode laminated body (8) comprising positive electrodes and negative electrodes laminated via separators (7) is housed in the casing (9) of the nonaqueous lithium power storage element according to the first embodiment of the invention.

In the electrode laminated body (8), at least one positive electrode contains a nonporous positive electrode power collector (3), both sides of the nonporous positive electrode power collector (3) being coated with an active material, so as to have a positive electrode active material layer with a positive electrode active material layer $C_x$ side (1) and a positive electrode active material layer with a positive electrode active material layer $C_y$ side (2) disposed, respectively.

In the electrode laminated body (8), at least one negative electrode contains a nonporous negative electrode power collector (6), both sides of the nonporous negative electrode power collector (6) being coated with a negative electrode active material capable of intercalating and releasing lithium ions, so as to have a negative electrode active material layer with a negative electrode active material layer $A_x$ side (4) and a negative electrode active material layer with a negative electrode active material layer $A_y$ side (5) disposed, respectively.

As shown in FIG. 1, the positive electrode active material layer $C_x$ side (1) and negative electrode active material layer $A_x$ side (4) are facing each other across a separator (7), and/or the positive electrode active material layer $C_y$ side (2) and the negative electrode active material layer $A_y$ side (5) are facing each other across a separator (7).

While not shown in FIG. 1, the positive electrode after the lithium doping step, which corresponds to the positive electrode precursor described below, may be disposed on the outermost side of the electrode laminated body.

FIG. 2 is a cross-sectional schematic drawing of a non-aqueous lithium power storage element according to the second embodiment of the invention, in the direction of thickness. An electrode laminated body (8) or wound electrode (not shown) comprising positive electrodes and negative electrodes laminated or wound across separators (7) is housed in the casing (9) of the nonaqueous lithium power storage element according to the second embodiment of the invention.

The electrode laminated body (8) or wound electrode (not shown) is constructed in such a manner that one negative electrode faces one side of one positive electrode, and another negative electrode faces the other side of the same positive electrode.

At least one negative electrode comprises a nonporous negative electrode power collector (6) and has a negative electrode active material capable of intercalating and releasing lithium ions, coated on both sides of the nonporous negative electrode power collector (6). At least one of the outermost layers of the electrode laminated body (8) is a negative electrode, and the negative electrode serving as the outermost layer has a negative electrode active material layer $A_w$ side (10) that does not face a positive electrode. In the case of a wound electrode (not shown), the negative electrode active material layer $A_w$ side (10) is the exposed side of the wound body, and a side that does not face a positive electrode. Also, the side on the opposite side from the $A_w$ side of the negative electrode (the "back side" of the negative electrode) is the $A_z$ side (11) of the negative electrode active material layer.

At least one positive electrode comprises a nonporous positive electrode power collector (3), and has an active material coated onto both sides of the nonporous positive electrode power collector (3). The positive electrode active material layer $C_z$ side (12) of the positive electrode faces the negative electrode active material layer $A_z$ side (11), optionally across a separator (7).

<Positive Electrode>

The positive electrode of this embodiment has a positive electrode power collector and a positive electrode active material layer containing a positive electrode active material, formed on one or both sides thereof. At least one of the positive electrodes has a nonporous positive electrode power collector and a positive electrode active material layer containing a positive electrode active material, formed on both sides thereof.

Throughout the present specification, "nonporous positive electrode power collector" means a positive electrode power collector that, at least in the region where the positive electrode active material layer has been coated, lacks pores that would allow lithium ions to pass through the positive electrode power collector and result in uniformity of lithium ions on the front and back sides of the positive electrode. Therefore, it does not exclude positive electrode power collectors having very small or microlevel pores, or positive electrode power collectors having pores in regions of the positive electrode active material layer that are not coated, within a range in which the effect of the invention is exhibited. According to this embodiment, at least the region of the positive electrode power collector that is coated with the positive electrode active material layer is nonporous, and the remaining sections of the positive electrode power collector that are not coated with the positive electrode active material may either have or lack pores.

The positive electrode of this embodiment preferably contains a lithium compound other than an active material as the positive electrode precursor, prior to assembly of the power storage element. As explained below, in the step of assembling the power storage element of this embodiment, preferably the negative electrode is pre-doped with lithium ion. The pre-doping method for this embodiment is preferably application of a voltage between the positive electrode precursor and negative electrode, after the power storage element has been assembled using the positive electrode precursor containing a lithium compound, the negative electrode, the separators and the nonaqueous electrolytic solution. The lithium compound may be included in any form in the positive electrode precursor and the positive electrode. For example, the lithium compound may be present between the positive electrode power collector and the positive electrode active material layer, or it may be present on the surface of the positive electrode active material layer. The lithium compound is preferably contained in the positive electrode active material layer formed on the positive electrode power collector of the positive electrode precursor.

Throughout the present specification, "positive electrode precursor" is defined as the positive electrode before the lithium doping step, and "positive electrode" is defined as the positive electrode after the lithium doping step.

[Positive Electrode Active Material Layer]

The positive electrode active material layer contains a positive electrode active material, but it may additionally contain optional components such as a conductive filler, binder and dispersion stabilizer, as necessary. The positive electrode active material preferably contains a carbon material.

The positive electrode active material layer of the positive electrode precursor preferably contains a lithium compound.

[Positive Electrode Active Material]

The positive electrode active material is a substance that contributes to Faraday reaction or non-Faraday reaction during charge/discharge of the power storage element, and it preferably contains a carbon material. The carbon material is preferably carbon nanotubes, a conductive polymer or a porous carbon material, and more preferably activated carbon. The positive electrode active material may also contain two or more varied materials in admixture, and it may even contain a material other than the carbon material such as, for example, a complex oxide of lithium and a transition metal.

The content of the carbon material with respect to the total weight of the positive electrode active material is preferably 50 weights % or greater and more preferably 70 weights % or greater. The carbon material content may be 100 weight %, but from the viewpoint of obtaining a satisfactory effect by combined use with other materials, it is preferably no greater than 90 weights % or no greater than 80 weight %, for example.

When activated carbon is used as the positive electrode active material, there are no particular restrictions on the type of activated carbon or its starting material. However, preferably the pores of the activated carbon are optimally controlled to obtain both a high input/output characteristic and high energy density. Specifically, if $V_1$ (cc/g) is the mesopore volume due to pores with diameters of 20 Å to 500 Å (i.e. 200 nm to 5000 nm) as calculated by the BJH method, and $V_2$ (cc/g) is the micropore volume due to pores with diameters of smaller than 20 Å as calculated by the MP method, then:

(1) in order to obtain a high input/output characteristic, activated carbon satisfying $0.3 < V_1 \leq 0.8$ and $0.5 \leq V_2 \leq 1.0$ and exhibiting a specific surface area of 1,500 m$^2$/g to 3,000 m$^2$/g as measured by the BET method (hereunder also referred to as "activated carbon 1") is preferred, and (2) in order to obtain high energy density, activated carbon satisfying $0.8 < V_1 \leq 2.5$ and $0.8 < V_2 \leq 3.0$ and exhibiting a specific surface area of 2,300 m$^2$/g to 4,000 m$^2$/g as measured by the BET method (hereunder also referred to as "activated carbon 2"), is preferred.

The (1) activated carbon 1 and (2) activated carbon 2 will now be described.

(Activated Carbon 1)

The mesopore volume $V_1$ of activated carbon 1 is preferably a value larger than 0.3 cc/g, from the viewpoint of a greater input/output characteristic when the positive electrode material has been incorporated into a power storage element. On the other hand, $V_1$ for activated carbon 1 is also preferably no greater than 0.8 cc/g from the viewpoint of minimizing reduction in the bulk density of the positive electrode. $V_1$ for activated carbon 1 is more preferably 0.35 cc/g to 0.7 cc/g and even more preferably 0.4 cc/g to 0.6 cc/g.

The micropore volume $V_2$ of activated carbon 1 is preferably 0.5 cc/g or greater in order to increase the area-to-weight ratio of the activated carbon and increase capacitance. On the other hand, from the viewpoint of minimizing the bulk of the activated carbon, increasing the density as an electrode and increasing the capacitance per unit volume, $V_2$ for activated carbon 1 is preferably no larger than 1.0 cc/g. $V_2$ for activated carbon 1 is more preferably 0.6 cc/g to 1.0 cc/g and even more preferably 0.8 cc/g to 1.0 cc/g.

The ratio of the mesopore volume $V_1$ to the micropore volume $V_2$ for activated carbon 1 ($V_1/V_2$) is preferably in the range of $0.3 \leq V_1/V_2 \leq 0.9$. That is, $V_1/V_2$ for activated carbon 1 is preferably 0.3 or greater from the viewpoint of increasing the ratio of the mesopore volume to the micropore volume to a degree allowing reduction in the output characteristic to be minimized while maintaining high capacitance. On the other hand, $V_1/V_2$ for activated carbon 1 is preferably no greater than 0.9 from the viewpoint of increasing the ratio of the micropore volume with respect to the mesopore volume, to a degree allowing a high output characteristic to be maintained while minimizing reduction in capacitance. The range of $V_1/V_2$ for activated carbon 1 is more preferably $0.4 \leq V_1/V_2 \leq 0.7$ and even more preferably $0.55 \leq V_1/V_2 \leq 0.7$.

The mean pore size of the activated carbon 1 is preferably 17 Å or greater, more preferably 18 Å or greater and even more preferably 20 Å or greater, from the viewpoint of increasing the output of the obtained power storage element. From the viewpoint of increasing capacitance, the mean pore size of activated carbon 1 is preferably no greater than 25 Å.

The BET specific surface area of activated carbon 1 is preferably 1,500 $m^2/g$ to 3,000 $m^2/g$, and more preferably 1,500 $m^2/g$ to 2,500 $m^2/g$. If the BET specific surface area of activated carbon 1 is 1,500 $m^2/g$ or greater it will be easier to obtain satisfactory energy density, and if the BET specific surface area of activated carbon 1 is 3,000 $m^2/g$ or lower there will be no need to add substantial amounts of a binder to maintain the strength of the electrode, and therefore the performance per volume of the electrode will be higher.

The activated carbon 1 having such features can be obtained, for example, using the starting material and treatment method described below.

For this embodiment, the carbon source to be used as the starting material for activated carbon 1 is not particularly restricted. Examples of carbon sources for activated carbon 1 include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for mass-production and of cost, the starting materials preferred among these are plant-based starting materials such as coconut shell and wood dust, and their carbides, with coconut shell carbides being particularly preferred.

The system used for carbonization and activation from these starting materials to produce the activated carbon 1 may be a known system such as, for example, a fixed bed system, moving bed system, fluidized bed system, slurry system or rotary kiln system.

The activation method for a carbide obtained by the carbonization method is preferably a gas activation method in which an activating gas such as water vapor, carbon dioxide or oxygen is used for calcination. A method using water vapor or carbon dioxide as the activating gas is more preferred.

In this activation method, the activating gas is supplied at a rate of 0.5 to 3.0 kg/h and preferably 0.7 to 2.0 kg/h, while the carbide is raised to 800 to 1,000° C. for 3 to 12 hours, preferably 5 to 11 hours and more preferably 6 to 10 hours, for activation.

The carbide may be subjected to a primary activation before activation treatment of the carbide. In the primary activation, a method of calcination the carbon material at a temperature of below 900° C. using an activating gas such as water vapor, carbon dioxide or oxygen for gas activation, is usually preferred.

By appropriate combinations for the calcination temperature and calcination time for the carbonization method, and the activating gas supply rate, temperature-elevating rate and maximum activation temperature in the activation method, it is possible to produce activated carbon 1 having the features described above that is preferred for this embodiment.

The mean particle diameter of the activated carbon 1 is preferably 2 to 20 μm. If the mean particle diameter of the activated carbon 1 is 2 μm or greater, the capacitance per electrode volume will tend to be higher due to the higher density of the active material layer. If the mean particle diameter of the activated carbon 1 is small the durability may be reduced, but the durability is unlikely to be reduced if the mean particle diameter is 2 μm or greater. A mean particle diameter of the activated carbon 1 of no larger than 20 μm will tend to be more suitable for high-speed charge/discharge. The mean particle diameter of activated carbon 1 is more preferably 2 to 15 μm and even more preferably 3 to 10 μm.

(Activated Carbon 2)

The mesopore volume $V_1$ of activated carbon 2 is preferably a value larger than 0.8 cc/g, from the viewpoint of a greater output characteristic when the positive electrode material has been incorporated into a power storage element. On the other hand, the mesopore volume is also preferably no greater than 2.5 cc/g from the viewpoint of minimizing reduction in the capacity of the power storage element. $V_1$ for activated carbon 2 is more preferably 1.00 cc/g to 2.0 cc/g and even more preferably 1.2 cc/g to 1.8 cc/g.

The micropore volume $V_2$ of activated carbon 2 is preferably a value larger than 0.8 cc/g in order to increase the specific surface area of the activated carbon and increase capacitance. From the viewpoint of reducing the bulk of the activated carbon, increasing the density as an electrode and increasing the capacitance per unit volume, $V_2$ of activated carbon 2 is preferably no larger than 3.0 cc/g. $V_2$ of activated carbon 2 is more preferably larger than 1.0 cc/g and no larger than 2.5 cc/g, and even more preferably 1.5 cc/g to 2.5 cc/g.

Activated carbon 2 having the mesopore volume and micropore volume described above has a higher BET specific surface area than activated carbon used in conventional electrical double layer capacitors or lithium ion capacitors. The specific value of the BET specific surface area of the activated carbon 2 is preferably 2,300 $m^2/g$ to 4,000 $m^2/g$, more preferably 3,000 $m^2/g$ to 4,000 $m^2/g$ and even more preferably 3,200 $m^2/g$ to 3,800 $m^2/g$. If the BET specific surface area of activated carbon 2 is 2,300 m²/g or greater it will be easier to obtain satisfactory energy density, and if the BET specific surface area of activated carbon 2 is 4,000 m²/g or lower there will be no need to add substantial amounts of a binder to maintain the strength of the electrode, and therefore the performance per volume of the electrode will tend to be higher.

Activated carbon 2 having such features can be obtained, for example, using the starting material and treatment method described below.

The carbonaceous material used as the starting material for activated carbon 2 is not particularly restricted so long as it is a carbon source commonly used as a starting material for activated carbon, and examples include plant-based starting materials such as wood, wood dust and coconut shell; fossil-based starting materials such as petroleum pitch and coke; and various synthetic resins such as phenol resins, furan resins, vinyl chloride resins, vinyl acetate resins, melamine resins, urea resins and resorcinol resins. Of these starting materials, phenol resins and furan resins are especially preferred, being suitable for fabrication of activated carbon 2 with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. A common calcination method employs a carbonization temperature of about 400 to 700° C. and a carbonization time of about 0.5 to 10 hours.

The activation method for the carbide after carbonization may be a gas activation method in which calcination is accomplished using an activating gas such as water vapor, carbon dioxide or oxygen, or an alkali metal activation method in which heat treatment is carried out after mixture with an alkali metal compound. An alkali metal activation method is preferred to produce activated carbon with a high specific surface area.

In this activation method, preferably a carbide and an alkali metal compound such as KOH or NaOH are mixed so that the weight ratio is 1:≥1 (the amount of the alkali metal hydroxide being equal to or greater than the amount of the carbide), after which heat treatment is carried out in a range of 600 to 900° C. for 0.5 to 5 hours under an inert gas atmosphere, and then the alkali metal hydroxide is subjected to cleaning removal with an acid or water, and drying is performed.

In order to increase the micropore volume and not increase the mesopore volume, the amount of carbide may be increased during activation, and mixed with KOH. In order to increase both the micropore volume and mesopore volume, a large amount of KOH may be used. In order to increase mainly the mesopore volume, steam-activation is preferably carried out after alkaline activation treatment.

The mean particle diameter of activated carbon 2 is preferably 2 μm to 20 μm and more preferably 3 μm to 10 μm.

(Aspect Using Activated Carbon)

The activated carbons 1 and 2 may each be a single type of activated carbon, or a mixture of two or more different types of activated carbon, such that the mixture as a whole exhibit the characteristics described above.

Either of activated carbons 1 or 2 may be selected for use, or both may be used in admixture.

The positive electrode active material may also include materials other than activated carbons 1 and 2, such as activated carbon without the specified $V_1$ and/or $V_2$ values, or materials other than activated carbon, such as complex oxides of lithium and transition metals. In the exemplary aspect, the content of activated carbon 1, or the content of activated carbon 2, or the total content of activated carbons 1 and 2, are preferably greater than 50 weight %, more preferably 70 weights % or greater, even more preferably 90 weights % or greater and yet more preferably 100 weight %, of the total positive electrode active material.

The content ratio of the positive electrode active material in the positive electrode active material layer is preferably 35 weights % to 95 weights % based on the total weight of the positive electrode active material layer in the positive electrode precursor. The lower limit for the content ratio of the positive electrode active material is more preferably 45 weights % or greater and even more preferably 55 weights % or greater. On the other hand, the upper limit for the content ratio of the positive electrode active material is more preferably no greater than 90 weights % and even more preferably no greater than 85 weights %. A suitable charge/discharge characteristic is exhibited by adjusting the content ratio of the positive electrode active material to within this range.

(Lithium Compound)

Throughout the present specification, a lithium compound is a substance containing lithium, and it excludes active materials that contribute to Faraday reaction or non-Faraday reaction in the electrode during charge/discharge of the power storage element.

Suitable lithium compounds to be used for this embodiment include one or more selected from among lithium carbonate, lithium oxide, lithium hydroxide, lithium fluoride, lithium chloride, lithium bromide, lithium iodide, lithium nitride, lithium oxalate and lithium acetate. Preferred among these are lithium carbonate, lithium oxide and lithium hydroxide, with lithium carbonate being more preferred from the viewpoint of being handleable in air and having low hygroscopicity. Such lithium compounds can decompose upon application of a voltage, to function as a dopant source for lithium doping in the negative electrode, while also forming pores in the positive electrode active material layer, having excellent electrolytic solution retentivity, and forming a positive electrode with excellent ionic conductivity. In addition to the aforementioned lithium compounds, one or more alkali metal carbonates such as sodium carbonate, potassium carbonate, rubidium carbonate and cesium carbonate may also be used. When an electrolytic solution pre-dissolving a lithium salt such as $LiPF_6$, described below, is used as the nonaqueous electrolytic solution, such an alkali metal carbonate may be used alone. The lithium compound in the positive electrode precursor may be of a single type, or two or more different lithium compounds may be included, or a lithium compound may be used in admixture with another alkali metal carbonate.

In addition, the positive electrode precursor of this embodiment may be any one that contains at least one lithium compound, and it may also contain, in addition to a lithium compound, one or more from among the following formulas:

oxides such as $M_2O$, hydroxides such as MOH, halides such as MF or MCl, oxalates such as $M_2(CO_2)_2$, and carboxylates such as RCOOM (where R is H, an alkyl group or an aryl group), where M is one or more selected from among Na, K, Rb and Cs.

The positive electrode precursor may also contain one or more alkaline earth metal carbonates selected from among $BeCO_3$, $MgCO_3$, $CaCO_3$, $SrCO_3$ and $BaCO_3$, and one or more alkaline earth metal oxides, alkaline earth metal hydroxides, alkaline earth metal halides, alkaline earth metal oxalates and alkaline earth metal carboxylates.

The positive electrode precursor of this embodiment may contain microparticles of a lithium compound. Various methods may be used for micronization of the lithium compound. For example, a pulverizer such as a ball mill, bead mill, ring mill, jet mill or rod mill may be used.

(Other Components of Positive Electrode Active Material Layer)

If necessary, the positive electrode active material layer of this embodiment may also contain optional components such as a conductive filler, binder and dispersion stabilizer, in addition to the positive electrode active material and lithium compound.

The conductive filler may be a conductive carbonaceous material with higher conductivity than the positive electrode active material. Preferred examples of conductive fillers include Ketchen black, acetylene black, vapor grown carbon fibers, graphite and carbon nanotubes, as well as mixtures thereof.

The amount of conductive filler mixed in the positive electrode active material layer is preferably greater than 0 and up to 20 parts by weight and more preferably in the range of 1 to 15 parts by weight, with respect to 100 parts by weight of the positive electrode active material. From the viewpoint of a high input characteristic, the positive electrode active material layer preferably contains a conductive filler. If the amount of conductive filler mixed in the positive electrode active material layer is no greater than 20 parts by weight, the content ratio of the positive electrode active material in the positive electrode active material layer will be increased, allowing the energy density per volume of the positive electrode active material layer to be ensured.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 3 parts by weight to 27 parts by weight and even more preferably 5 parts by weight to 25 parts by weight, with respect to 100 parts by weight of the positive electrode active material. If the amount of binder is 1 weight % or greater, adequate electrode strength will be exhibited. If the amount of binder is no greater than 30 parts by weight, on the other hand, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably greater than 0 parts by weight and up to 10 parts by weight, with respect to 100 parts by weight of the positive electrode active material. If the amount of dispersion stabilizer is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector of this embodiment is not particularly restricted so long as it is a material with high electron conductivity, and resistance to degradation by elution into the electrolytic solution or reaction with the electrolytic or ion, but a metal foil is preferred. The positive electrode power collector in the nonaqueous lithium power storage element of this embodiment is most preferably an aluminum foil.

The metal foil may be a common metal foil having no ruggedness or through-holes, or a metal foil having ruggedness formed by embossing, chemical etching, electrodeposition or blasting, or a metal foil having through-holes such as expanded metal, punching metal or etching foil, so long as it is used as a "nonporous positive electrode power collector" as defined above.

The thickness of the positive electrode power collector is not particularly restricted so long as it allows the shape and strength of the positive electrode to be maintained, but 1 to 100 μm, for example, is preferred. Incidentally, when the positive electrode power collector has holes or ruggedness, the thickness of the positive electrode power collector is measured based on the sections where no holes or ruggedness are present.

[Production of Positive Electrode Precursor]

According to this embodiment, the positive electrode precursor that is to be the positive electrode of the nonaqueous lithium power storage element can be produced by a known production technique for electrodes for lithium ion batteries or electrical double layer capacitors. For example, the positive electrode active material and lithium compound, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the film thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding, after which a conductive adhesive is used for attachment to the positive electrode power collector.

The coating solution of the positive electrode precursor may also be prepared by dry blending all or a portion of each of the starting materials containing the positive electrode active material, and then adding water or an organic solvent, and/or a liquid or slurry-like substance comprising a binder or dispersion stabilizer dissolved or dispersed in them. The coating solution may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and lithium compound, and a conductive filler if necessary, and the low-conductivity lithium compound is coated with the conductive material. This will help the lithium compound to decompose by the positive electrode precursor in the lithium doping step described below. When water is used as the solvent for the coating solution, the coating solution may be rendered alkaline by addition of the lithium compound, and therefore a pH regulator may be added to the coating solution as necessary.

The method of dissolution or dispersion is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and reaggregation will be reduced.

The degree of dispersion of the coating solution is preferably to a granularity of 0.1 μm to 100 μm, as measured with a fineness gauge. The upper limit for the degree of dispersion is more preferably to a granularity of no greater than 80 μm, and more preferably to a granularity of no greater than 50 μm. A granularity of 0.1 μm or greater means that each of the material powders containing positive electrode active materials are not excessively crushed during preparation of the coating solution. In addition, if the granularity is no greater than 100 μm, there will be less clogging during discharge of the coating solution and less formation of streaks in the coating film, allowing more stable coating of the coating solution.

The viscosity ($\eta$b) of the coating solution of the positive electrode precursor is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta$b) of the coating solution of the positive electrode precursor is 1,000 mPa·s or higher, liquid dripping during formation of the coating film will be suppressed, and the coating film width and thickness can be satisfactorily controlled. If the viscosity ($\eta$b) of the coating solution of the positive electrode precursor is no higher than 20,000 mPa·s, there will be less pressure loss in the flow channel of the coating solution when a coating machine is used, allowing the coating solution to be stably coated, and allowing control to less than the prescribed coating film thickness.

The TI value (thixotropy index value) of the coating solution of the positive electrode precursor is preferably 1.1 or greater, more preferably 1.2 or greater and even more preferably 1.5 or greater. If the TI value of the coating solution of the positive electrode precursor is 1.1 or greater, it will be possible to satisfactorily control the coating film width and thickness.

The method of forming a coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound content differs within each layer of the coating film. The coating speed is preferably 0.1 m/min to 100 m/min, more preferably 0.5 m/min to 70 m/min and even more preferably 1 m/min to 50 m/min. If the coating speed is 0.1 m/min or greater then stable coating of the coating solution will be possible, and if it is no greater than 100 m/min then coating precision can be adequately ensured.

The method of drying the coating film of the positive electrode precursor is not particularly restricted, and a drying method such as hot air drying or infrared ray (IR) drying may be suitably employed. Drying of the coating film may be drying at a single temperature, or it may be drying while varying the temperature in various stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the positive electrode power collector or positive electrode active material layer.

The method of pressing the positive electrode precursor is not particularly restricted, and a pressing machine such as a hydraulic press or vacuum pressing machine may be suitably used. The film thickness, bulk density and electrode strength of the positive electrode active material layer can be adjusted by the pressing pressure, the gap between the press rolls, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkling will be unlikely to occur in the positive electrode precursor, and adjustment of the positive electrode active material layer film to the desired film thickness and bulk density will be easier.

The gap between the press rolls may be set to a desired value depending on the film thickness of the dried positive electrode precursor, so that the desired film thickness and bulk density of the positive electrode active material layer is obtained.

The pressing speed may also be set to the desired speed, so as to reduce distortion and wrinkling in the positive electrode precursor.

The surface temperature of the pressed portion may be room temperature, or the surface of the pressed portion may be heated instead, if necessary. In the case of heating, the lower limit for the surface temperature of the pressed portion is preferably at least the melting point of the binder minus 60° C., more preferably at least the melting point of the binder minus 45° C., and even more preferably at least the melting point of the binder minus 30° C. The upper limit for the surface temperature of the pressed portion in the case of heating is also preferably no higher than the melting point of the binder used plus 50° C., more preferably no higher than the melting point of the binder plus 30° C., and even more preferably no higher than the melting point of the binder plus 20° C. For example, when PVdF (polyvinylidene fluoride: melting point=150° C.) is used as the binder, the surface of the pressed portion is heated to preferably 90° C. to 200° C., more preferably 105° C. to 180° C. and even more preferably 120° C. to 170° C. When a styrene-butadiene copolymer (melting point=100° C.) is used as the binder, heating of the surface of the pressed portion is to preferably 40° C. to 150° C., more preferably 55° C. to 130° C. and even more preferably 70° C. to 120° C.

The melting point of the binder can be determined by the endothermic peak position in DSC (Differential Scanning Calorimetry). For example, using a "DSC7" differential scanning calorimeter by Perkin-Elmer, with 10 mg of sample resin set in the measuring cell and increasing the temperature from 30° C. to 250° C. at a temperature-elevating rate of 10° C./min in a nitrogen gas atmosphere, the melting point is the endothermic peak temperature during the temperature elevation.

Pressing may also be carried out multiple times while varying the conditions including the pressing pressure, gap, speed, and pressed portion surface temperature.

The thickness of the positive electrode active material layer is preferably 20 µm to 200 µm for each side of the positive electrode power collector. The thickness of the positive electrode active material layer per side is more preferably 25 µm to 100 µm, and even more preferably 30 µm to 80 µm, for each side. If the thickness of the positive electrode active material layer is 20 µm or greater, sufficient charge/discharge capacity can be exhibited. If the thickness of the positive electrode active material layer is no greater than 200 µm, low ion diffusion resistance can be maintained in the electrode. Therefore, if the thickness of the positive electrode active material layer for each side of the power collector is 20 µm to 200 µm, it will be possible to obtain an adequate output characteristic, while also reducing the cell volume, thereby allowing the energy density to be increased. When the positive electrode power collector has through-holes or ruggedness, the thickness of the positive electrode active material layer is the mean value of the thickness of the positive electrode active material layer for each side at the sections of the positive electrode power collector without through-holes or ruggedness.

The bulk density of the positive electrode active material layer at the positive electrode after the lithium doping step described below is in the range of preferably 0.40 g/cm$^3$ or greater and more preferably 0.50 g/cm$^3$ to 1.3 g/cm$^3$. If the bulk density of the positive electrode active material layer is 0.40 g/cm$^3$ or greater, it will be possible to exhibit high energy density and to reduce the size of the power storage element. If the bulk density of the positive electrode active material layer is no higher than 1.3 g/cm$^3$, diffusion of the electrolytic solution in the pores in the positive electrode active material layer will be adequate, and a high output characteristic will be obtained.

<Negative Electrode>

The negative electrode of this embodiment has a negative electrode power collector and a negative electrode active material layer containing a negative electrode active material, formed on one or both sides thereof.

Throughout the present specification, "nonporous negative electrode power collector" means a negative electrode power collector that, at least in the region where the negative electrode active material layer has been coated, lacks pores that would allow lithium ions to pass through the negative electrode power collector and result in uniformity of lithium ions on the front and back sides of the negative electrode. Therefore, it does not exclude negative electrode power collectors having very small or microlevel pores, and negative electrode power collectors having pores in regions of the negative electrode active material layer that are not coated, within a range in which the effect of the invention is exhibited. According to this embodiment, at least the region of the negative electrode power collector that is coated with the negative electrode active material layer is nonporous, and the remaining sections of the negative electrode power collector that are not coated with the negative electrode active material may either have or lack pores.

[Negative Electrode Active Material Layer]

The negative electrode active material layer contains the negative electrode active material, but it may also contain optional components such as a conductive filler, binder and dispersion stabilizer, as necessary.

[Negative Electrode Active Material]

The negative electrode active material used may be a substance capable of intercalating and releasing lithium ions. The negative electrode active material may be, specifically, a carbon material, or a material that forms an alloy with lithium (hereunder also referred to as "alloy-type negative electrode material"). The alloy-type negative electrode material is not particularly restricted but is preferably one or more selected from the group consisting of silicon, silicon compounds, tin and tin compounds, and composite materials of these with carbon or carbonaceous materials. The silicon compound is preferably a silicon oxide, and more preferably $SiO_x$ (where x is a number in the range of 0.01≤x≤1). The content of the carbon material or alloy-type negative electrode material is preferably 50 weights % or greater and more preferably 70 weights % or greater with respect to the total weight of the negative electrode active material, conductive filler, binder and dispersion stabilizer. The content of the carbon material or alloy-type negative electrode material may be 100 weight %, but from the viewpoint of obtaining a satisfactory effect by combined use with other materials, it is preferably, for example, no greater than 90 weights %, and may even be 80 weights % or lower.

A composite material is preferably a material obtained by combining, by heat treatment or the like, at least one type of base material selected from the group consisting of silicon, silicon compounds, tin and tin compounds, with at least one type of carbon or carbonaceous material selected from the group consisting of non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbonaceous material precursors such as petroleum-based pitch, coal-based pitch, mesocarbon microbeads, coke and synthetic resins (for example, phenol resins); thermal decomposition products of furfuryl alcohol resins or novolac resins; fullerenes; and carbon nanohorns.

Especially preferred among these are composite materials that are obtained by heat treatment of one or more of the aforementioned base materials with petroleum-based pitch or coal-based pitch in admixture. Before the heat treatment, the base material and the pitch may be mixed at a temperature higher than the melting point of the pitch. The heat treatment temperature may be a temperature such that the components generated by volatilization or thermal decomposition of the pitch used are converted to a carbonaceous material. The heat treatment temperature is preferably 400° C. to 2500° C., more preferably 500° C. to 2000° C. and even more preferably 550° C. to 1500° C. The atmosphere for heat treatment is not particularly restricted but is preferably a non-oxidizing atmosphere.

Examples of carbon materials include non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbon precursors such as petroleum-based pitch, coal-based pitch, mesocarbon microbeads, coke and synthetic resins (for example, phenol resins); thermal decomposition products of furfuryl alcohol resins or novolac resins; fullerenes; carbon nanohorns; and carbon materials that are composites of the foregoing.

The carbon material is not particularly restricted, but activated carbon, carbon black, molded porous carbon, high specific surface area graphite or carbon nanoparticles may be used.

From the viewpoint of lowering resistance of the negative electrode, pitch composite carbon materials are preferred that are obtained by heat treatment of one or more carbon materials with petroleum-based pitch or coal-based pitch in admixture. Before the heat treatment, the carbon material and the pitch may be mixed at a temperature higher than the melting point of the pitch. The heat treatment temperature may be a temperature such that the components generated by volatilization or thermal decomposition of the pitch used are converted to a carbonaceous material. The atmosphere for the heat treatment is preferably a non-oxidizing atmosphere.

Preferred examples for the pitch composite carbon material are pitch composite carbon materials 1 and 2 described below. Either of these may be selected for use, or both may be used in combination.

For the present specification, pitch composite carbon material 1 is a material that can be obtained by heat treating one or more carbon materials with a BET specific surface area of 100 $m^2/g$ to 3000 $m^2/g$ in admixture with petroleum-based pitch or coal-based pitch.

According to one embodiment, the BET specific surface area of pitch composite carbon material 1 is preferably 100 $m^2/g$ to 1,500 $m^2/g$.

According to one embodiment, the lithium ion doping amount per unit weight of pitch composite carbon material 1 is preferably 530 mAh/g to 2,500 mAh/g, more preferably 620 mAh/g to 2,100 mAh/g, even more preferably 760 mAh/g to 1,700 mAh/g and yet more preferably 840 mAh/g to 1,500 mAh/g.

Doping lithium ion lowers the potential of the negative electrode. Thus, when a negative electrode containing a negative electrode active material doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the lithium ion doping amount per unit weight of the pitch composite carbon material 1 is 530 mAh/g or greater, lithium ion in the composite carbon material 1 will be satisfactorily doped even at irreversible sites where lithium ion cannot be desorbed after once being inserted, and it will also be possible to reduce the amount of negative electrode active material per amount of lithium ion. The film thickness of the negative electrode can therefore be reduced and high energy density can be obtained. As the doping amount increases, the negative electrode potential decreases and the input/output characteristic, energy density and durability increase.

If the lithium ion doping amount per unit weight of the pitch composite carbon material 1 is no greater than 2,500 mAh/g, side-effects of lithium metal deposition and the like will be less likely to occur.

Pitch composite carbon material 2 is a material that can be obtained by heat treating one or more carbon materials with a BET specific surface area of 1 $m^2/g$ to 30 $m^2/g$ in admixture with petroleum-based pitch or coal-based pitch.

According to another embodiment, the BET specific surface area of pitch composite carbon material 2 is also preferably 1 $m^2/g$ to 50 $m^2/g$.

According to another embodiment, the lithium ion doping amount per unit weight of the negative electrode active material is preferably 50 mAh/g to 700 mAh/g, more preferably 70 mAh/g to 650 mAh/g, even more preferably 90 mAh/g to 600 mAh/g and yet more preferably 1 00 mAh/g to 550 mAh/g.

If the lithium ion doping amount per unit weight of pitch composite carbon material 2 is 50 mAh/g or greater, lithium ion will be satisfactorily doped even at irreversible sites where lithium ion in the composite carbon material 2 cannot be desorbed after once being inserted, and therefore high energy density can be obtained. As the doping amount increases, the negative electrode potential decreases and the input/output characteristic, energy density and durability increase.

If the lithium ion doping amount per unit weight of the pitch composite carbon material 2 is no greater than 700 mAh/g, side-effects of lithium metal deposition and the like will be less likely to occur.

The doping amount of lithium ion in the negative electrode active material of the nonaqueous lithium power storage element during shipping and after use (that is, the capacitance per unit weight of the negative electrode) for this embodiment can be measured in the manner explained in the Examples.

The mean particle diameter for pitch composite carbon materials 1 and 2 is preferably 1 μm to 10 μm, the lower limit being more preferably 2 μm or larger and even more preferably 2.5 μm or larger, and the upper limit being more preferably no larger than 6 μm and even more preferably no larger than 4 μm. If the mean particle diameter of the negative electrode active material is 1 μm to 10 μm, then satisfactory durability will be maintained.

The mean particle diameter of the alloy-type negative electrode material is preferably between 0.01 μm and 30 μm, inclusive. If the mean particle diameter is 0.01 μm or larger, the contact area with the nonaqueous electrolytic solution will be increased, allowing the resistance of the lithium ion secondary battery to be lowered. If the mean particle diameter of the alloy-type negative electrode material is no larger than 30 μm, then the negative electrode active material layer can be adequately reduced in thickness, and therefore the energy density of the lithium ion secondary battery can be increased.

The mean particle diameter of the alloy-type negative electrode material can be adjusted by pulverization of the alloy-type negative electrode material using a classifier-equipped wet or dry jet mill, or a stirring ball mill or the like. A pulverizer comprises a centrifugal classifier, and the microparticles pulverized in an inert gas such as nitrogen or argon can be collected with a cyclone or dust collector.

The mean particle diameter for this embodiment can be determined by the following method. First, the primary particle size of the active material is measured by the following method. If the primary particle size is a value less than 1 μm, then the primary particle size is used as the mean particle diameter. If the primary particle size is 1 μm or larger, then the mean particle diameter is the particle diameter at the point where, when the particle size distribution of a powder of the active material is measured using a particle size distribution analyzer, and a cumulative curve with 100% as the total volume is determined, the cumulative curve is at 50% (that is, the 50% diameter (median diameter)). An example for the particle size distribution analyzer is a Laser diffraction particle size distribution analyzer.

The primary particle size of the active material for this embodiment is determined by one of the following methods.

1) A method in which the powder of the active material is photographed with an electron microscope in several visual fields, the particle diameters are calculated for 2,000 to 3,000 particles in the visual fields using a fully automatic image processing device, and the value of the arithmetic mean is recorded as the primary particle size.

2) A method in which the surface and/or cross-section of the obtained electrode is photographed in several fields with an electron microscope, and the arithmetic mean is determined by the method described above.

The primary particle size of the active material incorporated into the lithium ion secondary battery can be measured by method 2) after disassembling the lithium ion secondary battery and removing out the electrodes; or by method 1) after excluding the components other than the active material from the removed electrodes.

The procedure for disassembling the lithium ion secondary battery and removing the electrodes is preferably carried out under an inert atmosphere such as argon.

The following method, for example, may be used to remove the components other than the active material from the electrode. First, the removed electrode is immersed in ethyl methyl carbonate or dimethyl carbonate, the nonaqueous electrolytic solution and lithium salt are removed and air-drying is carried out. The air-dried electrode is then immersed in a mixed solvent comprising methanol and isopropanol to inactivate the lithium ion intercalated in the active material, and air-drying is again carried out. Next, in order to remove the binder in the active material layer, the electrode with inactivated lithium ions is immersed in distilled water or NMP. Next, after scraping off the active material with a spatula or the like if necessary, the electrode is irradiated with ultrasonic waves, and the active material is allowed to slide down from the power collector and suction filtered to recover the active material. If necessary also, a procedure of re-immersion of the obtained active material in distilled water or NMP, irradiation with ultrasonic waves and then suction filtration, may be repeated several times. Finally, the obtained active material is vacuum dried at 170° C. to obtain a powder of the active material.

(Other Components of Negative Electrode Active Material Layer)

The negative electrode active material layer of this embodiment may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably greater than 0 parts by weight and up to 30 parts by weight, more preferably greater than 0 parts by weight and up to 20 parts by weight and even more preferably greater than 0 parts by weight and up to 15 parts by weight, with respect to 100 parts by weight of the negative electrode active material.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 2 parts by weight to 27 parts by weight and even more preferably 3 parts by weight to 25 parts by weight, with respect to 100 parts by weight of the negative electrode active material. If the amount of binder is 1 weight % or greater, adequate electrode strength will be exhibited. If the amount of binder is no greater than 30 parts by weight, a high input/output characteristic will be exhibited without inhibiting movement of lithium ions into the negative electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably 0 parts by weight to 10 parts by weight, with respect to 100 parts by weight of the negative electrode active material. If the amount of dispersion stabilizer is no greater than 10 parts by weight, a high input/output characteristic will be exhibited without inhibiting movement of lithium ions into the negative electrode active material.

[Negative Electrode Power Collector]

The material composing the negative electrode power collector of this embodiment is preferably a metal foil with high electron conductivity, and with resistance to degradation by elution into the electrolytic solution or reaction with the electrolyte or ion. There are no particular restrictions on such metal foils, and examples include aluminum foils, copper foils, nickel foils and stainless-steel foils. The negative electrode power collector in the nonaqueous lithium power storage element of this embodiment is preferably a copper foil.

The metal foil may be a common metal foil having no ruggedness or through-holes, or a metal foil having ruggedness formed by embossing, chemical etching, electrolytic deposition or blasting, or a metal foil having through-holes such as expanded metal, punching metal or etching foil, so long as it is used as a "nonporous negative electrode power collector" as defined above.

The thickness of the negative electrode power collector is not particularly restricted so long as it allows the shape and strength of the negative electrode to be maintained, but 1 to 100 µm, for example, is preferred. Incidentally, when the negative electrode power collector has holes or ruggedness, the thickness of the negative electrode power collector is measured based on the sections where no holes or ruggedness are present.

The ten-point average height of ruggedness $R_{zjis}$ of the negative electrode power collector is preferably 0.01 µm to 30 µm, more preferably 0.1 µm to 20 µm and even more preferably 1 µm to 15 µm. If $R_{zjis}$ is 0.01 µm or greater, the wettability of the coating solution and the adhesiveness with the negative electrode active material layer can be adequately increased. If $R_{zjis}$ is no greater than 30 µm, then the risk of micro-short-circuiting occurring by tearing through the facing separator will be minimal.

The ten-point average height of ruggedness $R_{zjis}$ for this embodiment is determined by the following method, according to JIS B 0601(2001).

First, a straight line for measurement of a cross-section curve (roughness curve) is established at an arbitrary location of the negative electrode power collector. The evaluation length should be at least 5-fold the average length $R_{sm}$ of the elements mentioned below and is preferably about 10-fold to 15-fold $R_{sm}$. If $R_{sm}$ is unknown, a provisional evaluation length is determined, and when the evaluation length is deemed to be insufficient from the obtained $R_{sm}$ value, measurement should be performed again after resetting the measurement line to an appropriate length. Measurement of the cross-section curve can be carried out using a commercially available contact surface measuring apparatus, for example.

The measurement can yield a cross-section curve such as shown in FIG. 3, for example. From the measured cross-section curve, the average length $R_{sm}$ for the elements is calculated, and $R_{sm}$ is used to determine the reference length (cutoff value $\lambda_c$). The ten-point average height of ruggedness $R_{zjis}$ is the value determined by the following formula, where "$L_{+1}$" to "$L_{+5}$" represent 5 coordinate points at heights from the top within the evaluation length, up to the 5th one, and "$L_{-1}$" to "$L_{-5}$" represent 5 coordinate points at heights from the bottom, up to the 5th one.

$$R_{zjis} = \frac{\text{abs}\left\{\sum_{i=1}^{5}(L_{+i})\right\} + \text{abs}\left\{\sum_{i=1}^{5}(L_{-i})\right\}}{5} \quad \text{[Math. 1]}$$

The dashed line $L_{ave}$ in FIG. 3 is the average coordinate on the cross-section curve.

[Production of Negative Electrode]

The negative electrode comprises a negative electrode active material layer on one or both sides of a negative electrode power collector. Typically, the negative electrode active material layer is anchored to one or both sides of the negative electrode power collector.

The negative electrode can be produced by a known electrode production technique for lithium ion batteries or electrical double layer capacitors. The following methods 1) to 3) are examples.

1) Different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the film thickness or bulk density of the negative electrode active material layer.

2) Various materials including negative electrode active materials may be dry-mixed without using a solvent, and the obtained mixture press-molded and then attached to the negative electrode power collector using a conductive adhesive, to obtain a negative electrode.

3) A negative electrode can also be obtained by forming an active material layer on the negative electrode power collector. As the film-forming method, an electroless plating method, electrolytic plating method, chemical reduction method, vacuum vapor deposition method, ion plating method, sputtering method, chemical vapor deposition (CVD) method, laser ablation method or thermal spraying method may be suitably used.

Method 1) is preferred among the negative electrode production methods mentioned above, from the viewpoint of productivity.

The coating solution may also be prepared by dry blending all or a portion of each of the starting materials containing the negative electrode active material, and then adding water or an organic solvent, and/or a liquid or slurry-like substance comprising a binder or dispersion stabilizer dissolved or dispersed in them. The coating solution may also be prepared by adding various starting powders containing the negative electrode active material, to a liquid or slurry-like substance comprising a binder or dispersion stabilizer dissolved or dispersed in water or an organic solvent.

The method of dissolution or dispersion is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and reaggregation will be reduced.

The viscosity ($\eta b$) of the coating solution of the negative electrode is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta b$) of the coating solution of the negative electrode is 1,000 mPa·s or higher, liquid dripping during formation of the coating film will be suppressed, and the coating film width and thickness can be satisfactorily controlled. If the viscosity ($\eta b$) of the coating solution of the negative electrode is no higher than 20,000 mPa·s, there will be less pressure loss in the flow channel of the coating solution when a coating machine is used, allowing the coating solution to be stably coated, and allowing control to less than the prescribed coating film thickness.

The TI value (thixotropy index value) of the coating solution of the negative electrode is preferably 1.1 or greater, more preferably 1.2 or greater and even more preferably 1.5 or greater. If the TI value of the coating solution of the negative electrode is 1.1 or greater, it will be possible to satisfactorily control the coating film width and thickness.

The degree of dispersion, for the purpose of the present specification, is the value determined based on a dispersion evaluation test using a fineness gauge conforming to JIS K5600. Specifically, a sufficient amount of sample is allowed to flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 30° within 3 seconds after the pulling has ended, and the depth at which particles appear in the groove of the fineness gauge is read off.

For the purpose of the present specification, the viscosity ($\eta b$) and TI value are the values determined by the following respective methods. First, an E-type viscometer is used to determine the viscosity ($\eta a$) stabilized after measurement for 2 minutes or longer under conditions with a temperature of 25° C. and a shear rate of 2 s$^{-1}$. Next, the viscosity ($\eta b$) is determined as measured under the same conditions except for changing the shear rate to 20 s$^{-1}$. The viscosity values as obtained above are used to calculate the TI value as: TI value=$\eta a/\eta b$. When increasing the shear rate from 2 s$^{-1}$ to 20 s$^{-1}$, it may be increased in a single stage, or the shear rate may be increased in stages within the range specified above, while appropriately determining the viscosity at each shear rate.

The method of forming a coating film of the negative electrode is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater then stable coating of the coating solution will be possible, and if it is no greater than 100 m/min then coating precision can be adequately ensured.

The method of drying the coating film of the negative electrode is not particularly restricted, and a drying method such as hot air drying or infrared ray (IR) drying may be suitably employed. Drying of the coating film may be drying at a single temperature, or it may be drying while varying the temperature in various stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the negative electrode power collector or negative electrode active material layer.

The method of pressing the negative electrode is not particularly restricted, and a pressing machine such as a hydraulic press or vacuum pressing machine may be suitably used. The film thickness, bulk density and electrode strength of the negative electrode active material layer can be adjusted by the pressing pressure, the gap between the press rolls, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkling will be unlikely to occur in the negative electrode, and adjustment of the negative electrode active material layer film to the desired film thickness and bulk density will be easier.

The gap between the press rolls may be set to a desired value depending on the film thickness of the dried negative electrode, so that the desired film thickness and bulk density of the negative electrode active material layer is obtained.

The pressing speed may also be set to the desired speed, so as to reduce distortion and wrinkling in the negative electrode.

The surface temperature of the pressed portion may be room temperature, or the surface of the pressed portion may be heated instead, if necessary. In the case of heating, the lower limit for the surface temperature of the pressed portion is preferably at least the melting point of the binder minus 60° C., more preferably at least the melting point of the binder minus 45° C., and even more preferably at least the melting point of the binder minus 30° C. The upper limit for the surface temperature of the pressed portion in the case of heating is also preferably no higher than the melting point of the binder used plus 50° C., more preferably no higher than the melting point of the binder plus 30° C., and even more preferably no higher than the melting point of the binder plus 20° C. For example, when PVdF (polyvinylidene fluoride: melting point=150° C.) is used as the binder, heating of the surface of the pressed portion is to preferably between 90° C. and 200° C., more preferably between 105° C. and 180° C. and even more preferably between 120° C. and 170° C. When a styrene-butadiene copolymer (melting point=100° C.) is used as the binder, heating of the surface of the pressed portion is to preferably between 40° C. and 150° C., more preferably between 55° C. and 130° C. and even more preferably between 70° C. and 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the negative electrode active material layer is preferably 5 μm to 100 μm, for each side of the negative electrode power collector. The lower limit for the thickness of the negative electrode active material layer is more preferably 7 μm or greater and even more preferably 10 μm or greater. The upper limit for the thickness of the negative electrode active material layer is more preferably no greater than 80 μm and even more preferably no greater than 60 μm. If the thickness of the negative electrode active material layer is 5 μm or greater, the coatability will be excellent with less tendency to produce streaks during coating of the negative electrode active material layer. If the thickness of the negative electrode active material layer is 100 μm or lower, on the other hand, high energy density can be exhibited by reduction of the cell volume. The thickness of the negative electrode active material layer, when the negative electrode power collector has through-holes or ruggedness, is the mean value of the thickness of the negative electrode active material layer for each side at the sections of the negative electrode power collector without through-holes or ruggedness.

When an alloy-type negative electrode material is used as the negative electrode active material, the film thickness of the negative electrode active material layer is preferably 1 μm to 30 μm for each side, both before pre-doping and after pre-doping of lithium ion, the lower limit being more preferably 2 μm or greater and even more preferably 3 μm or greater, and the upper limit being more preferably no greater than 20 μm and even more preferably no greater than 15 μm. If the film thickness of the negative electrode active material layer is 1 μm or greater, the capacitance of the negative electrode will be sufficiently large with respect to the capacitance of the positive electrode, thus allowing the capacitance of the positive electrode to be adequately utilized. If the film thickness of the negative electrode active material layer is no greater than 30 μm, on the other hand, high energy density can be exhibited by reduction of the cell volume.

The bulk density of the negative electrode active material layer is preferably 0.30 g/cm$^3$ to 1.8 g/cm$^3$, more preferably 0.40 g/cm$^3$ to 1.5 g/cm$^3$ and even more preferably 0.45 g/cm$^3$ to 1.3 g/cm$^3$. If the bulk density of the negative electrode active material layer is 0.30 g/cm$^3$ or greater, sufficient strength can be obtained and sufficient conductivity can be exhibited between the negative electrode active materials. If the bulk density of the negative electrode active material layer is 1.8 g/cm$^3$ or lower, it will be possible to ensure pores through which the ions can be sufficiently diffused in the negative electrode active material layer.

The BET specific surface area, mesopore volume and micropore volume for this embodiment are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mesopore volume by the BJH method, and the micropore volume by the MP method.

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

The MP method is a method in which the "t-plot method" (B. C. Lippens, J. H. de Boer, J. Catalysis, 4319(1965)) is utilized to determine micropore volume, micropore area and micropore distribution, and it is the method proposed by R. S. Mikhail, Brunauer and Bodor (R. S. Mikhail, S. Brunauer, E. E. Bodor, J. Colloid Interface Sci., 26, 45 (1968)).

<Separator>

The positive electrode precursor and negative electrode will usually be laminated or wound via a separator, to form an electrode laminated body comprising a positive electrode precursor, negative electrode and separator.

The separator used may be a polyethylene microporous film or polypropylene microporous film used in lithium ion secondary batteries, or a cellulose nonwoven sheet used in electrical double layer capacitors. A film composed of organic or inorganic microparticles may also be laminated on one or both sides of these separators. Organic or inorganic microparticles may also be included inside a separator.

The thickness of the separator is preferably 5 μm to 35 μm. The thickness of the separator is preferably 5 μm or greater, as this will tend to reduce self-discharge due to internal micro-short-circuting. The thickness of the separator is also preferably no greater than 35 μm, as this will tend to result in a higher output characteristic of the power storage element.

The thickness of a film composed of organic or inorganic microparticles is preferably 1 μm to 10 μm. The thickness of a film composed of organic or inorganic microparticles is preferably 1 μm or greater, as this will tend to reduce self-discharge due to internal micro-short-circuiting. The thickness of a film composed of organic or inorganic microparticles is also preferably no greater than 10 μm, as this will tend to result in a higher output characteristic of the power storage element.

<Casing>

The casing used may be a metal can or laminate film. A metal can is preferably made of aluminum. The laminate film is preferably a laminated film of a metal foil and a resin film, an example of which is a laminate film composed of three layers: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolytic solution housed inside while also providing a melt seal during heat sealing of the casing, and a polyolefin or acid-modified polyolefin may be suitably used.

<Nonaqueous Electrolytic Solution>

The electrolytic solution for this embodiment is a lithium ion-containing nonaqueous electrolytic solution. The nonaqueous electrolytic solution contains a nonaqueous solvent as described below. The nonaqueous electrolytic solution preferably comprises a lithium salt at a concentration of 0.5 mol/L or greater based on the total volume of the nonaqueous electrolytic solution.

The nonaqueous electrolytic solution of this embodiment may use a lithium salt such as $(LiN(SO_2F)_2)$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ or $LiBF_4$, either alone or in mixtures of two more. It also preferably contains $LiPF_6$ and/or $LiN(SO_2F)_2$, since these will allow high conductivity to be exhibited.

It is sufficient if the nonaqueous electrolytic solution of this embodiment comprises at least one type of lithium salt, and it may comprise, in addition to the lithium salt, an alkali metal salt selected from the group consisting of sodium salts, potassium salts, rubidium salts and cesium salts, or an alkaline earth metal salt selected from the group consisting of beryllium salts, magnesium salts, calcium salts, strontium salts and barium salts.

When the nonaqueous electrolytic solution comprises such an alkali metal salt in addition to lithium, since sodium ion, potassium ion, rubidium ion and cesium ion, which have smaller Stokes radii than lithium ion, have high ionic conductance, they can lower the resistance of the nonaqueous lithium power storage element. When the nonaqueous electrolytic solution comprises such an alkaline earth metal salt in addition to lithium, since beryllium ion, magnesium ion, calcium ion, strontium ion and barium ion are divalent cations, they can increase the capacitance of the nonaqueous lithium power storage element.

There are no particular restrictions on the method of adding an alkali metal salt other than a lithium salt and/or an alkaline earth metal salt to the nonaqueous electrolytic solution in addition to a lithium salt, but the method may be pre-dissolving the lithium salt and an alkali metal salt other than a lithium salt and/or an alkaline earth metal salt in the nonaqueous electrolytic solution, or adding one or more selected from the group consisting of compounds of the following formulas:

carbonates such as $M_2CO_3$,
oxides such as $M_2O$,
hydroxides such as MOH,
halides such as MF or MCl,
oxalates such as $M_2(CO_2)_2$, and
carboxylates such as RCOOM (where R is H, an alkyl group or an aryl group),
where M is one or more selected from among Na, K, Rb and Cs,
alkaline earth metal carbonates selected from among $BeCO_3$, $MgCO_3$, $CaCO_3$, $SrCO_3$ and $BaCO_3$, and
alkaline earth metal oxides, alkaline earth metal hydroxides, alkaline earth metal halides, alkaline earth metal oxalates and alkaline earth metal carboxylates, to the positive electrode precursor and decomposing them during the lithium doping step described below.

The lithium salt concentration in the nonaqueous electrolytic solution is preferably 0.5 mol/L or greater, and more preferably in the range of 0.5 to 2.0 mol/L. If the lithium salt concentration is 0.5 mol/L or greater, anions will be sufficiently present to allow sufficiently high-power storage element capacitance. The lithium salt concentration is preferably 2.0 mol/L or lower, because this can prevent precipitation of the undissolved lithium salt in the nonaqueous electrolytic solution and prevent the viscosity of the electrolytic solution from becoming too high and will avoid lowering the conductivity or reducing the output characteristic as well.

When an alkali metal salt other than a lithium salt and/or an alkaline earth metal salt is to be added to the nonaqueous electrolytic solution, the total value of their salt concentrations is preferably 0.5 mol/L or greater and more preferably in the range of 0.5 to 2.0 mol/L.

The nonaqueous electrolytic solution of this embodiment preferably comprises a cyclic carbonate and linear carbonate as nonaqueous solvents. If the nonaqueous electrolytic solution comprises a cyclic carbonate and a linear carbonate, this is advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, ethylmethyl carbonate, dipropyl carbonate and dibutyl carbonate. A dialkyl carbonate compound will typically be unsubstituted.

The total content of the cyclic carbonate and linear carbonate is preferably 50 weights % or greater and more preferably 65 weights % or greater, and preferably no greater than 95 weights % and more preferably no greater than 90 weights %, based on the total weight of the nonaqueous electrolytic solution. If the total content of the cyclic carbonate and linear carbonate is 50 weights % or greater it will be possible to dissolve the desired concentration of lithium salt, allowing high lithium ion conductivity to be exhibited. If the total concentration of the cyclic carbonate and linear carbonate is no greater than 95 weight %, the electrolytic solution will be able to further comprise the additives mentioned below.

The nonaqueous electrolytic solution of this embodiment may also further comprise additives. The additives are not particularly restricted, and for example, they include sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

Examples of sultone compounds include sultone compounds represented by the following formulas (4) to (6). Such sultone compounds can be used alone or in mixtures of two or more.

[Chem. 1]

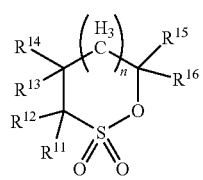

(4)

{In formula (4), $R^{11}$ to $R^{16}$ represent hydrogen atoms, halogen atoms, alkyl groups of 1 to 12 carbon atoms or halogenated alkyl groups of 1 to 12 carbon atoms and may be the same or different; and n is an integer of 0 to 3.}

[Chem. 2]

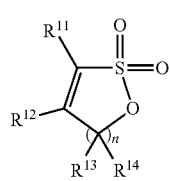

(5)

{In formula (5), $R^{11}$ to $R^{14}$ represent hydrogen atoms, halogen atoms, alkyl groups of 1 to 12 carbon atoms or halogenated alkyl groups of 1 to 12 carbon atoms and may be the same or different; and n is an integer of 0 to 3.}

[Chem. 3]

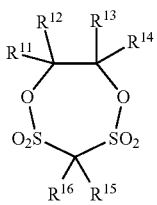

(6)

{In formula (6), $R^{11}$ to $R^{16}$ represent hydrogen atoms, halogen atoms, alkyl groups of 1 to 12 carbon atoms or halogenated alkyl groups of 1 to 12 carbon atoms and may be the same or different.}

For this embodiment, from the viewpoint of minimal adverse effect on resistance, and reducing decomposition of the nonaqueous electrolytic solution at high temperature to minimize gas generation, sultone compounds represented by formula (4) are preferably 1,3-propanesultone, 2,4-butanesultone, 1,4-butanesultone, 1,3-butanesultone and 2,4-pentanesultone; sultone compounds represented by formula (5) are preferably 1,3-propenesultone and 1,4-butenesultone; sultone compounds represented by formula (6) are preferably 1,5,2,4-dioxadithiepane 2,2,4,4-tetraoxide; and other sultone compounds are preferably methylenebis(benzenesulfonic acid), methylenebis(phenylmethanesulfonic acid), methylenebis(ethanesulfonic acid), methylenebis(2,4,6, trimethylbenzenesulfonic acid) and methylenebis(2-trifluoromethylbenzenesulfonic acid), with one or more selected from among these groups being preferred.

The total content of sultone compounds in the nonaqueous electrolytic solution of the nonaqueous lithium power storage element of this embodiment is preferably 0.5 weight % to 15 weight %, based on the total weight of the nonaqueous electrolytic solution. If the total content of sultone compounds in the nonaqueous electrolytic solution is 0.5 weight % or greater, it will be possible to suppress decomposition of the nonaqueous electrolytic solution at elevated temperature and to reduce gas generation. If the total content of sultone compounds is no greater than 15 weight %, on the other hand, it will be possible to lower the ionic conductance of the nonaqueous electrolytic solution, and to maintain a high input/output characteristic. The total content of sultone compounds in the nonaqueous electrolytic solution of the nonaqueous lithium power storage element is preferably 1 weight % to 10 weights % and more preferably 3 weights % to 8 weights %, from the viewpoint of obtaining both a high input/output characteristic and high durability.

Examples of cyclic phosphazenes include ethoxypentafluorocyclotriphosphazene, diethoxytetrafluorocyclotriphosphazene and phenoxypentafluorocyclotriphosphazene, and preferably one or more selected from these groups is used.

The content of the cyclic phosphazene in the nonaqueous electrolytic solution is preferably 0.5 weight % to 20 weights % based on the total weight of the nonaqueous electrolytic solution. If the cyclic phosphazene content is 0.5 weights % or greater, it will be possible to minimize decomposition of the nonaqueous electrolytic solution at elevated temperature and to reduce gas generation. If the cyclic phosphazene content is no greater than 20 weights %, it will be possible to lower the ionic conductance of the nonaqueous electrolytic solution, and to maintain a high input/output characteristic. For these reasons, the cyclic phosphazene content is preferably 2 weights % to 15 weights % and more preferably 4 weights % to 12 weights %.

These cyclic phosphazenes may be used alone, or two or more may be used in admixture.

Examples of acyclic fluoroethers include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, among which $HCF_2CF_2OCH_2CF_2CF_2H$ is preferred from the viewpoint of electrochemical stability.

The content of the acyclic fluoroether is preferably 0.5 weight % to 15 weight %, and more preferably 1 weight % to 10 weight %, based on the total weight of the nonaqueous electrolytic solution. If the acyclic fluoroether content is 0.5 weights % or higher, the stability of the nonaqueous electrolytic solution against oxidative decomposition will be increased and a nonaqueous lithium power storage element with high durability during elevated temperature will be obtained. If the acyclic fluoroether content is 15 weights % or lower, on the other hand, the electrolyte salt solubility will be kept satisfactory and high ionic conductance of the nonaqueous electrolytic solution will be maintained, thus allowing a high input/output characteristic to be exhibited.

The acyclic fluoroether used may be a single type or a mixture of two or more types.

A fluorinated cyclic carbonate is preferably at least one selected from the group consisting of fluoroethylene carbonate (FEC) and difluoroethylene carbonate (dFEC), from the viewpoint of compatibility with other nonaqueous solvents.

The content of the fluorinated cyclic carbonate is preferably 0.5 weight % to 10 weight %, and more preferably 1 weight % to 5 weight %, with respect to the total weight of the nonaqueous electrolytic solution. If the fluorinated cyclic carbonate is 0.5 weight % or higher, it will be possible to form a satisfactory coating film on the negative electrode, and reductive decomposition of the nonaqueous electrolytic solution on the negative electrode will be minimized, to obtain a nonaqueous lithium power storage element with high durability at elevated temperature. If the fluorinated cyclic carbonate content is 10 weights % or lower, on the other hand, the electrolyte salt solubility will be kept satisfactory and high ionic conductance of the nonaqueous electrolytic solution will be maintained, thus allowing a high input/output characteristic to be exhibited.

A fluorinated cyclic carbonate may be used alone, or two or more may be used as a mixture.

The cyclic carbonate is preferably vinylene carbonate. The cyclic carbonate content is preferably 0.5 weights % to 10 weights % and more preferably 1 weight % to 5 weights %, with respect to the total weight of the nonaqueous electrolytic solution. If the cyclic carbonate content is 0.5 weight % or higher, it will be possible to form a satisfactory coating film on the negative electrode, and reductive decomposition of the nonaqueous electrolytic solution on the negative electrode will be suppressed, to obtain a nonaqueous lithium power storage element with high durability at high temperature. If the cyclic carbonate content is 10 weights % or lower, on the other hand, the electrolyte salt solubility will be kept satisfactory and high ionic conductance of the nonaqueous electrolytic solution will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic due to improved lithium ion dissociation.

The cyclic carboxylate content is preferably 0.5 weights % to 15 weights % and more preferably 1 weight % to 5 weight %, with respect to the total weight of the nonaqueous electrolytic solution. If the cyclic carboxylate content is 0.5 weight % or higher, it will be possible to form a satisfactory coating film on the negative electrode, and reductive decomposition of the nonaqueous electrolytic solution on the negative electrode will be suppressed, to obtain a nonaqueous lithium power storage element with high durability at elevated temperature. If the cyclic carboxylate content is 15 weights % or lower, the electrolyte salt solubility will be kept satisfactory and high ionic conductance of the nonaqueous electrolytic solution will be maintained, thus allowing a high input/output characteristic to be exhibited.

A cyclic carboxylate may be used alone, or two or more may be used in admixture.

The cyclic acid anhydride is preferably one or more selected from the group consisting of succinic anhydride, maleic anhydride, citraconic anhydride and itaconic anhydride. Succinic anhydride and maleic anhydride are preferred from the viewpoint of ready industrial availability to reduce production cost of the nonaqueous electrolytic solution, and from the viewpoint of easier dissolution in the nonaqueous electrolytic solution.

The content of the cyclic acid anhydride is preferably 0.5 weight % to 15 weight %, and more preferably 1 weight % to 10 weight %, with respect to the total weight of the nonaqueous electrolytic solution. If the cyclic acid anhydride content is 0.5 weights % or higher, it will be possible to form a satisfactory coating film on the negative electrode, and reductive decomposition of the nonaqueous electrolytic solution on the negative electrode will be suppressed, to obtain a nonaqueous lithium power storage element with high durability during periods of elevated temperature. If the cyclic acid anhydride content is 15 weights % or lower, the electrolyte salt solubility will be kept satisfactory and high ionic conductance of the nonaqueous electrolytic solution will be maintained, thus allowing a high input/output characteristic to be exhibited.

These cyclic acid anhydrides may be used alone, or two or more may be used in admixture.

<Method for Producing Nonaqueous Lithium Power Storage Element>

[Assembly Step]

In the assembly step according to one embodiment, for example, a positive electrode terminal and negative electrode terminal are connected to a laminated body formed by laminating a positive electrode precursor and negative electrode cut into the shape of a sheet, via a separator, to fabricate an electrode laminated body. According to another embodiment, a positive electrode terminal and negative electrode terminal are connected to a wound body formed by laminating or winding a positive electrode precursor and negative electrode via a separator, to fabricate a wound electrode. The shape of the wound electrode may be cylindrical or flat.

The method of connecting the positive electrode terminal and negative electrode terminal is not particularly restricted, and a method such as resistance welding or ultrasonic welding may be employed.

The terminal-connected electrode laminate body or wound electrode is preferably dried to remove the residual solvent. The drying method is not restricted and drying may be carried out by vacuum drying or the like. The residual solvent is preferably no greater than 1.5 weight % per total weight of the positive electrode active material layer or negative electrode active material layer. It is not preferred if the residual solvent is greater than 1.5 weight %, because the solvent will remain in the system and impair the self-discharge property.

The dried electrode laminated body or wound electrode is preferably housed in a casing, which is typically a metal can or laminate film, in a dry environment with a dew point of no higher than −40° C., and is preferably sealed, leaving only one of the openings for filling of the nonaqueous electrolytic solution. It is not preferred if the dew point is higher than −40° C., because moisture will adhere to the electrode laminated body or wound electrode, often resulting in residue of water in the system and impairing the self-discharge property. The method of sealing the casing is not particularly restricted, and a method such as heat sealing or impulse sealing may be employed.

[Filling, Impregnation and Sealing Step]

After the assembly step, the electrode laminated body housed in the casing is filled with the nonaqueous electrolytic solution. After filling, impregnation is again carried out and the positive electrode, negative electrode and separator are preferably thoroughly wetted with the nonaqueous electrolytic solution. If the electrolytic solution has not wetted at least a portion of the positive electrode precursor, negative electrode and separator, then in the lithium doping step described below, lithium doping will proceed in a non-uniform manner, resulting in increased resistance or lower durability of the obtained nonaqueous lithium power storage element. The method of impregnation is not particularly restricted, and for example, the method used may be setting the filled electrode laminated body in a pressure reduction chamber with the casing in an opened state, using a vacuum pump to bring the interior of the chamber to a reduced pressure state, and then restoring it to atmospheric pressure. After impregnation, the electrode laminated body with the casing in an open state may be closed by sealing while under reduced pressure.

[Lithium Doping Step]

In the lithium doping step, preferably a voltage is applied between the positive electrode precursor and the negative electrode, thereby decomposing the lithium compound in the positive electrode precursor and releasing lithium ions and reducing the lithium ions at the negative electrode so that the negative electrode active material layer is pre-doped with lithium ions.

During the lithium doping step, gas such as $CO_2$ is generated with oxidative decomposition of the lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

[Aging Step]

After the lithium doping step, the electrode laminated body is preferably subjected to aging. In the aging step, the solvent in the electrolytic solution is decomposed at the negative electrode, and a lithium ion-permeable solid polymer coating film is formed on the negative electrode surface.

The method of aging is not particularly restricted, and for example, a method of reacting the solvent in the electrolytic solution in a high-temperature environment may be used.

[Degassing Step]

After the aging step, preferably degassing is further carried out to reliably remove the gas remaining in the electrolytic solution, positive electrode and negative electrode. Any gas remaining in at least portions of the electrolytic solution, positive electrode and negative electrode will interfere with ion conduction, thus increasing the resistance of the obtained nonaqueous lithium power storage element.

The method of degassing is not particularly restricted, and for example, the method used may be setting the electrode laminated body in a pressure reduction chamber with the casing in an opened state and using a vacuum pump to bring the interior of the chamber to a reduced pressure state. After degassing, the casing may be sealed to close the casing and fabricate a nonaqueous lithium power storage element.

<Suppression of Thermal Runaway During Internal Short Circuiting: Positive Electrode and Negative Electrode Design 1>

When internal short circuiting is induced, by a nail-penetration test or the like, the nonaqueous lithium power storage element undergoes drastically increased temperature and gas generation, a phenomenon commonly known as "thermal runaway". While the mechanism of thermal runaway is not completely understood, it is believed that internal short circuiting causes flow of a high current and heat release at the short circuited sections (the Joule heat J is expressed as $J=I^2R$, with I as the short-circuit current and R as the resistance of the short circuited pathway), and accelerated reaction between the lithium ion-pre-doped, low-voltage-state negative electrode or lithium ion and the nonaqueous electrolytic solution, due to the Joule heat. Consequently, if the short-circuit current I can be lowered, it is possible to significantly suppress Joule heat proportionally to the square of I, and to suppress thermal runaway.

Here, thermal runaway during internal short circuiting can be suppressed if $C_{x1}/C_{y1}$ is 0.85 to 1.15, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side), $A_{x1}/A_{y1}$ is 0.85 to 1.15, and $(A_{x1}+C_{x1})/(A_{y1}+C_{y1})$ is 0.80 to 1.20, where $A_{y1}$ (g/m$^2$) is the basis weight of the negative electrode active material layer of one side ($A_y$ side) of the negative electrode that is facing the $C_y$ side, and $A_{x1}$ (g/m$^2$) is the basis weight of the negative electrode active material layer on the other side ($A_x$ side), and $C_{x2}$ and $C_{y2}$ are each 0.1 to 18, and $C_{y2}/C_{x2}$ as well as $C_{x2}/C_{y2}$ are each 0.60 to 1.70, where $C_{x2}$ (g/m$^2$) is the amount of lithium compound per area on the $C_x$ side and $C_{y2}$ (g/m$^2$) is the amount of lithium compound per area on the $C_y$ side. When the electrode laminated body is composed of a plurality of positive electrodes and negative electrodes, it is sufficient if at least one combination of positive electrode and negative electrode in the electrode laminated body satisfies $C_{x1}/C_{y1}$=0.85 to 1.15, $A_{x1}/A_{y1}$=0.85 to 1.15, $(A_{x1}+C_{x1})/(A_{y1}+C_{y1})$=0.80 to 1.20, and $C_{y2}/C_{x2}$ as well as $C_{x2}/C_{y2=0.60}$ to 1.70. If $C_{x2}$ and $C_{y2}$ are 0.1 or greater, decomposition of the lithium compound in the positive electrode active material layer and gas generation during internal short circuiting will increase the resistance, and the short-circuit current I can be reduced. If $C_{x2}$ and $C_{y2}$ are no greater than 18, electron conduction between the positive electrode active materials will be ensured and therefore the resistance can be reduced. If $C_{y2}/C_{x2}$ and $C_{x2}/C_{y2}$ are 0.60 to 1.70, this means that the lithium compound is present in a uniform manner on both sides of the positive electrode power collector, and thus the lithium compound will decompose during internal short circuiting and allow thermal runaway to be suppressed.

A $C_{x1}/C_{y1}$ value of 0.85 to 1.15 means low variation in the basis weight of the positive electrode active material layer coated onto both sides of the positive electrode power collector, a $A_{x1}/A_{y1}$ value of 0.85 to 1.15 means low variation in the basis weight of the positive electrode active material layer coated onto both sides of the negative electrode power collector, and a $(A_{x1}+C_{x1})/(A_{y1}+C_{y1})$ value of 0.80 to 1.20 means low variation in the basis weight of the facing positive electrode active material layer and negative electrode active material layer. In other words, satisfying these conditions reduces variation in the short-circuit current at each electrode during internal short circuiting. If the conditions are not satisfied, local sections without short-circuit current flow will be formed, resulting in local heat release and presumably causing thermal runaway originating from those sections.

$C_{x1}$ and $C_{y1}$ are each preferably 5 to 100 and more preferably 10 to 50. If $C_{x1}$ and $C_{y1}$ are 5 or greater it will be possible to increase the energy density. If $C_{x1}$ and $C_{y1}$ are no greater than 100, the output characteristic will be excellent. Also, $A_{x1}$ and $A_{y1}$ are each preferably 5 to 100 and more preferably 10 to 50. If $A_{x1}$ and $A_{y1}$ are 5 or greater it will be possible to increase the energy density. If $A_{x1}$ and $A_{y1}$ are no greater than 100, the output characteristic will be excellent.

Moreover, $(C_{x1}+C_{x2}+A_{y1})/(C_{y1}+C_{y2}+A_{x1})$ is preferably 0.70 to 1.30 and more preferably 0.80 to 1.20. A $(C_{x1}+C_{x2}+A_{y1})/(C_{y1}+C_{y2}+A_{x1})$ value of 0.70 to 1.30 means low variation in the basis weight of the non-facing positive electrode active material layer and negative electrode active material layer. In other words, satisfying this condition further reduces variation in the short-circuit current at each electrode during internal short circuiting.

The dispersed state of lithium carbonate in the positive electrode active material layer can be evaluated by microscopic Raman spectroscopy, and preferably $S_x$ and $S_y$ are each 1 to 40 and $S_x/S_y$ is 0.50 to 1.50, where $S_x$ % is the area of carbonate ion mapping in an image obtained by microscopic Raman spectroscopy on the $C_x$ side, and $S_y$ % is the area of carbonate ion mapping in an image obtained by microscopic Raman spectroscopy on the $C_y$ side. If $S_x/S_y$ is less than 0.50 or $S_x/S_y$ is greater than 1.50, the amount of lithium compound that decomposes during internal short circuiting will be reduced on one of the sides of the positive electrode active material layer coated onto both sides of the positive electrode power collector, thus making it possible to suppress thermal runaway.

<Suppression of Lithium Compound Decomposition Under High-temperature Environmental Conditions: Deposition on Positive Electrode or Negative Electrode>

The positive electrode of this embodiment contains one or more compounds represented by the following formulas (1) to (3):

$$LiX^1—OR^1O—X^2Li \quad (1)$$

{where $R^1$ is an alkylene group of 1 to 4 carbon atoms or a halogenated alkylene group of 1 to 4 carbon atoms, and $X^1$ and $X^2$ respectively and independently represent —(COO)$_n$ (where n is 0 or 1)}, $$LiX^1—OR^1O—X^2R^2 \quad (2)$$

{where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —(COO)$_n$ (where n is 0 or 1)}, and $$R^2X^1—OR^1O—X^2R^3 \quad (3)$$

{where $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —(COO)$_n$ (where n is 0 or 1)},
at preferably $1.60\times10^{-4}$ mol/g to $300\times10^{-4}$ mol/g and more preferably $5.0\times10^{-4}$ mol/g to $150\times10^{-4}$ mol/g, per unit weight of the positive electrode active material layer.

The $C_y$ side of the positive electrode active material layer as explained above may contain one or more selected from the group consisting of compounds represented by formulas (1) to (3). If $C_{y3}$ (mol/g) is the content of compounds represented by formulas (1) to (3) per unit weight of the positive electrode active material layer $C_y$ side, then $C_{y3}$ is preferably $1.60\times10^{-4}$ to $300\times10^{-4}$, and more preferably $5.0\times10^{-4}$ mol/g to $150\times10^{-4}$.

Although it is possible to suppress resistance increase during high-load charge/discharge cycling by including a lithium compound on the $C_y$ side, the lithium compound also gradually decomposes when exposed to a high-temperature, high-voltage environment, resulting in gas generation. Consequently, by including a compound represented by formulas (1) to (3) on the $C_y$ side, it is possible to suppress decomposition of lithium compound in high-temperature, high-voltage environment conditions. If $C_{y3}$ is $1.60\times10^{-4}$ or greater, the high-temperature durability will be excellent. If $C_{y3}$ is no greater than $300\times10^{-4}$, the output characteristic will be excellent.

Particularly preferred compounds of formula (1) are the compounds represented by $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$.

Particularly preferred compounds of formula (2) are the compounds represented by $LiOC_2H_4OH$, $LiOC_3H_6OH$, $LiOC_2H_4OCOOH$, $LiOC_3H_6OCOOH$, $LiOCOOC_2H_4OCOOH$, $LiOCOOC_3H_6OCOOH$, $LiOC_2H_4OCH_3$, $LiOC_3H_6OCH_3$, $LiOC_2H_4OCOOCH_3$, $LiOC_3H_6OCOOCH_3$, $LiOCOOC_2H_4OCOOCH_3$, $LiOCOOC_3H_6OCOOCH_3$, $LiOC_2H_4OC_2H_5$, $LiOC_3H_6OC_2H_5$, $LiOC_2H_4OCOOC_2H_5$, $LiOC_3H_6OCOOC_2H_5$, $LiOCOOC_2H_4OCOOC_2H_5$ and $LiOCOOC_3H_6OCOOC_2H_5$.

Particularly preferred compounds of formula (3) are the compounds represented by $HOC_2H_4OH$, $HOC_3H_6OH$, $HOC_2H_4OCOOH$, $HOC_3H_6OCOOH$, $HOCOOC_2H_4OCOOH$, $HOCOOC_3H_6OCOOH$, HOC$_2$H$_4$OCH$_3$, HOC$_3$H$_6$OCH$_3$, HOC$_2$H$_4$OCOOCH$_3$, HOC$_3$H$_6$OCOOCH$_3$, HOCOOC$_2$H$_4$OCOOCH$_3$, HOCOOC$_3$H$_6$OCOOCH$_3$, HOC$_2$H$_4$OC$_2$H$_5$, HOC$_3$H$_6$OC$_2$H$_5$, HOC$_2$H$_4$OCOOC$_2$H$_5$, HOC$_3$H$_6$OCOOC$_2$H$_5$, HOCOOC$_2$H$_4$OCOOC$_2$H$_5$, HOCOOC$_3$H$_6$OCOOC$_2$H$_5$, CH$_3$OC$_2$H$_4$OCH$_3$, CH$_3$OC$_3$H$_6$OCH$_3$, CH$_3$OC$_2$H$_4$OCOOCH$_3$, CH$_3$OC$_3$H$_6$OCOOCH$_3$, CH$_3$OCOOC$_2$H$_4$OCOOCH$_3$, CH$_3$OCOOC$_3$H$_6$OCOOCH$_3$, CH$_3$OC$_2$H$_4$OC$_2$H$_5$, CH$_3$OC$_3$H$_6$OC$_2$H$_5$, CH$_3$OC$_2$H$_4$OCOOC$_2$H$_5$, CH$_3$OC$_3$H$_6$OCOOC$_2$H$_5$, CH$_3$OCOOC$_2$H$_4$OCOOC$_2$H$_5$, CH$_3$OCOOC$_3$H$_6$OCOOC$_2$H$_5$, C$_2$H$_5$OC$_2$H$_4$OC$_2$H$_5$, C$_2$H$_5$OC$_3$H$_6$OC$_2$H$_5$, C$_2$H$_5$OC$_2$H$_4$OCOOC$_2$H$_5$, C$_2$H$_5$OC$_3$H$_6$OCOOC$_2$H$_5$, C$_2$H$_5$OCOOC$_2$H$_4$OCOOC$_2$H$_5$ and C$_2$H$_5$OCOOC$_3$H$_6$OCOOC$_2$H$_5$.

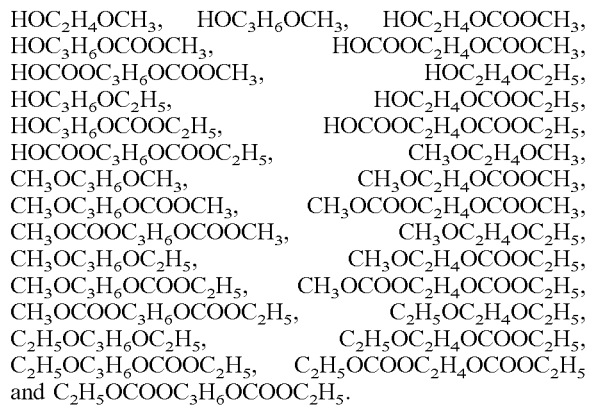

Examples of methods for adding a compound represented by formulas (1) to (3) into the positive electrode active material layer include a method of mixing the compound into the positive electrode active material layer, a method of adsorbing the compound onto the positive electrode active material layer, and a method of electrochemically depositing the compound on the positive electrode active material layer. Preferred among these is a method of adding precursors that can decompose in the nonaqueous electrolytic solution to produce the compounds and utilizing decomposition reaction of the precursor in the step of fabricating the power storage element, to accumulate the compounds in the positive electrode active material layer.

As precursors that form compounds represented by formulas (1) to (3) it is preferred to use one or more organic solvents selected from the group consisting of ethylene carbonate, propylene carbonate, butylene carbonate, vinylene carbonate and fluoroethylene carbonate, with ethylene carbonate and propylene carbonate being more preferred for use.

When a compound represented by formulas (1) to (3) is added to the $A_y$ side of the negative electrode active material layer facing the $C_y$ side, preferably $C_{y3}/A_{y3}$ is 0.2 to 20, where $A_{y3}$ (mol/g) is its content. If $C_{y3}/A_{y3}$ is 0.2 or greater, decomposition of the lithium compound on the $C_y$ side can be suppressed, and the high-temperature durability will be excellent. If $C_{y3}/A_{y3}$ is no greater than 20, the output characteristic will be excellent.

<Suppression of Thermal Runaway During Internal Short Circuiting: Positive Electrode and Negative Electrode Design 2>

As a design against thermal runaway due to internal short circuiting of the nonaqueous lithium power storage element, it was found that by designing the negative electrode so that the negative electrode is disposed on the outermost layer of the electrode laminated body, the negative electrode on the outermost layer has the $A_w$ side of the negative electrode active material layer which does not face a positive electrode as the outermost side of the laminated body, and $A_{w1}/A_{z1}$ is in the range of 0.01 to 0.45, where $A_{w1}$ (mAh/m$^2$) is the amount of lithium ions per area on the $A_w$ side, the $A_z$ side is the negative electrode active material layer on the back side of the $A_w$ side, and $A_{z1}$ (mAh/m$^2$) is the amount of lithium ions per area on the $A_z$ side, it is possible to achieve both suppression of thermal runaway due to internal short circuiting and also lower resistance. In other words, by lowering the amount of lithium ions on the $A_w$ side that does not contribute to charge/discharge, it is possible to suppress thermal runaway of the nonaqueous lithium power storage element by increased negative electrode potential during internal short circuiting, and by increasing the amount of lithium ions on the $A_z$ side that does contribute to charge/discharge, it is possible to lower the resistance of the nonaqueous lithium power storage element.

If $A_{w1}/A_{z1}$ is 0.01 or greater, the negative electrode potential on the outermost layer of the electrode laminated body will fall, and the capacitance will thus be increased. If $A_{w1}/A_{z1}$ is no greater than 0.45, it will be possible to suppress thermal runaway during internal short circuiting.

From these viewpoints, the negative electrode provided on at least the outermost layer is preferably composed of a nonporous negative electrode power collector. Since lithium ions cannot diffuse on the front and back of the negative electrode, the amounts of lithium ions on the $A_w$ side and $A_z$ side can be controlled.

For an effect of suppressing thermal runaway during internal short circuiting it is sufficient if a negative electrode active material layer $A_w$ side that is not facing a positive electrode is on the outermost layer of the electrode laminated body, and therefore it is sufficient if a negative electrode having an $A_w$ side is present on all or a portion of the outermost layer of the electrode laminated body, and a portion of the outermost layer may be a positive electrode, or the electrode laminated body may be covered with a separator or the like.

The method for reducing the amount of lithium ions on the $A_w$ side compared to the $A_z$ size is not particularly restricted, and there may be mentioned a method of pre-doping by contacting only the $A_z$ side with lithium metal, and a method of pre-doping on the $A_z$ size by oxidation-reduction reaction of lithium compound on the $C_z$ side facing the $A_z$ size.

The ratio $A_{w2}/A_{z2}$ is preferably 0.85 to 1.15, where $A_{w2}$ (g/m$^2$) is the amount of active material per area on the $A_w$ side, and $A_{z2}$ (g/m$^2$) is the amount of active material per area on the $A_z$ side. If $A_{w2}/A_{z2}$ is 0.85 or greater, the degree of rise in the negative electrode potential during internal short circuiting can be increased, thereby allowing thermal runaway to be suppressed. If $A_{w2}/A_{z2}$ is no greater than 1.15, the negative electrode potential on the outermost layer of the electrode laminated body will fall, and the capacitance will thus be increased.

Preferably, the amount of active material $C_{z1}$ (g/m$^2$) per area on the $C_z$ side is 10 to 50, the amount of lithium compound $C_{z2}$ (g/m$^2$) per area on the $C_z$ side is 0.1 to 18.0, and $C_{z2}/C_{z1}$ is 0.03 to 0.5, where the $C_z$ side is the positive electrode active material layer facing the $A_z$ side.

If the positive electrode active material includes lithium compound, then the fluorine ions generated during high-load charge/discharge cycling can be trapped by the lithium compound, thereby allowing resistance increase during high-load charge/discharge cycling to be suppressed. However, since the lithium compound has virtually no electron conductivity, its excessive presence in the positive electrode active material results in increased resistance. By designing $C_{z1}$ and $C_{z2}$ to the values specified above, it is possible to achieve both increased resistance during high-load charge/discharge cycling, and lower resistance.

The dispersed state of lithium carbonate in the positive electrode active material layer can be evaluated by microscopic Raman spectroscopy, and preferably $S_z$ is 1 to 40, where $S_z$ % is the area ratio of carbonate ion mapping in an image obtained by microscopic Raman spectroscopy on the $C_z$ side. If $S_z$ is 1 or greater, lithium compound on the $C_z$ size will be in a uniformly dispersed state, thereby allowing resistance increase during high-load charge/discharge cycling to be suppressed. If $S_z$ is no greater than 40, electron conduction between the positive electrode active materials can be ensured, allowing lower resistance to be obtained.

The $C_z$ side of the positive electrode active material layer preferably contains one or more compounds represented by formulas (1) to (3). If $C_{z3}$ (mol/g) is the content of compounds represented by formulas (1) to (3) per unit weight of the positive electrode material layer $C_z$ side, then $C_{z3}$ is preferably $1.60 \times 10^{-4}$ to $300 \times 10^{-4}$, and more preferably $5.0 \times 10^{-4}$ mol/g to $150 \times 10^{-4}$.

Although it is possible to suppress resistance increase during high-load charge/discharge cycling by including a lithium compound on the $C_z$ side, the lithium compound also gradually decomposes when exposed to a high-temperature, high-voltage environment, resulting in gas generation. Consequently, by including a compound represented by formulas (1) to (3) on the $C_z$ side, it is possible to suppress decomposition of lithium compound in high-temperature, high-voltage environment conditions. If $C_{z3}$ is $1.60 \times 10^{-4}$ or greater, the high-temperature durability will be excellent. If $C_{z3}$ is no greater than $300 \times 10^{-4}$, the output characteristic will be excellent.

Examples of methods for adding a compound represented by formulas (1) to (3) into the positive electrode active material layer include a method of mixing the compound into the positive electrode active material layer, a method of adsorbing the compound onto the positive electrode active material layer, and a method of electrochemically depositing the compound in the positive electrode active material layer. Preferred among these is a method of adding precursors that can decompose in the nonaqueous electrolytic solution to produce the compounds and utilizing decomposition reaction of the precursor in the step of fabricating the power storage element, to accumulate the compounds in the positive electrode active material layer.

As precursors that form compounds represented by formulas (1) to (3) it is preferred to use one or more organic solvents selected from the group consisting of ethylene carbonate, propylene carbonate, butylene carbonate, vinylene carbonate and fluoroethylene carbonate, with ethylene carbonate and propylene carbonate being more preferred for use.

When a compound represented by formulas (1) to (3) is added to the $A_z$ side of the negative electrode active material layer facing the $C_z$ side, preferably $C_{z3}/A_{z3}$ is 0.2 to 20, where $A_{z3}$ (mol/g) is its content. If $C_{z3}/A_{z3}$ is 0.2 or greater, decomposition of the lithium compound on the $C_z$ side can be suppressed, and the high-temperature durability will be excellent. If $C_{z3}/A_{z3}$ is no greater than 20, then the output characteristic will be excellent.

As explained for positive electrode and negative electrode designs 1 and 2, since $C_{x1}/C_{y1}$, $A_{x1}/A_{y1}$ and $(A_{x1}+C_{x1})/(A_{y1}+C_{y1})$, $C_{x2}$ and $C_{y2}$ and $C_{y2}/C_{x2}$ and $C_{x2}/C_{y2}$ are in correlation, they may be used in the preferred numerical range combinations of the following I to III.

Preferred Combination I:
$0.86 \leq C_{x1}/C_{y1} \leq 1.14$
$0.86 \leq A_{x1}/A_{y1} \leq 1.14$
$0.90 \leq (A_{x1}+C_{x1})/(A_{y1}+C_{y1}) \leq 1.10$
$2.1 \leq C_{x2}$ (g/m$^2$) $\leq 16.6$
$2.0 \leq C_{y2}$ (g/m$^2$) $\leq 16.0$
$0.61 \leq C_{y2}/C_{x2} \leq 1.39$
$0.72 \leq C_{x2}/C_{y2} \leq 1.64$ Preferred Combination II:
$0.86 \leq C_{x1}/C_{y1} \leq 1.14$
$0.85 \leq A_{x1}/A_{y1} \leq 1.15$
$0.80 \leq (A_{x1}+C_{x1})/(A_{y1}+C_{y1}) \leq 1.20$
$2.1 \leq C_{x2}$ (g/m$^2$) $\leq 16.6$
$2.0 \leq C_{y2}$ (g/m$^2$) $\leq 16.0$
$0.61 \leq C_{y2}/C_{x2} \leq 1.39$
$0.72 \leq C_{x2}/C_{y2} \leq 1.64$ Preferred Combination III:
$0.85 \leq C_{x1}/C_{y1} \leq 1.15$
$0.86 \leq A_{x1}/A_{y1} \leq 1.14$
$0.90 \leq (A_{x1}+C_{x1})/(A_{y1}+C_{y1}) \leq 1.10$
$0.1 \leq C_{x2}$ (g/m$^2$) $\leq 18$
$0.1 \leq C_{y2}$ (g/m$^2$) $\leq 18$
$0.60 \leq C_{y2}/C_{x2} \leq 1.70$
$0.60 \leq C_{x2}/C_{y2} \leq 1.70$ <Evaluation of Properties of Nonaqueous Lithium Power Storage Elements>

[Electrostatic Capacitance]

Throughout the present specification, the electrostatic capacitance Fa (F) is the value obtained by the following method.

First, in a thermostatic bath set to 25° C., a cell corresponding to the nonaqueous lithium power storage element is subjected to constant-current charge at the 2 C current value until 3.8 V is reached, and then constant-voltage charge is carried out for 30 minutes with application of a constant voltage of 3.8 V. Next, the capacitance after constant-current discharge to 2.2 V at the 2 C current value is recorded as Q (C). The obtained values of Q and voltage change $\Delta V_x$ (V) are used to calculate the electrostatic capacitance value $Fa = Q/\Delta V_x = Q/(3.8 - 2.2)$, as the electrostatic capacitance Fa (F).

The current discharge rate (also referred to as "C rate") is the relative proportion of the current during discharge with respect to the service capacity, and generally the current value at which discharge is completed at 1 hour, with constant-current discharge from the maximum voltage to the minimum voltage, is defined as 1 C. Throughout the present specification, 1 C is the current value such that discharge is complete at 1 hour, upon constant-current discharge from a maximum voltage of 3.8 V to a minimum voltage of 2.2 V.

[Electrical Energy]

Throughout the present specification, the electrical energy Wh (Wh) is the value obtained by the following method.

The value calculated by $Fa \times (3.8^2 - 2.2^2)/2/3600$, using the electrostatic capacitance Fa (F) calculated by the method described above, is the electrical energy Wh (Wh).

[Volume of Nonaqueous Lithium Power Storage Element for Calculation of Energy Density]

The volume of the nonaqueous lithium power storage element for calculation of energy density is the volume of the portion of the electrode laminated body or wound electrode in which the region where the positive electrode active material layer and negative electrode active material layer are stacked is housed by the casing.

For example, in the case of an electrode laminated body or wound electrode housed by a laminate film, typically the region of the electrode laminated body or wound electrode where the positive electrode active material layer and negative electrode active material layer are present is housed in a cup-shaped laminate film. The volume (Vc) of the nonaqueous lithium power storage element is calculated by $Vc = l_1 \times w_1 \times t_1$, using the outer length ($l_1$) and outer width ($w_1$) of the cup-shaped section, and the thickness ($t_1$) of the nonaqueous lithium power storage element including the laminate film.

In the case of an electrode laminated body or wound electrode housed in a rectilinear metal can, the volume of the outer dimensions of the metal can are simply used as the volume of the nonaqueous lithium power storage element. That is, the volume (Vd) of the nonaqueous lithium power storage element is calculated by $Vd = l_2 \times w_2 \times t_2$, based on the outer length ($l_2$) and outer width ($w_2$), and outer thickness ($t_2$), of the rectilinear metal can.

Even in the case of a wound electrode housed in a cylindrical metal can, the volume of the outer dimensions of the metal can is used as the volume of the nonaqueous lithium power storage element. That is, the volume (Ve) of the nonaqueous lithium power storage element is calculated by Ve=3.14×r×r×$l_3$, using the outer radius (r) and outer length ($l_3$) of the bottom face or top face of the cylindrical metal can.

[Energy Density]

Throughout the present specification, the energy density is the value obtained by the formula Wh/$V_i$ (Wh/L), using the electrical energy Wh and volume Vi (i=c, d or e) of the nonaqueous lithium power storage element.

Wh/Vi is preferably 15 or greater from the viewpoint of exhibiting sufficient charge capacity and service capacity. If Wh/Vi is 15 or greater, it will be possible to obtain a nonaqueous lithium power storage element with excellent volume energy density. This is therefore preferable, because when a power storage system using the nonaqueous lithium power storage element is used in combination with an automobile engine, for example, it will be possible to install the power storage system in the narrow-limited space in the automobile. The upper limit for Wh/Vi is preferably no greater than 50.

[Internal Resistance]

Throughout the present specification, the internal resistance Ra (Ω) is the value obtained by the following method:

First, in a thermostatic bath set to 25° C., the nonaqueous lithium power storage element is subjected to constant-current charge at the 20 C current value until 3.8 V is reached, and then constant-voltage charge is carried out for 30 minutes in total with application of a constant voltage of 3.8 V. Next, constant-current discharge is carried out to 2.2 V with a sampling interval of 0.1 second and the 20 C current value, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the value is calculated from voltage drop ΔE=3.8−Eo, with Ra=ΔE/(20 C current value).

Ra·Fa is preferably no greater than 3.0, more preferably no greater than 2.5 and even more preferably no greater than 2.2, from the viewpoint of exhibiting sufficient charge capacity and service capacity for high current. If Ra·Fa is no greater than 3.0, it will be possible to obtain a nonaqueous lithium power storage element having an excellent input/output characteristic. This is therefore preferred since, by combining a power storage system using the nonaqueous lithium power storage element with a high efficiency engine, for example, it will be possible to adequately withstand the high load applied to the nonaqueous lithium power storage element. The lower limit for Ra·Fa is preferably 0.3 or greater.

[Gas Generation Volume after High-temperature Storage Test]

For the purpose of the present specification, the gas generation volume in the high-temperature storage test is measured by the following method:

First, in a thermostatic bath set to 25° C., a cell corresponding to the nonaqueous lithium power storage element is subjected to constant-current charge at the 100 C current value until 4.0 V is reached, and then constant-voltage charge is carried out for 10 minutes with application of a constant voltage of 4.0 V. Next, the nonaqueous lithium power storage element is stored in a 60° C. environment, and every 2 weeks it is removed from the 60° C. environment and subjected to charge with a cell voltage of 4.0 V in the charge step described above, after which the nonaqueous lithium power storage element is stored in a 60° C. environment. This step is repeated, and the cell volume Va before the start of storage and the cell volume Vb after two months of the storage test are measured by Archimedes' method. The solvent used for measurement of the volume by Archimedes' method is not particularly restricted, but preferably a solvent is used which has an electric conductivity of no greater than 10 μS/cm and does not result in electrolysis when used to immerse the nonaqueous lithium power storage element. Purified water and fluorine-based inert liquids, for example, are suitable for use. In particular, fluorine-based inert liquids such as FLUORINERT (registered trademark of 3M Co. Japan) FC-40 and FC-43 are preferably used because they have high specific gravity and excellent electrical insulating properties. Vb−Va is the gas quantity generated after 2 months of storage with a cell voltage of 4.0 V and an environmental temperature of 60° C., and the value of B=(Vb−Va)/Fa, normalized with respect to the electrostatic capacitance Fa, is the gas quantity generated in a high-temperature storage test.

[High-load Charge/Discharge Cycle Test]

For the present specification, the change in resistance and gas generation volume after the high-load charge/discharge cycle test are measured by the following methods.

(Change in Resistance after High-load Charge/Discharge Cycling)

First, a cell corresponding to the nonaqueous lithium power storage element is subjected to constant-current charge in a thermostatic bath set to 25° C., until reaching 3.8 V at the 200 C or 300 C current value, and then constant-current discharge is carried out until reaching 2.2 V at the 200 C or 300 C current value. The high-load charge/discharge cycling is repeated 60,000 times, and the internal resistance Rb after high-load charge/discharge cycling is measured by the internal resistance measurement method described above. Rb/Ra is recorded as the change in resistance after high-load charge/discharge cycling.

The change in resistance Rb/Ra after the high-load charge/discharge cycle test is preferably no greater than 2.0, more preferably no greater than 1.5 and even more preferably no greater than 1.2. If the resistance increase rate after the high-load charge/discharge cycle test is no greater than 2.0, the properties of the nonaqueous lithium power storage element will be maintained even with repeated charge/discharge. Consequently, it will be possible to stably obtain an excellent input/output characteristic for long periods, thus helping to prolong the usable life of the nonaqueous lithium power storage element. The lower limit for Rb/Ra is preferably 0.9 or greater.

[Nail-penetration Test]

For the purpose of the present specification, the nail-penetration test is conducted by the following method:

(Voltage Adjustment)

First, in an explosion-proof thermostatic bath set to 25° C., a cell corresponding to the nonaqueous lithium power storage element is subjected to constant-current charge at the 20 C current value until 4.0 V is reached, and then constant-voltage charge is carried out for 10 minutes with application of a constant voltage of 4.0 V.

(Nail-penetration Test)

Upon completion of charging, a thermocouple is attached to the negative electrode terminal and positive electrode terminal of the cell and near the center section of the casing, and a cell voltage-measuring cable is connected to a data logger. The sampling time of the data logger is preferably no longer than a 0.1 second interval. A nail (N65) is placed at the center section of the cell, and a penetration speed of 30 mm/sec is used. Upon completion of the nail-penetration test, the maximum ultimate temperature of the negative electrode terminal and the state of the nonaqueous lithium power storage element are observed.

Throughout the present specification, the following definitions are used:

Ignition: Burned state of the nonaqueous lithium power storage element,

Rupture: A state with all or a portion of the casing of the nonaqueous lithium power storage element damaged, and all or a portion of the electrode laminated body protruding from the casing, Splitting: A state with a portion of the casing of the nonaqueous lithium power storage element damaged and the electrode laminated body stopped inside the casing (the nonaqueous electrolytic solution may also exude out from the location where the nail has penetrated the casing).

<Method of Identifying Lithium Compound in Electrode>

The method of identifying a lithium compound in the positive electrode is not particularly restricted, and it may be identification by the following methods, for example. For identification of a lithium compound, it is preferred to carry out the identification by combining the different analysis methods described below.

For measurement by SEM-EDX, Raman or XPS described below, preferably the nonaqueous lithium power storage element is disassembled in an argon box, the positive electrode is removed, and measurement is performed after washing the electrolyte adhering to the positive electrode surface. Since the method of washing the positive electrode only needs to wash off the electrolyte adhering to the positive electrode surface, a carbonate solvent such as dimethyl carbonate, ethyl methyl carbonate or diethyl carbonate may be suitably used. The washing method may be, for example, immersion of the positive electrode for 10 minutes or longer in a diethyl carbonate solvent in an amount of 50 to 100 times the weight of the positive electrode, and subsequent re-immersion of the positive electrode after exchange of the solvent. The positive electrode is then removed from the diethyl carbonate and vacuum dried, and then subjected to SEM-EDX, Raman spectroscopy and XPS analysis. The vacuum drying conditions are conditions such that the diethyl carbonate residue in the positive electrode is no greater than 1 weight % with a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a pre-drawn calibration curve.

In ion chromatography, described below, the water after washing of the positive electrode with distilled water is analyzed to allow identification of the anion.

When the lithium compound cannot be identified by this analysis method, $^7$Li-solid NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry) or the like may be used as an alternative analysis method to identify the lithium compound.

[Mean Particle Diameter of Lithium Compound]

If the mean particle diameter of the lithium compound is represented as $X_1$, then preferably 0.1 µm≤$X_1$≤10 µm and more preferably 0.5 µm≤$X_1$≤5 µm. If $X_1$ is 0.1 µm or greater, the high-load charge/discharge cycle characteristic will be improved due to adsorption of fluorine ions generated by the high-load charge/discharge cycling. If $X_1$ is no greater than 10 µm, the reaction area with the fluorine ions generated by the high-load charge/discharge cycling will increase, thus allowing the fluorine ions to be adsorbed more efficiently. The method of measuring $X_1$ is not particularly restricted, and they may be calculated from an SEM image and SEM-EDX image of the positive electrode cross-section described below. The method of forming the positive electrode cross-section may employ broad ion beam (BIB) processing in which an Ar beam is irradiated from above the positive electrode, and a smooth cross-section is created along the edges of a masking shield set directly above the sample. When the positive electrode comprises lithium carbonate, the carbonate ion distribution can be determined by measurement with Raman imaging of the positive electrode cross-section.

[Scanning Electron Microscope-energy Dispersive X-ray Analysis (SEM-EDX)]

The lithium compound and positive electrode active material can be discriminated by oxygen mapping with an SEM-EDX image of the positive electrode surface or positive electrode cross-section measured at an observational magnification of 1000-4000×. As an example of measurement of an SEM-EDX image, it can be measured with an acceleration voltage of 10 kV, an emission current of 10 µA, a measuring pixel count of 256×256 pixels, and a number of scans of 50. In order to prevent electrification of the sample, surface treatment with gold, platinum, osmium or the like may be carried out by a method such as vacuum vapor deposition or sputtering. The method of measuring the SEM-EDX image is preferably with adjustment of the luminance and contrast so that no pixel reaches the maximum luminance value in the mapping image, and the average value of brightness is in the range of 40% to 60% of the maximum luminance value. In the obtained oxygen mapping, particles containing a bright portion equal to 50% or more of the area thereof when binarized based on the average value of brightness with respect to the resulting oxygen mapping are considered to be lithium compound.

[Method of Calculating $X_1$]

The mean particle diameter $X_1$ of the lithium compound can be determined by analysis of an image obtained from SEM-EDX of the positive electrode cross-section, measured in the same visual field as the positive electrode cross-sectional SEM mentioned above. The cross-sectional area S is determined for all of the particles X observed in the cross-sectional SEM image, X being lithium compound particles discriminated in the SEM image of the positive electrode cross-section, and the particle diameter d is calculated by the following formula (where π is the circular constant).

$$d = 2 \times (S/\pi)^{1/2}$$

Each obtained particle diameter d is used to determine the volume-average particle diameter $X_0$, by the following formula.

$$X_0 = \Sigma[4/3\pi \times (d/2)^3 \times d] / \Sigma[4/3\pi \times (d/2)^3]$$

Measurement is performed at five or more locations, varying the visual field of the positive electrode cross-section, and the mean value for each $X_0$ is recorded as the mean particle diameter $X_1$.

[Microscopic Raman Spectroscopy]

The alkali metal carbonate and positive electrode active material can be discriminated by Raman imaging of carbonate ion on the surface of the positive electrode precursor, measured at an observation magnification of 1000× to 4000×. As an example for the measuring conditions, measurement may be performed with an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1071 to 1104 $cm^{-1}$, a value positive from the baseline is considered a carbonate ion peak, followed by integration of the frequency thereof, but the frequency of the noise relative to the peak area of carbonate ions approximated by a Gaussian function is subtracted from the carbonate ion frequency distribution.

[X-ray Photoelectron Spectroscopy (XPS)]

The electronic state can be analyzed by XPS to discriminate the bonded state of the lithium compound. As an example for the measuring conditions, measurement may be performed with monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium element), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$).

In the obtained XPS spectrum, the following assignments may be made:

A peak having Li1s bonding energy of 50 to 54 eV as a $LiO_2$ or Li—C bond;

a peak of 55 to 60 eV as LiF, $Li_2CO_3$, $Li_xPO_yF_z$ (where x, y and z are each an integer of 1 to 6);

a peak having C1s bonding energy of 285 eV as C—C bonds, a peak of 286 eV as C—O bonds, a peak of 288 eV as COO, a peak of 290 to 292 eV as $CO_3^{2-}$ and C—F bonds;

a peak having O1s bonding energy of 527 to 530 eV as $O^{2-}$ (Li2O), a peak of 531 to 532 eV as CO, $CO_3$, OH, $PO_x$ (where x is an integer of 1 to 4), $SiO_x$ (where x is an integer of 1 to 4), a peak of 533 eV as C—O, or $SiO_x$ (where x is an integer of 1 to 4);

a peak having $F_1s$ bonding energy of 685 eV as LiF, a peak of 687 eV as a C—F bond, $Li_xPO_yF_z$ (where x, y and z are integers of 1 to 6), $PF_6^-$;

a peak having P2p bonding energy, a peak having P2p bonding energy of 133 eV as $PO_x$ (where x is an integer of 1 to 4), a peak of 134 to 136 eV as $PF_x$ (where x is an integer of 1 to 6);

a peak having Si2p bonding energy of 99 eV as Si, silicide, a peak of 101 to 107 eV as $Si_xO_y$ (where x and y are each an arbitrary integer).

When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

[Ion Chromatography]

Carbonate ion eluted in water can be identified by washing the positive electrode precursor with distilled water and analyzing the water after washing, by ion chromatography. The columns used may be an ion-exchange type, ion exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Measurement may also be performed by combining a mass spectrometer or charged particle detector with the detector.

The sample retention time will depend on the conditions such as the column and eluent used and is the same for each ion species component, while the size of the peak response differs for each ion species but is proportional to the concentration of the ion species. By premeasuring a standard solution of known concentration with ensured traceability, it is possible to qualitatively and quantitatively analyze the ion species components.

<Alkali Metal Element Quantitation Method: ICP-MS>

The measuring sample is acid-decomposed using a strong acid such as concentrated nitric acid, concentrated hydrochloric acid or aqua regalis, and the obtained solution is diluted with purified water to an acid concentration of 2% to 3%. The acid decomposition may be by appropriate heating and pressurization of the sample. The obtained diluted solution is analyzed by ICP-MS, during which time it is preferred to add an element of known amount as an internal standard. When the alkali metal element to be measured is at a concentration above the measurable limit, it is preferably further diluted while maintaining the acid concentration of the diluted solution. Each element can be quantified from the obtained measurement results, based on a calibration curve pre-drawn using a standard solution for chemical analysis.

<Quantitation Method 1 for Basis Weight of Positive Electrode Active Material Layer and Lithium Compound Amount, Calculation of $C_{x1}$, $C_{y1}$, $C_{x2}$, $C_{y2}$>

The methods for quantifying the basis weight of the positive electrode active material layer and the amount of lithium compound in the positive electrode active material layer are described below. The nonaqueous lithium power storage element with the voltage adjusted to 2.9 V is disassembled in an argon box and the electrode laminated body is removed, and the positive electrode is cut out from the electrode laminated body and washed with an organic solvent. The organic solvent is not particularly restricted so long as it can remove electrolytic solution decomposition products that have accumulated on the positive electrode surface but using an organic solvent with a solubility of no greater than 2% for the lithium compound will suppress elution of the lithium compound. Suitable examples of such organic solvents include polar solvents such as methanol, ethanol, acetone and methyl acetate. The area of the positive electrode to be measured is not particularly restricted, but from the viewpoint of reducing measurement variation it is preferably 5 $cm^2$ to 200 $cm^2$ and more preferably 25 $cm^2$ to 150 $cm^2$. Measurement reproducibility can be ensured if the positive electrode area is at least 5 $cm^2$. The handleability of the sample will be excellent if the positive electrode area is no greater than 200 $cm^2$.

The method of washing the positive electrode is immersion of the positive electrode for 3 days or longer in an ethanol solution at a 50- to 100-fold amount with respect to the weight of the positive electrode. During the immersion, the vessel is preferably capped, for example, so that the ethanol does not volatilize off. After immersion for 3 days or longer, the positive electrode is removed from the ethanol and vacuum dried. The vacuum drying conditions employed may be conditions such that the ethanol residue in the positive electrode is no greater than 1 weight % with a temperature of 100 to 200° C., a pressure of 0 to 10 kPa and a time of 5 to 20 hours. The ethanol residue can be quantified by GC/MS measurement of water after distilled water washing, based on a pre-drawn calibration curve. The obtained positive electrode is cut in half, one half being used as positive electrode $C_{x0}$ and the other as positive electrode $C_{y0}$, with areas designated as $X_C$ (m$^2$) and $Y_C$ (m$^2$), respectively. The positive electrode active material layer on the $C_y$ side of the positive electrode $C_{x0}$ and the positive electrode active material layer on the $C_x$ side of the positive electrode $C_{y0}$ are removed off using a spatula, brush, bristles or the like, recording the weight of the positive electrode $C_{x0}$ as $M_{0x}$ (g) and the weight of the positive electrode $C_{y0}$ as $M_{0y}$ (g). Next, the positive electrode $C_{x0}$ and positive electrode $C_{y0}$ are immersed in distilled water for 3 days or longer, in an amount of 100- to 150-fold of their respective weights. During the immersion, preferably the vessel is capped so that the distilled water does not volatilize, and the solution is periodically stirred to promote elution of the lithium compound. After immersion for 3 days or longer, the positive electrode $C_{x0}$ and positive electrode $C_{y0}$ are removed from the distilled water and vacuum dried in the same manner as for the ethanol washing described above. After vacuum drying, the weights of the positive electrode $C_{x0}$ and positive electrode $C_{y0}$ are recorded as $M_{1x}$ (g) and $M_{1y}$ (g), respectively. Next, in order to measure the weights of the power collectors of the obtained positive electrode $C_{x0}$ and positive electrode $C_{y0}$, the positive electrode active material layers remaining on the positive electrode $C_{x0}$ and positive electrode $C_{y0}$ are removed using a spatula, brush, bristles or the like. Using $M_{2x}$ (g) and $M_{2y}$ (g) as the weights of the obtained positive electrode power collectors, the basis weight $C_{x1}$ (g/m$^2$) of the positive electrode active material layer of the positive electrode $C_{x0}$ and the basis weight $C_{y1}$ (g/m$^2$) of the positive electrode active material layer of the positive electrode $C_{y0}$ can be calculated by formula (7).

$$C_{x1}=(M_{1x}-M_{2x})/X_C, \text{ and}$$

$$C_{y1}=(M_{1y}-M_{2y})/Y_C \quad (7)$$

The amount of lithium compound $C_{x2}$ (g/m$^2$) per area of $C_{x0}$ and the amount of lithium compound $C_{y2}$ (g/m$^2$) per area of $C_{y0}$ can be calculated by the following formula (8).

$$C_{x2}=(M_{0x}-M_{1x})/X_C, \text{ and}$$

$$C_{y2}=(M_{0y}-M_{1y})/Y_C \quad (8)$$

Incidentally, when multiple lithium compounds are present in the positive electrode active material layer; or when it contains an oxide such as $M_2O$, a hydroxide such as MOH, a halide such as MF or MCl, an oxalate such as $M_2(CO_2)_2$ or a carboxylate such as RCOOM (where R is H, an alkyl group or an aryl group), with one or more selected from among Na, K, Rb and Cs as M in the formulas, in addition to the lithium compound; or when the positive electrode active material layer includes an alkaline earth metal carbonate selected from among $BeCO_3$, $MgCO_3$, $CaCO_3$, $SrCO_3$ and $BaCO_3$, or an alkaline earth metal oxide, alkaline earth metal hydroxide, alkaline earth metal halide, alkaline earth metal oxalate or alkaline earth metal carboxylate, their total amounts are calculated as the amount of lithium compound.

<Calculation of Basis Weight of Negative Electrode Active Material Layer 1, Calculation of $A_{x1}$ and $A_{y1}$>

The method of quantifying the basis weight of the negative electrode active material layer will now be described. The negative electrode is cut out from the electrode laminated body in an argon box and washed with an organic solvent. The organic solvent used for washing may be any solvent that removes the electrolytic solution decomposition products deposited on the negative electrode surface and reacts with lithium ion in the negative electrode, without any particular restrictions, and alcohols such as methanol, ethanol and isopropanol, and their mixed solvents, are suitable for use. The area of the negative electrode to be measured is not particularly restricted, but from the viewpoint of reducing measurement variation it is preferably 5 cm$^2$ to 200 cm$^2$ and more preferably 25 cm$^2$ to 150 cm$^2$. Measurement reproducibility can be ensured if the negative electrode area is at least 5 cm$^2$. The handleability of the sample will be excellent if the negative electrode area is no greater than 200 cm$^2$.

The method of washing the negative electrode is immersion of the negative electrode for 3 days or longer in an ethanol solution at a 50- to 100-fold amount with respect to the weight of the negative electrode. During the immersion, the vessel is preferably capped, for example, so that the ethanol does not volatilize off. After immersion for 3 days or longer, the negative electrode is removed from the ethanol and vacuum dried. The vacuum drying conditions employed may be conditions such that the ethanol residue in the negative electrode is no greater than 1 weight % with a temperature of 100 to 200° C., a pressure of 0 to 10 kPa and a time of 5 to 20 hours. The ethanol residue can be quantified by GC/MS measurement of the organic solvent, based on a pre-drawn calibration curve, after immersing the vacuum dried negative electrode in an organic solvent such as dimethyl carbonate, diethyl carbonate or ethyl methyl carbonate. The vacuum dried negative electrode is cut in half, one half being used as negative electrode $A_{x0}$ and the other half as negative electrode $A_{y0}$, and the areas are recorded as $X_A$ (m$^2$) and $Y_A$ (m$^2$), respectively. The negative electrode active material layer on the $A_y$ side of the negative electrode $A_{x0}$ and the negative electrode active material layer on the $A_x$ side of the negative electrode $A_{y0}$ are removed off using a spatula, brush, bristles or the like, recording the weight of the negative electrode $A_{x0}$ as $M_{0xA}$ (g) and the weight of the negative electrode $A_{y0}$ as $M_{0yA}$ (g). Next, in order to measure the weights of the power collectors of the obtained negative electrode $A_{x0}$ and negative electrode $A_{y0}$, the negative electrode active material layers remaining on the negative electrode $A_{x0}$ and negative electrode $A_{y0}$ are removed using a spatula, brush, bristles or the like. Using $M_{1xA}$ (g) and $M_{1yA}$ (g) as the weights of the obtained negative electrode power collectors, the basis weight of the negative electrode active material layer $A_{x1}$ (g/m$^2$) of the negative electrode $A_{x0}$ and the basis weight of the negative electrode active material layer $A_{y1}$ (g/m$^2$) of the negative electrode $A_{y0}$ can be calculated by formula (9).

$$A_{x1}=(M_{0xA}-M_{1xA})/X_A, \text{ and}$$

$$A_{y1}=(M_{0yA}-M_{1yA})/Y_A \quad (9)$$

<Calculation of Lithium Ion Amount and Amount of Negative Electrode Active Material 2, Calculation of $A_{w1}$, $A_{z1}$, $A_{w2}$, $A_{z2}$>

The method for quantifying the amount of lithium ion in the negative electrode situated on the outermost layer of the electrode laminated body or wound electrode will now be described. The nonaqueous lithium power storage element with the voltage adjusted to 2.9 V is disassembled in an argon box and the electrode laminated body is removed. The negative electrode situated on the outermost layer of the electrode laminated body is cut out, and the negative electrode is washed with an organic solvent. During this time, in the case of an electrode laminated body having stacked sheet electrodes, it is sufficient to cut out the negative electrode on the outermost layer, or if the electrode laminated body is a wound body, a negative electrode containing a negative electrode active material layer that is not facing the positive electrode may be cut out. The organic solvent used for washing is not particularly restricted so long as it removes decomposition products of the electrolytic solution that have accumulated on the negative electrode surface and does not react with lithium ions in the negative electrode, and a solvent such as dimethyl carbonate, diethyl carbonate or ethyl methyl carbonate may be suitably used. The area of the negative electrode to be measured is not particularly restricted, but from the viewpoint of reducing measurement variation it is preferably 2 cm² to 20 cm² and more preferably 4 cm² to 10 cm². Measurement reproducibility can be ensured if the area is at least 2 cm². The handleability of the sample will be excellent if the area is no greater than 20 cm².

The washed negative electrode is air-dried and then the negative electrode is cut to half the area, one half being used as negative electrode $A_{w0}$ and the other half as negative electrode $A_{z0}$, and the areas are recorded as $X_B$ (m²) and $Y_B$ (m²), respectively. The negative electrode active material layer on the $A_z$ side of the negative electrode $A_{w0}$ and the negative electrode active material layer on the $A_w$ side of the negative electrode $A_{z0}$ are removed off using a spatula, brush, bristles or the like, and then the weight of the negative electrode $A_{w0}$ is recorded as $M_{0w}$ (g) and the weight of the negative electrode $A_{z0}$ as $M_{0z}$ (g). The lithium ions are then extracted from the negative electrode $A_{w0}$ and negative electrode $A_{z0}$ using a mixed solvent of methanol and isopropanol in a volume ratio of 1:1. The extracted negative electrode is air-dried and vacuum dried in a side box while maintaining a state of non-exposure to air, and the dried negative electrode is transferred from the side box to an argon box while maintaining the state of non-exposure to air. The weight of the vacuum-dried negative electrode $A_{w0}$ is recorded as $M_{1w}$ (g), and the weight of the negative electrode $A_{z0}$ as $M_{1z}$ (g). Next, the negative electrode active material layers remaining on the negative electrode $A_{w0}$ and negative electrode $A_{z0}$ are removed, and using the weight of the negative electrode power collector of the negative electrode $A_{w0}$ after removal of the negative electrode active material layer as $M_2w$ (g) and the weight of the negative electrode power collector of the negative electrode $A_{z0}$ as $M_{2z}$ (g), the weight of the negative electrode active material of the negative electrode $A_{w0}$ may be calculated as $M_{1w}-M_{2w}$ and the weight of the negative electrode active material of the negative electrode $A_{z0}$ as $M_{1z}-M_{2z}$. The obtained values may be compared to the area $X_B$ of the negative electrode $A_{w0}$ and the area $Y_B$ of the negative electrode $A_{z0}$, to calculate the amounts of negative electrode active material $A_{w2}$ (g/m²) and $A_{z2}$ (g/m²) per area.

With the liquid extract obtained as described above, and the amount of lithium in the negative electrode active material layer after extraction, an ICP-MS (inductively coupled plasma mass spectrometer), for example, may be used to quantify the lithium concentration in the liquid extract and the negative electrode active material layer, and determine the weight of the liquid extract used for measurement and the total amount of lithium from the weights of the negative electrode active materials ($M_{1x}-M_{2x}$ and $M_{1y}-M_{2y}$) calculated as described above, to ascertain the total substance amount (mol) of lithium on the $A_w$ side and $A_z$ side. The obtained values may be compared with the area of the negative electrode supplied for extraction, to calculate the lithium ion amounts $A_{w1}$ (mol/m²) and $A_{z1}$ (mol/m²).

<Calculation of Amount of Active Material $C_{z1}$ Per Area of Positive Electrode and Amount of Lithium Compound $C_{z2}$ Per Area of Positive Electrode 2>

The method for quantifying the amounts of lithium compound and active material on the $C_z$ side of the positive electrode active material layer facing the $A_z$ side of the negative electrode active material layer will now be described.

The negative electrode as the outermost layer and the positive electrode facing it, in the electrode laminated body disassembled in the argon box, are cut out and washed with an organic solvent. The organic solvent used for washing is not particularly restricted so long as it can remove electrolytic solution decomposition products that have accumulated on the positive electrode surface but using an organic solvent with a solubility of no greater than 2% for the lithium compound will suppress elution of the lithium compound. Suitable examples of such organic solvents include polar solvents such as methanol, ethanol, acetone and methyl acetate. The area of the positive electrode to be measured is not particularly restricted, but from the viewpoint of reducing measurement variation it is preferably 5 cm² to 200 cm² and more preferably 25 cm² to 150 cm². Measurement reproducibility can be ensured if the area is at least 5 cm². The handleability of the sample will be excellent if the area is no greater than 200 cm².

The positive electrode is washed as described above, and for the positive electrode obtained after drying, the positive electrode active material layer is removed on the side opposite the $C_z$ side using a spatula, brush, bristles or the like, leaving the positive electrode active material layer on the $C_z$ side facing the $A_z$ side, recording the weight as $M_{0c}$ (g) and the area as Z (m²). It is then immersed for 3 days or longer in distilled water in an amount of 100 to 150 times the weight of the positive electrode. During the immersion, it is preferred to cap the vessel so that the distilled water does not volatilize off. After immersion for 3 days or longer, the positive electrode is removed from the distilled water and vacuum dried in the same manner as for the ethanol washing described above.

The weight of the positive electrode after vacuum drying is recorded as $M_{1c}$ (g). Next, for measurement of the weight of the power collector of the obtained positive electrode, a spatula, brush or bristles are used to remove the positive electrode active material layer remaining on the positive electrode. If the weight of the obtained positive electrode power collector is represented as $M_{2c}$, then the amount of active material per area $C_{z1}$ (g/m²) on the $C_y$ side can be calculated by the following formula (10).

$$C_{z1}=(M_{1c}-M_{2c})/Z \qquad (10)$$

The amount of lithium compound $C_{z2}$ (g/m²) per area on the $C_z$ side can be calculated by the following formula (11).

$$C_{z2}=(M_{0c}-M_{1c})/Z \qquad (11)$$

Incidentally, when multiple lithium compounds are present in the positive electrode active material layer; or when it contains an oxide such as $M_2O$, a hydroxide such as MOH, a halide such as MF or MCl, an oxalate such as $M_2(CO_2)_2$ or a carboxylate such as RCOOM (where R is H, an alkyl group or an aryl group), with one or more selected from among Na, K, Rb and Cs as M in the formulas, in addition to the lithium compound; or when the positive electrode active material layer includes an alkaline earth metal carbonate selected from among $BeCO_3$, $MgCO_3$, $CaCO_3$, $SrCO_3$ and $BaCO_3$, or an alkaline earth metal oxide, alkaline earth metal hydroxide, alkaline earth metal halide, alkaline earth metal oxalate or alkaline earth metal carboxylate, their total amounts are calculated as the amount of lithium compound.

EXAMPLES

Embodiments of the invention will now be explained in detail by examples and comparative examples, with the understanding that these examples and comparative examples are not limitative in any way on the invention.

The first embodiment will now be explained in detail.

Example 1

<Preparation of Positive Electrode Active Material>
[Preparation Example 1a]

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 1.

A laser diffraction particle size distribution analyzer (SALD-2000 J) by Shimadzu Corp. was used to measure the mean particle diameter of the activated carbon 1, which was found to be 4.2 µm. Also, a pore distribution measuring apparatus (AUTOSORB-1 AS-1-MP) by Yuasa Ionics Co., Ltd. was used to measure the pore distribution of the activated carbon 1. As a result, the BET specific surface area was 2360 $m^2$/g, the mesopore volume ($V_1$) was 0.52 cc/g, the micropore volume ($V_2$) was 0.88 cc/g, and $V_1/V_2$=0.59.

[Preparation Example 2a]

A phenol resin was placed in a firing furnace and subjected to carbonization at 600° C. for 2 hours under a nitrogen atmosphere, and was then pulverized with a ball mill and sorted, to obtain a carbide having a mean particle diameter of 7 µm. The obtained carbide was mixed with KOH at a weight ratio of 1:5, and the mixture was placed in a firing furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2.

A laser diffraction particle size distribution analyzer (SALD-2000 J) by Shimadzu Corp. was used to measure the mean particle diameter of the activated carbon 2, which was found to be 7.0 µm. Also, a pore distribution measuring apparatus (AUTOSORB-1 AS-1-MP) by Yuasa Ionics Co., Ltd. was used to measure the pore distribution of the activated carbon 2. As a result, the BET specific surface area was 3627 $m^2$/g, the mesopore volume ($V_1$) was 1.50 cc/g, the micropore volume ($V_2$) was 2.28 cc/g, and $V_1/V_2$=0.66.

<Production of Positive Electrode Precursor>

Activated carbon 2 was used as the positive electrode active material to produce a positive electrode precursor.

After mixing 50.0 parts by weight of activated carbon 2, 37.5 parts by weight of lithium carbonate, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone) to a solid weight ratio of 31.2%, the mixture was dispersed using a FILMIX® thin-film spinning high-speed mixer by PRIMIX Corp., under conditions with a circumferential speed of 17 m/s, to obtain coating solution 1C.

The viscosity (ηb) and TI value of the obtained coating solution 1C were measured using a TVE-35H E-type viscometer by Toki Sangyo Co., Ltd. As a result, the viscosity (ηb) was 2,650 mPa·s and the TI value was 3.4. The degree of dispersion of the obtained coating solution 1C was measured using a fineness gauge by Yoshimitsu Seiki Co. As a result, the granularity was 31 µm. Coating solution 2C was obtained by dispersion by the same method as described above, except that the contents and NMP (N-methylpyrrolidone) were mixed to a solid weight ratio of 29.7%. The viscosity (ηb) of the obtained coating solution 2C was 2,580 mPa·s, the TI value was 3.4 and the granularity was 31 µm.

Coating solution 1C was coated onto the top side of an aluminum foil with a thickness of 15 µm and coating solution 2C was coated onto the bottom side of the aluminum foil, using a double-side die coater by Toray Engineering Co., Ltd. under conditions with a coating speed of 1 m/s, and they were dried at a drying temperature of 120° C. to obtain positive electrode precursor 1. The obtained positive electrode precursor 1 was pressed using a roll press under conditions with a pressure of 6 kN/cm and a pressed portion surface temperature of 25° C. The total thickness of the positive electrode precursor 1 was measured at 10 arbitrary locations of the positive electrode precursor 1 using a Linear Gauge Sensor GS-551 by Ono Sokki Co., Ltd. The positive electrode active material layer on one side of the positive electrode precursor 1 was then removed, and the thickness was again measured. All of the positive electrode active material layer remaining on the positive electrode power collector was then removed, and the thickness of the aluminum foil was measured. When the film thickness of the positive electrode active material layer on the positive electrode precursor 1 was determined from the obtained measurement results, the top face of the positive electrode active material layer was 54 µm and the bottom face of the positive electrode active material layer was 52 µm, and the top side was used as the positive electrode precursor Cx1 side while the bottom side was used as the positive electrode precursor Cy1 side.

<Preparation of Negative Electrode Active Material: Preparation Example 1>

The BET specific surface area and pore distribution of commercially available artificial graphite was measured by the method described above, using a pore distribution measuring apparatus (AUTOSORB-1 AS-1-MP) by Yuasa Ionics Co., Ltd. As a result, the BET specific surface area was 3.1 $m^2$/g and the mean particle diameter was 4.8 µm.

A 300 g portion of the artificial graphite was placed into a stainless-steel mesh basket and placed on a stainless-steel vat containing 30 g of coal pitch (softening point: 50° C.), and both were set in an electric furnace (furnace inner usable dimension: 300 mm×300 mm×300 mm). The artificial graphite and coal pitch were increased in temperature to 1000° C. over 12 hours under a nitrogen atmosphere and were kept at the same temperature for 5 hours for thermal reaction to obtain composite porous carbon material 2a. The obtained composite porous carbon material 2a was cooled to 60° C. by natural cooling and removed out from the electric furnace.

The BET specific surface area and pore distribution of the obtained composite porous carbon material 2a were measured by the same methods as described above. As a result, the BET specific surface area was 6.1 m$^2$/g and the mean particle diameter was 4.9 μm. Also, for composite porous carbon material 2a, the weight ratio of coal pitch-derived carbonaceous material with respect to activated carbon was 2.0%.

<Production of Negative Electrode>

Composite porous carbon material 2a was then used as a negative electrode active material to produce a negative electrode.

After mixing 84 parts by weight of composite porous carbon material 2a, 10 parts by weight of acetylene black, 6 parts by weight of PVdF (polyvinylidene fluoride) and NMP (N-methylpyrrolidone) to a solid weight ratio of 28.5%, the mixture was dispersed using a FILMIX® thin-film spinning high-speed mixer by PRIMIX Corp., under conditions with a circumferential speed of 17 m/s, to obtain coating solution 1A.

The viscosity (ηb) and TI value of the obtained coating solution 1A were measured using a TVE-35H E-type viscometer by Toki Sangyo Co., Ltd. As a result, the viscosity (ηb) was 2,520 mPa·s and the TI value was 3.8. Coating solution 2A was obtained by dispersion by the same method as described above, except that the contents and NMP (N-methylpyrrolidone) were mixed to a solid weight ratio of 27.7%. The viscosity (ηb) of the obtained coating solution 2A was 2,480 mPa·s and the TI value was 3.8.

Coating solution 1A was coated onto the top side of an electrolytic copper foil with a thickness of 10 μm and coating solution 2A was coated onto the bottom side of an electrolytic copper foil, using a die coater by Toray Engineering Co., Ltd. under conditions with a coating speed of 2 m/s, and dried at a drying temperature of 120° C. to obtain negative electrode 1. This was pressed using a roll press under conditions with a pressure of 5 kN/cm and a pressed portion surface temperature of 25° C. The total thickness of the pressed negative electrode 1 was measured at 10 arbitrary locations of negative electrode 1, using a Linear Gauge Sensor GS-551 by Ono Sokki Co., Ltd. The negative electrode active material layer on one side of the negative electrode 1 was then removed, and the thickness was again measured. All of the negative electrode active material layer remaining on the negative electrode power collector was then removed, and the thickness of the copper foil was measured. When the film thickness of the negative electrode active material layer of the negative electrode 1 was determined from the obtained measurement results, the top face of the negative electrode active material layer was 34 μm and the bottom face of the negative electrode active material layer was 32 μm, and the top face was used as the negative electrode Ay1 and the bottom face as the negative electrode Ax1 side.

[Measurement of Capacitance Per Unit Weight of Negative Electrode]

One piece of the obtained negative electrode 1 was cut out to a size of 1.4 cm×2.0 cm (2.8 cm$^2$), and the negative electrode active material layer on the Ax1 coated onto the copper foil was removed using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethyl methyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 1 (lithium ion doping amount) was 545 mAh/g.

<Preparation of Electrolytic Solution>

As an organic solvent there was used a mixed solvent of ethylene carbonate (EC): ethyl methyl carbonate (EMC) =33:67 (volume ratio), and each electrolyte salt was dissolved so that the concentration ratio of LiN(SO$_2$F)$_2$ and LiPF$_6$ was 75:25 (molar ratio) with respect to the total electrolytic solution and the total concentration of LiN (SO$_2$F)$_2$ and LiPF$_6$ was 1.2 mol/L, to obtain nonaqueous electrolytic solution 1. The concentrations of LiN(SO$_2$F)$_2$ and LiPF$_6$ in nonaqueous electrolytic solution 1 were 0.9 mol/L and 0.3 mol/L, respectively.

<Fabrication of Nonaqueous Lithium Power Storage Element>

Twenty-one of the obtained positive electrode precursors 1 were then cut out, with the positive electrode active material layers at sizes of 10.0 cm×10.0 cm (100 cm$^2$). Next, 20 negative electrodes 1 were cut out, with the negative electrode active material layers at sizes of 10.1 cm×10.1 cm (102 cm$^2$). Also, 40 10.3 cm×10.3 cm (106 cm$^2$) polyethylene separators (by ASAHI KASEI KABUSHIKI KAISHA, thickness: 10 μm) were prepared. These were laminated in the order: positive electrode precursor 1, separator, negative electrode 1, separator, positive electrode precursor 1, with positive electrode precursors 1 as the outermost layers, and with the positive electrode precursor C$_{x1}$ sides and negative electrode A$_{x1}$ sides facing each other across separators and the positive electrode precursor C$_{y1}$ sides and negative electrode A$_{y1}$ sides facing each other across separators, to obtain an electrode laminated body. The positive electrode terminal and negative electrode terminal were ultrasonically welded to the obtained electrode laminated body and placed in a vessel formed of an aluminum laminate package material equipped with a degassing valve with a checking valve, and 3 sides including the electrode terminal section were sealed by heat sealing.

Approximately 70 g of the nonaqueous electrolytic solution 1 was injected into the electrode laminated body housed in the aluminum laminate package material, in a dry air environment at atmospheric pressure, a temperature of 25° C. and a dew point of no higher than −40° C. Next, the aluminum laminate package material housing the electrode laminated body and nonaqueous electrolytic solution was placed in a pressure reduction chamber and the pressure was reduced from atmospheric pressure to −87 kPa, after which it was restored to atmospheric pressure and allowed to stand for 5 minutes. The step of reducing the pressure of the package material in the chamber from atmospheric pressure to −87 kPa and then restoring to atmospheric pressure was subsequently repeated 4 times, and then it was then allowed to stand for 15 minutes. The pressure of the package material in the chamber was again reduced from atmospheric pressure to −91 kPa, and then restored to atmospheric pressure. The step of pressure reduction of the package material and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with nonaqueous electrolytic solution 1 by this procedure.

Next, the electrode laminated body impregnated with the nonaqueous electrolytic solution 1 was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The electrode laminated body obtained after sealing was placed in an argon box at a temperature of 25° C., a dew point of −60° C. and an oxygen concentration of 1 ppm. The excess portion of the aluminum laminate package material was cut to unseal it, and it was subjected to initial charging by a method of constant-current charge using a power source by Matsusada Precision, Inc. (P4LT18-0.2), with a current value of 100 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging Step]

The lithium-doped electrode laminated body was removed from the argon box and subjected to constant-current discharge in an environment of 25° C. at 100 mA until reaching a voltage of 3.8 V, and then constant-current discharge at 3.8 V for 1 hour, to adjust the voltage to 3.8 V. The electrode laminated body was then stored for 48 hours in a thermostatic bath at 60° C.

[Degassing Step]

A portion of the aluminum laminate package material of the aged electrode laminated body was unsealed in a dry air environment with a temperature of 25° C. and a dew point of −40° C. Next, the electrode laminated body was placed in a pressure reduction chamber, and a step of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the electrode laminated body was placed in a pressure-reducing sealing machine, and after pressure reduction to −90 kPa, it was sealed at 200° C. for 10 seconds at a pressure of 0.1 MPa to seal the aluminum laminate package material, to fabricate a nonaqueous lithium power storage element. Three nonaqueous lithium power storage elements were fabricated by this step.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima Ltd. in a thermostatic bath set to 25° C., at the 2 C current value (1.6 A) until reaching 3.8 V, and then constant-voltage charge was carried out with application of a constant voltage of 3.8 V for a total of 30 minutes. Next, with the capacitance after constant-current discharge to 2.2 V at the 2 C current value (1.6 A) as Q [C], F=Q/(3.8−2.2) was calculated as the electrostatic capacitance Fa, to be 1753F.

[Measurement of Internal Resistance Ra]

The same nonaqueous lithium power storage element was subjected to constant-current charge using a charge/discharge apparatus (5 V, 360 A) by Fujitsu Telecom Networks, Fukushima Ltd. in a thermostatic bath set to 25° C., at the 20 C current value (16 A) until reaching 3.8 V, and then constant-voltage charge was carried out with application of a constant voltage of 3.8 V for a total of 30 minutes. Next, constant-current discharge was carried out down to 2.2 V with a sampling time of 0.1 second and the 20 C current value (16 A), to obtain a discharge curve (time-voltage). From the discharge curve, with a voltage of Eo at discharge time=0 seconds, obtained by extrapolating by linear approximation from the voltage values at discharge times of 2 seconds and 4 seconds, the internal resistance Ra was calculated from the voltage drop $\Delta E=3.8-Eo$ and $R=\Delta E/(20$ C current value), to be 0.57 mΩ.

[High-temperature Storage Test]

The same nonaqueous lithium power storage element was subjected to constant-current charge using a charge/discharge apparatus (5 V, 360 A) by Fujitsu Telecom Networks, Ltd. in a thermostatic bath set to 25° C., with a 100 C current value (80 A) until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging step, and the cell was again stored in a 60° C. environment. This step was repeated for a period of 2 months, and the cell volume Va before start of the storage test and the volume Vb of the cell after two months of the storage test were measured by Archimedes' method in a 25° C. environment, using FLUORINERT (registered trademark of 3M Co. Japan) FC-40 as the measuring solvent. The value of B, as the gas generation volume determined by Vb−Va normalized by the electrostatic capacitance Fa, was $1.95 \times 10^{-3}$ cc/F.

[Nail-penetration Test]

One of the remaining nonaqueous lithium power storage elements obtained by the step described above was subjected to constant-current charge using a power source (ELZ-175) by Takasago, Ltd. in an explosion-proof thermostatic bath set to 25° C., with the 20 C current value (16 A) until reaching 4.0 V, and then constant-voltage charge was carried out with application of a constant voltage of 4.0 V for a total of 10 minutes. The power source was then removed, a thermocouple was attached to the negative electrode terminal, the positive electrode terminal and near the center section of the casing, and an iron nail (N65) was situated at the center section of the nonaqueous lithium power storage element in the direction perpendicular to the planar direction. Measurement was initiated with a 0.1 second interval for the sampling time of the data logger, and the nail was penetrated through at a penetration speed of 30 mm/sec. The maximum temperature reached at the negative electrode terminal during the nail-penetration test was 44° C., and the condition of the nonaqueous lithium power storage element after the nail-penetration test was "splitting".

[Calculation of $C_{x1}$, $C_{y1}$, $C_{x2}$, $C_{y2}$, $A_{x1}$ and $A_{y1}$]

The remaining nonaqueous lithium power storage element that had been obtained was adjusted to a voltage of 2.9 V and disassembled in an argon box at a dew point temperature of −72° C., and $C_{x1}$, $C_{y1}$, $C_{x2}$, $C_{y2}$, $A_{x1}$ and $A_{y1}$ were calculated by formula (7), formula (8) and formula (9), by the method described above.

[Microscopic Raman Spectroscopy]

The positive electrode was cut out to a size of 10 cm×10 cm from the electrode laminated body obtained by disassembling the nonaqueous lithium power storage element. The obtained positive electrode was immersed in 30 g of a diethyl carbonate solvent and was washed for 10 minutes while occasionally moving the positive electrode with a pincette. The positive electrode was then removed out and air-dried for 5 minutes in an argon box, and then immersed in 30 g of freshly prepared diethyl carbonate solvent and washed for 10 minutes by the same method as described above. The washed positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 1.

Two small 1 cm×1 cm pieces were cut out from the positive electrode sample 1 obtained above, while maintaining a state of non-exposure to air, and sample $S_x$ was prepared by removing the positive electrode active material layer on the $C_y$ side while sample $S_y$ was prepared by removing the positive electrode active material layer on the $C_x$ side, using a spatula, brush or bristles, as samples for microscopic Raman spectroscopy.

(Measurement)

Carbonate ion mapping was performed using an inVia Reflex Raman microscope by Renishaw Co. The excitation light laser wavelength was 532 nm and focusing was to a power of approximately 0.7 mW at the sample position, using a long-working-distance 50× objective lens. Point scanning was performed at 1 μm intervals in a range of 90 μm in the thickness direction of the positive electrode cross-section and 30 μm in the direction perpendicular to the thickness direction, and a Raman spectrum was obtained for each measurement point. For the peak due to carbonate ion observed at 1086 cm$^{-1}$ in the Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. A negative sign was assigned to the area appearing on the negative side of the baseline. The carbonate ion peak area was traced as the space distribution, and an imaging representation for carbonate ion was obtained.

(Calculation of Areas $S_x$ and $S_y$ in Carbonate Ion Mapping)

The areas $S_x$ and $S_y$ in carbonate ion mapping were calculated as follows. A straight baseline was set at positions of 1071 and 1104 cm$^{-1}$ in the Raman spectra for 2700 points obtained at each measurement position on the front side of the sample $S_x$, setting the area at the portions higher than the baseline as positive and the areas of the lower portions as negative, to construct the mapping data area (a). Next, the region from the maximum value to the minimum value of the area (a) was divided into 100 zones to construct histogram A, and the portion on the negative side from the area value giving the maximum frequency was fitted by the least square method using a Gaussian function, thereby approximating the noise component by a Gaussian function B. The difference obtained by subtracting the fitted Gaussian function B from the original histogram A was used as histogram C for the peak area of $CO_3^{2-}$. In histogram C, the cumulative frequency greater than the area (b) giving the maximum frequency was determined to be 165, as the mapping frequency for $CO_3^{2-}$ ion. This was divided by the total frequency of 2700 to calculate the area $S_x$ of carbonate ion mapping, which was $S_x$=6.1%. Similarly, the area $S_y$ of carbonate ion mapping for the sample $S_y$ was calculated to be $S_y$=5.9%.

[Calculation of $C_{y3}$ and $A_{y3}$]

While maintaining a state of non-exposure to air in the Ar box, the remaining positive electrode sample 1 was cut to a size of 10 cm×5 cm, and a spatula, brush or bristles were used to remove the positive electrode active material layer on the $C_x$ side. The obtained positive electrode sample 1 was washed for 10 minutes with 30 g of a diethyl carbonate solvent and was vacuum dried in a side box while maintaining a state of non-exposure to air. The dried positive electrode body was transferred from the side box to an Ar box while maintaining a state of non-exposure to air and was immersed and extracted in heavy water to obtain a positive electrode body liquid extract. Analysis of the liquid extract was by ion chromatography (IC) and $^1$H-NMR, and the abundance $C_{y3}$ (mol/g) per unit weight of the positive electrode active material for each compound accumulated on the positive electrode body was determined by the following formula (12), from the concentration $C_1$ (mol/ml) of each compound in the positive electrode body liquid extract, the volume $D_1$ (ml) of heavy water used for extraction and the weight $E_1$ (g) of active material of the positive electrode used for extraction.

$$C_{y3}=C_1 \times D_1/E_1 \tag{12}$$

The active material weight in the positive electrode active material layer used for extraction was determined by the following method.

The positive electrode active material layer was peeled off from the power collector of the positive electrode body remaining after heavy water extraction, using a spatula, brush or bristles, and the peeled off positive electrode active material layer was washed and then vacuum dried. The positive electrode active material layer obtained by vacuum drying was washed with NMP. Next, the obtained positive electrode active material layer was again vacuum dried and weighed to determine the weight of the positive electrode active material layer used for extraction.

(1H-NMR Measurement)

The positive electrode body liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and 1H NMR measurement was performed by the double tube method. The measurement results were normalized by the 7.1 ppm (m, 2H) signal of 1,2,4,5-tetrafluorobenzene, and the integral of each observed compound was calculated.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and 1H NMR measurement was performed by the double tube method. In the same manner as above, the measurement results were normalized by the 7.1 ppm (m, 2H) signal of 1,2,4,5-tetrafluorobenzene, and the integral of the 2.6 ppm (s, 6H) signal of dimethyl sulfoxide was calculated. The concentration $C_1$ of each compound in the positive electrode body liquid extract was determined based on the relationship between the dimethyl sulfoxide concentration used and the integral.

Assignment for the $^1$H NMR spectrum was as follows.
(For LiOCH$_2$CH$_2$OLi)
CH$_2$ in LiOCH$_2$CH$_2$OLi: 3.7 ppm (s, 4H)
CH$_3$OLi: 3.3 ppm (s, 3H)
CH$_3$ in CH$_3$CH$_2$OLi: 1.2 ppm (t, 3H)
CH$_2$O in CH$_3$CH$_2$OLi: 3.7 ppm (q, 2H)

Since the signal for $CH_2$ in $LiOCH_2CH_2OLi$ (3.7 ppm) thus overlaps the signal for $CH_2O$ in $CH_3CH_2OLi$ (3.7 ppm), the amount of $LiOCH_2CH_2OLi$ was calculated without the portion corresponding to $CH_2O$ in $CH_3CH_2OLi$, calculated from the signal for $CH_3$ in $CH_3CH_2OLi$ (1.2 ppm).

From the concentration of each compound in the liquid extract as determined by the analysis described above, as well as the volume of heavy water used for extraction and the active material weight of the positive electrode used for extraction, it was possible to calculate the concentration $C_{y3}$ of $LiOCH_2CH_2OLi$ on the $C_y$ side, as $83.9 \times 10^{-4}$ mol/g.

Using the same method, it was possible to calculate the concentration $A_{y3}$ of $LiOCH_2CH_2OLi$ in the negative electrode active material layer facing the $C_y$ side, as $43.0 \times 10^{-4}$ mol/g.

Example 2

A nonaqueous lithium power storage element was fabricated by the same method as Example 1, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 3

A nonaqueous lithium power storage element was fabricated by the same method as Example 1, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 4

A nonaqueous lithium power storage element was fabricated by the same method as Example 1, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 72 hours, for lithium doping at the negative electrode.

Example 5

A nonaqueous lithium power storage element was fabricated by the same method as Example 4, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 36 hours, for lithium doping at the negative electrode.

Example 6

A nonaqueous lithium power storage element was fabricated by the same method as Example 4, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 12 hours, for lithium doping at the negative electrode.

Example 7

A nonaqueous lithium power storage element was fabricated by the same method as Example 1, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 72 hours, for lithium doping at the negative electrode.

Example 8

A nonaqueous lithium power storage element was fabricated by the same method as Example 7, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 36 hours, for lithium doping at the negative electrode.

Example 9

A nonaqueous lithium power storage element was fabricated by the same method as Example 7, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 12 hours, for lithium doping at the negative electrode.

Example 10

Coating solution 3C was prepared by dispersion by the same method as Example 1, except that NMP (N-methylpyrrolidone) was mixed to a solid weight ratio of 26.0% during fabrication of the positive electrode precursor. A nonaqueous lithium power storage element was fabricated by the same method as Example 1, except for fabricating the positive electrode precursor 2 using coating solution 1C and coating solution 3C.

Example 11

A nonaqueous lithium power storage element was fabricated by the same method as Example 10, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 12

A nonaqueous lithium power storage element was fabricated by the same method as Example 10, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 13

Coating solution 4C was prepared by dispersion by the same method as Example 1, except that NMP (N-methylpyrrolidone) was mixed to a solid weight ratio of 33.7% during fabrication of the positive electrode precursor. A nonaqueous lithium power storage element was fabricated by the same method as Example 1, except for fabricating the positive electrode precursor 3 using coating solution 1C and coating solution 4C.

Example 14

A nonaqueous lithium power storage element was fabricated by the same method as Example 13, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 15

A nonaqueous lithium power storage element was fabricated by the same method as Example 13, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 16

Coating solution 3A was prepared by dispersion by the same method as Example 1, except that NMP (N-methylpyrrolidone) was mixed to a solid weight ratio of 25.7% during fabrication of the negative electrode precursor. A nonaqueous lithium power storage element was fabricated by the same method as Example 1, except for fabricating the negative electrode 2 using coating solution 1A and coating solution 3A.

Example 17

A nonaqueous lithium power storage element was fabricated by the same method as Example 16, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 18

A nonaqueous lithium power storage element was fabricated by the same method as Example 16, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 19

Coating solution 4A was prepared by dispersion by the same method as Example 1, except that NMP (N-methylpyrrolidone) was mixed to a solid weight ratio of 31.2% during fabrication of the negative electrode precursor. A nonaqueous lithium power storage element was fabricated by the same method as Example 1, except for fabricating the negative electrode 3 using coating solution 1A and coating solution 4A.

Example 20

A nonaqueous lithium power storage element was fabricated by the same method as Example 19, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 21

A nonaqueous lithium power storage element was fabricated by the same method as Example 19, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 1

Coating solution 5C was prepared by dispersion by the same method as Example 1, except that NMP (N-methylpyrrolidone) was mixed to a solid weight ratio of 24.2% during fabrication of the positive electrode precursor. A nonaqueous lithium power storage element was fabricated by the same method as Example 1, except for fabricating the positive electrode precursor 4 using coating solution 1C and coating solution 5C.

Comparative Example 2

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 3

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 4

Coating solution 6C was prepared by dispersion by the same method as Example 1, except that NMP (N-methylpyrrolidone) was mixed to a solid weight ratio of 21.5% during fabrication of the positive electrode precursor. A nonaqueous lithium power storage element was fabricated by the same method as Example 1, except for fabricating the positive electrode precursor 5 using coating solution 1C and coating solution 6C.

Comparative Example 5

A nonaqueous lithium power storage element was fabricated by the same method as Comparative Example 4, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 6

A nonaqueous lithium power storage element was fabricated by the same method as Comparative Example 4, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 7

Coating solution 7C was prepared by dispersion by the same method as Example 1, except that NMP (N-methylpyrrolidone) was mixed to a solid weight ratio of 35.3% during fabrication of the positive electrode precursor. A nonaqueous lithium power storage element was fabricated by the same method as Example 1, except for fabricating the positive electrode precursor 6 using coating solution 1C and coating solution 7C.

Comparative Example 8

A nonaqueous lithium power storage element was fabricated by the same method as Comparative Example 7, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 9

A nonaqueous lithium power storage element was fabricated by the same method as Comparative Example 7, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 10

Coating solution 8C was prepared by dispersion by the same method as Example 1, except that NMP (N-methylpyrrolidone) was mixed to a solid weight ratio of 38.8% during fabrication of the positive electrode precursor. A nonaqueous lithium power storage element was fabricated by the same method as Example 1, except for fabricating the positive electrode precursor 7 using coating solution 1C and coating solution 8C.

Comparative Example 11

A nonaqueous lithium power storage element was fabricated by the same method as Comparative Example 10, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 12

A nonaqueous lithium power storage element was fabricated by the same method as Comparative Example 10, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 13

Coating solution 5A was prepared by dispersion by the same method as Example 1, except that NMP (N-methylpyrrolidone) was mixed to a solid weight ratio of 24.0% during fabrication of the negative electrode precursor. A nonaqueous lithium power storage element was fabricated by the same method as Example 1, except for fabricating the negative electrode 4 using coating solution 1A and coating solution 5A.

Comparative Example 14

A nonaqueous lithium power storage element was fabricated by the same method as Comparative Example 13, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 15

A nonaqueous lithium power storage element was fabricated by the same method as Comparative Example 13, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 16

Coating solution 6A was prepared by dispersion by the same method as Example 1, except that NMP (N-methyl-pyrrolidone) was mixed to a solid weight ratio of 33.5% during fabrication of the negative electrode precursor. A nonaqueous lithium power storage element was fabricated by the same method as Example 1, except for fabricating the negative electrode 5 using coating solution 1A and coating solution 6A.

Comparative Example 17

A nonaqueous lithium power storage element was fabricated by the same method as Comparative Example 16, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 18

A nonaqueous lithium power storage element was fabricated by the same method as Comparative Example 16, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 19

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 20

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 21

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 22

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 5.0 V, and then constant-voltage charge was carried out at 5.0 V continuously for 72 hours, for lithium doping at the negative electrode.

Comparative Example 23

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 5.1 V, and then constant-voltage charge was carried out at 5.1 V continuously for 72 hours, for lithium doping at the negative electrode.

Comparative Example 24

A nonaqueous lithium power storage element was fabricated by the same method as Comparative Example 1, except that for initial charging of the nonaqueous lithium power storage element in the lithium doping step, constant-current charge was carried out at a current value of 100 mA until reaching a voltage of 5.2 V, and then constant-voltage charge was carried out at 5.2 V continuously for 72 hours, for lithium doping at the negative electrode.

The evaluation results for Examples 1 to 21 and Comparative Examples 1 to 24 are shown in Tables 1 and 2.

TABLE 1

| | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{y2}/C_{x2}$ | $C_{x2}/C_{y2}$ | $(C_{x1}+A_{x1})/(C_{y1}+A_{y1})$ | $(C_{x1}+C_{x2}+A_{y1})/(C_{y1}+C_{y2}+A_{x1})$ |
|---|---|---|---|---|---|---|---|---|---|---|---|---|
| Example 1 | 28.8 | 27.4 | 5.5 | 5.2 | 25.5 | 26.3 | 1.05 | 0.97 | 0.95 | 1.06 | 1.01 | 1.04 |
| Example 2 | 27.7 | 26.1 | 9.0 | 8.5 | 24.3 | 26.0 | 1.06 | 0.93 | 0.94 | 1.06 | 1.00 | 1.06 |
| Example 3 | 28.4 | 26.3 | 14.3 | 13.2 | 25.5 | 26.8 | 1.08 | 0.95 | 0.92 | 1.08 | 1.02 | 1.07 |
| Example 4 | 29.1 | 27.4 | 2.1 | 2.0 | 25.5 | 26.3 | 1.06 | 0.97 | 0.95 | 1.05 | 1.02 | 1.05 |
| Example 5 | 28.2 | 26.3 | 5.0 | 4.7 | 24.7 | 25.2 | 1.07 | 0.98 | 0.94 | 1.06 | 1.03 | 1.05 |
| Example 6 | 28.8 | 26.1 | 8.9 | 8.1 | 25.2 | 26.0 | 1.10 | 0.97 | 0.91 | 1.10 | 1.04 | 1.07 |
| Example 7 | 28.8 | 26.1 | 8.9 | 8.1 | 25.3 | 26.5 | 1.10 | 0.95 | 0.91 | 1.10 | 1.03 | 1.08 |
| Example 8 | 28.5 | 27.4 | 12.2 | 11.7 | 25.0 | 25.7 | 1.04 | 0.97 | 0.96 | 1.04 | 1.01 | 1.04 |
| Example 9 | 28.5 | 27.4 | 16.6 | 16.0 | 25.0 | 26.3 | 1.04 | 0.95 | 0.96 | 1.04 | 1.00 | 1.04 |
| Example 10 | 29.1 | 25.5 | 5.7 | 3.9 | 25.5 | 26.3 | 1.14 | 0.97 | 0.68 | 1.46 | 1.05 | 1.11 |
| Example 11 | 27.9 | 24.8 | 8.5 | 5.6 | 24.5 | 26.0 | 1.13 | 0.94 | 0.66 | 1.52 | 1.03 | 1.14 |
| Example 12 | 28.2 | 24.8 | 14.9 | 9.1 | 24.7 | 26.8 | 1.14 | 0.92 | 0.61 | 1.64 | 1.03 | 1.19 |

TABLE 1-continued

|  | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{y2}/C_{x2}$ | $C_{x2}/C_{y2}$ | $(C_{x1}+A_{x1})/(C_{y1}+A_{y1})$ | $(C_{x1}+C_{x2}+A_{y1})/(C_{y1}+C_{y2}+A_{x1})$ |
|---|---|---|---|---|---|---|---|---|---|---|---|---|
| Example 13 | 28.5 | 32.3 | 5.2 | 7.2 | 25.0 | 26.0 | 0.88 | 0.96 | 1.38 | 0.72 | 0.92 | 0.93 |
| Example 14 | 28.5 | 33.0 | 8.3 | 11.5 | 25.0 | 25.2 | 0.86 | 0.99 | 1.39 | 0.72 | 0.92 | 0.89 |
| Example 15 | 28.5 | 33.1 | 12.4 | 15.6 | 25.0 | 26.5 | 0.86 | 0.94 | 1.26 | 0.79 | 0.90 | 0.91 |
| Example 16 | 29.2 | 27.4 | 5.6 | 5.3 | 22.0 | 25.7 | 1.07 | 0.86 | 0.95 | 1.06 | 0.96 | 1.11 |
| Example 17 | 28.2 | 25.6 | 9.3 | 7.7 | 22.3 | 26.0 | 1.10 | 0.86 | 0.83 | 1.21 | 0.98 | 1.14 |
| Example 18 | 28.5 | 26.3 | 14.0 | 12.5 | 22.5 | 26.3 | 1.08 | 0.86 | 0.89 | 1.12 | 0.97 | 1.12 |
| Example 19 | 29.1 | 26.9 | 5.8 | 5.4 | 29.7 | 26.3 | 1.08 | 1.13 | 0.93 | 1.07 | 1.11 | 0.99 |
| Example 20 | 27.9 | 26.7 | 8.5 | 7.7 | 29.9 | 26.0 | 1.04 | 1.15 | 0.91 | 1.10 | 1.10 | 0.97 |
| Example 21 | 28.2 | 26.5 | 13.9 | 12.7 | 30.2 | 26.6 | 1.06 | 1.14 | 0.91 | 1.09 | 1.10 | 0.99 |
| Comp. Ex. 1 | 28.2 | 23.9 | 5.6 | 3.0 | 24.8 | 26.3 | 1.18 | 0.94 | 0.54 | 1.87 | 1.06 | 1.16 |
| Comp. Ex. 2 | 28.2 | 24.1 | 8.6 | 4.9 | 24.7 | 26.4 | 1.17 | 0.94 | 0.57 | 1.76 | 1.05 | 1.18 |
| Comp. Ex. 3 | 29.1 | 24.2 | 13.6 | 7.8 | 25.8 | 26.8 | 1.20 | 0.96 | 0.57 | 1.74 | 1.08 | 1.20 |
| Comp. Ex. 4 | 28.8 | 20.4 | 4.3 | 2.2 | 25.3 | 26.3 | 1.41 | 0.96 | 0.51 | 1.95 | 1.16 | 1.24 |
| Comp. Ex. 5 | 28.5 | 20.9 | 8.8 | 4.0 | 25.0 | 26.0 | 1.36 | 0.96 | 0.45 | 2.20 | 1.14 | 1.27 |
| Comp. Ex. 6 | 28.5 | 20.3 | 13.7 | 6.7 | 25.0 | 26.0 | 1.40 | 0.96 | 0.49 | 2.04 | 1.16 | 1.31 |
| Comp. Ex. 7 | 28.3 | 35.7 | 5.2 | 7.5 | 25.5 | 26.5 | 0.79 | 0.96 | 1.44 | 0.69 | 0.86 | 0.87 |
| Comp. Ex. 8 | 28.2 | 35.5 | 8.9 | 12.7 | 24.5 | 25.5 | 0.79 | 0.96 | 1.43 | 0.70 | 0.86 | 0.86 |
| Comp. Ex. 9 | 28.2 | 35.4 | 12.4 | 17.7 | 24.0 | 25.0 | 0.80 | 0.96 | 1.43 | 0.70 | 0.86 | 0.85 |
| Comp. Ex. 10 | 29.1 | 40.5 | 5.0 | 8.4 | 25.5 | 26.5 | 0.72 | 0.96 | 1.68 | 0.60 | 0.81 | 0.81 |
| Comp. Ex. 11 | 28.8 | 41.0 | 8.9 | 14.3 | 25.2 | 26.3 | 0.70 | 0.96 | 1.61 | 0.62 | 0.80 | 0.80 |
| Comp. Ex. 12 | 27.7 | 40.6 | 13.0 | 20.1 | 24.3 | 25.2 | 0.68 | 0.96 | 1.55 | 0.65 | 0.79 | 0.78 |
| Comp. Ex. 13 | 28.8 | 26.5 | 5.5 | 4.8 | 20.2 | 26.3 | 1.09 | 0.77 | 0.87 | 1.15 | 0.93 | 1.18 |
| Comp. Ex. 14 | 28.5 | 27.3 | 8.9 | 8.0 | 20.1 | 26.0 | 1.04 | 0.77 | 0.90 | 1.11 | 0.91 | 1.14 |
| Comp. Ex. 15 | 28.5 | 26.8 | 13.0 | 12.2 | 20.0 | 26.0 | 1.06 | 0.77 | 0.94 | 1.07 | 0.92 | 1.14 |
| Comp. Ex. 16 | 29.1 | 26.8 | 5.3 | 4.9 | 32.5 | 26.5 | 1.09 | 1.23 | 0.92 | 1.08 | 1.16 | 0.95 |
| Comp. Ex. 17 | 27.9 | 26.0 | 8.6 | 8.1 | 32.0 | 25.5 | 1.07 | 1.25 | 0.94 | 1.06 | 1.16 | 0.94 |
| Comp. Ex. 18 | 28.5 | 25.5 | 12.5 | 12.0 | 32.1 | 26.0 | 1.12 | 1.23 | 0.96 | 1.04 | 1.18 | 0.96 |
| Comp. Ex. 19 | 28.3 | 24.0 | 20.0 | 17.3 | 25.5 | 26.3 | 1.18 | 0.97 | 0.87 | 1.16 | 1.07 | 1.12 |
| Comp. Ex. 20 | 28.1 | 23.9 | 20.4 | 17.9 | 24.7 | 25.2 | 1.18 | 0.98 | 0.88 | 1.14 | 1.08 | 1.11 |
| Comp. Ex. 21 | 28.2 | 23.9 | 21.0 | 18.2 | 25.2 | 26.0 | 1.18 | 0.97 | 0.87 | 1.15 | 1.07 | 1.12 |
| Comp. Ex. 22 | 28.0 | 24.0 | 0.5 | 0.4 | 25.3 | 26.5 | 1.17 | 0.95 | 0.80 | 1.25 | 1.06 | 1.11 |
| Comp. Ex. 23 | 28.3 | 23.8 | 0.3 | 0.2 | 25.0 | 25.7 | 1.19 | 0.97 | 0.67 | 1.50 | 1.08 | 1.11 |
| Comp. Ex. 24 | 28.2 | 23.8 | 0.1 | 0.1 | 25.0 | 26.3 | 1.18 | 0.95 | 1.00 | 1.00 | 1.06 | 1.12 |

TABLE 2

|  | Microscopic Raman spectroscopy | | | $C_{y3}$ ($10^{-4}$ mol/g) | $A_{y3}$ ($10^{-4}$ mol/g) | $C_{y3}/A_{y3}$ | Initial properties | | High-temperature storage test B ($10^{-3}$ cc/F) | Nail-penetration test | |
|---|---|---|---|---|---|---|---|---|---|---|---|
|  | $S_x$ (%) | $S_y$ (%) | $S_x/S_y$ |  |  |  | Fa (F) | Ra (mΩ) |  | Maximum temperature (°C.) | Condition |
| Example 1 | 6.1 | 5.9 | 1.03 | 83.9 | 43.0 | 2.0 | 1753 | 0.57 | 1.95 | 44 | Splitting |
| Example 2 | 13.4 | 12.0 | 1.12 | 39.5 | 36.8 | 1.1 | 1688 | 0.57 | 2.26 | 45 | Splitting |
| Example 3 | 34.5 | 26.7 | 1.29 | 27.3 | 36.9 | 0.7 | 1793 | 0.56 | 2.25 | 46 | Splitting |
| Example 4 | 1.9 | 1.5 | 1.27 | 295.2 | 44.9 | 6.6 | 1815 | 0.60 | 2.89 | 48 | Splitting |
| Example 5 | 5.6 | 4.5 | 1.24 | 184.8 | 20.7 | 8.9 | 1732 | 0.56 | 1.91 | 42 | Splitting |
| Example 6 | 12.1 | 10.5 | 1.15 | 159.3 | 8.0 | 19.9 | 1729 | 0.53 | 2.10 | 48 | Splitting |
| Example 7 | 12.7 | 10.4 | 1.22 | 38.8 | 39.7 | 1.0 | 1764 | 0.56 | 1.71 | 46 | Splitting |
| Example 8 | 25.5 | 20.4 | 1.25 | 9.1 | 21.0 | 0.4 | 1726 | 0.59 | 2.55 | 42 | Splitting |
| Example 9 | 36.8 | 33.5 | 1.10 | 2.4 | 10.9 | 0.2 | 1760 | 0.60 | 2.66 | 45 | Splitting |
| Example 10 | 6.7 | 4.5 | 1.49 | 102.8 | 40.7 | 2.5 | 1715 | 0.54 | 242 | 47 | Splitting |
| Example 11 | 10.7 | 7.2 | 1.49 | 39.2 | 34.3 | 1.1 | 1671 | 0.55 | 2.38 | 50 | Splitting |
| Example 12 | 30.1 | 17.8 | 1.69 | 19.2 | 35.3 | 0.5 | 1686 | 0.55 | 2.69 | 45 | Splitting |
| Example 13 | 7.0 | 9.5 | 0.74 | 85.0 | 39.0 | 2.2 | 1896 | 0.60 | 1.68 | 47 | Splitting |
| Example 14 | 10.3 | 18.0 | 0.57 | 74.5 | 37.7 | 2.0 | 1860 | 0.59 | 2.06 | 50 | Splitting |
| Example 15 | 20.4 | 35.0 | 0.58 | 40.7 | 39.7 | 1.0 | 1960 | 0.64 | 2.44 | 52 | Splitting |
| Example 16 | 6.9 | 5.0 | 1.38 | 77.8 | 55.6 | 1.4 | 1800 | 0.57 | 2.37 | 44 | Splitting |
| Example 17 | 14.3 | 9.5 | 1.51 | 44.2 | 34.3 | 1.3 | 1727 | 0.54 | 1.83 | 46 | Splitting |
| Example 18 | 28.9 | 24.0 | 1.20 | 13.8 | 28.4 | 0.5 | 1743 | 0.56 | 2.36 | 49 | Splitting |
| Example 19 | 5.8 | 4.9 | 1.18 | 84.5 | 30.5 | 2.8 | 1770 | 0.56 | 2.54 | 52 | Splitting |
| Example 20 | 11.6 | 9.2 | 1.26 | 45.7 | 45.0 | 1.0 | 1699 | 0.56 | 2.04 | 55 | Splitting |
| Example 21 | 28.8 | 26.0 | 1.11 | 18.7 | 39.5 | 0.5 | 1740 | 0.57 | 2.43 | 53 | Rupture |
| Comp. Ex. 1 | 6.0 | 2.9 | 2.07 | 81.4 | 47.0 | 1.7 | 1593 | 0.53 | 2.67 | 90 | Rupture |
| Comp. Ex. 2 | 12.0 | 5.1 | 2.35 | 38.3 | 40.2 | 1.0 | 1598 | 0.55 | 2.87 | 95 | Rupture |
| Comp. Ex. 3 | 31.2 | 10.1 | 3.09 | 29.8 | 37.3 | 0.8 | 1664 | 0.53 | 3.21 | 103 | Rupture |
| Comp. Ex. 4 | 3.3 | 1.8 | 1.83 | 85.6 | 52.3 | 1.6 | 1566 | 0.50 | 2.02 | 123 | Rupture |
| Comp. Ex. 5 | 12.3 | 3.7 | 3.32 | 39.9 | 39.1 | 1.0 | 1541 | 0.49 | 2.36 | 103 | Rupture |
| Comp. Ex. 6 | 33.2 | 8.3 | 4.00 | 27.8 | 35.6 | 0.8 | 1521 | 0.46 | 2.56 | 125 | Rupture |
| Comp. Ex. 7 | 6.7 | 10.3 | 0.65 | 88.2 | 51.3 | 1.7 | 1937 | 0.61 | 1.65 | 82 | Rupture |
| Comp. Ex. 8 | 13.0 | 27.0 | 0.48 | 37.6 | 38.8 | 1.0 | 1909 | 0.64 | 2.60 | 95 | Rupture |

TABLE 2-continued

| | Microscopic Raman spectroscopy | | | $C_{y3}$ | $A_{y3}$ | | Initial properties | | High-temperature storage test | Nail-penetration test | |
|---|---|---|---|---|---|---|---|---|---|---|---|
| | $S_x$ (%) | $S_y$ (%) | $S_x/S_y$ | $(10^{-4}$ mol/g) | $(10^{-4}$ mol/g) | $C_{y3}/A_{y3}$ | Fa (F) | Ra (mΩ) | B $(10^{-3}$ cc/F) | Maximum temperature (° C.) | Condition |
| Comp. Ex. 9 | 27.5 | 39.7 | 0.69 | 24.7 | 31.3 | 0.8 | 1830 | 0.63 | 2.78 | 87 | Rupture |
| Comp. Ex. 10 | 6.2 | 13.5 | 0.46 | 88.2 | 50.3 | 1.8 | 2059 | 0.65 | 1.94 | 120 | Rupture |
| Comp. Ex. 11 | 11.8 | 31.4 | 0.38 | 39.9 | 43.3 | 0.9 | 2020 | 0.67 | 2.71 | 130 | Rupture |
| Comp. Ex. 12 | 29.6 | 45.3 | 0.65 | 25.2 | 35.5 | 0.7 | 2055 | 0.71 | 2.70 | 133 | Rupture |
| Comp. Ex. 13 | 6.2 | 4.5 | 1.38 | 85.6 | 48.9 | 1.8 | 1760 | 0.57 | 2.38 | 85 | Rupture |
| Comp. Ex. 14 | 13.6 | 12.2 | 1.11 | 39.9 | 39.7 | 1.0 | 1740 | 0.55 | 2.63 | 92 | Rupture |
| Comp. Ex. 15 | 28.0 | 25.8 | 1.09 | 27.8 | 24.5 | 1.1 | 1724 | 0.53 | 2.62 | 84 | Rupture |
| Comp. Ex. 16 | 6.8 | 4.9 | 1.39 | 88.2 | 35.0 | 2.5 | 1814 | 0.57 | 2.02 | 112 | Rupture |
| Comp. Ex. 17 | 12.4 | 12.0 | 1.03 | 37.6 | 21.4 | 1.8 | 1615 | 0.54 | 2.40 | 120 | Rupture |
| Comp. Ex. 18 | 25.6 | 23.3 | 1.10 | 27.6 | 17.5 | 1.6 | 1684 | 0.53 | 2.51 | 132 | Rupture |
| Comp. Ex. 19 | 43.3 | 41.5 | 1.04 | 0.6 | 8.7 | 0.1 | 1380 | 0.77 | 4.67 | 75 | Rupture |
| Comp. Ex. 20 | 44.5 | 42.1 | 1.06 | 0.4 | 7.8 | 0.1 | 1258 | 0.82 | 5.21 | 80 | Rupture |
| Comp. Ex. 21 | 46.2 | 40.5 | 1.14 | 0.4 | 6.6 | 0.1 | 1041 | 0.88 | 5.77 | 72 | Rupture |
| Comp. Ex. 22 | 0.7 | 0.6 | 1.17 | 330.0 | 63.2 | 5.2 | 1571 | 0.73 | 4.57 | 76 | Rupture |
| Comp. Ex. 23 | 0.5 | 0.5 | 1.00 | 356.0 | 65.6 | 5.4 | 1508 | 0.81 | 5.01 | 81 | Rupture |
| Comp. Ex. 24 | 0.3 | 0.2 | 1.50 | 388.0 | 78.8 | 4.9 | 1437 | 0.93 | 5.67 | 70 | Rupture |

Example 22

<Production of Positive Electrode Precursor>

Activated carbon 1 was used as the positive electrode active material to produce a positive electrode precursor.

After mixing 50.0 parts by weight of activated carbon 1, 37.5 parts by weight of lithium carbonate, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone) to a solid weight ratio of 33.2%, the mixture was dispersed using a FILMIX® thin-film spinning high-speed mixer by PRIMIX Corp., under conditions with a circumferential speed of 17 m/s, to obtain coating solution 9C.

The viscosity (ηb) of the obtained coating solution 9C was 2,790 mPa·s, the TI value was 4.2 and the granularity was 29 μm. Coating solution 10C was obtained by dispersion by the same method as described above, except that the contents and NMP (N-methylpyrrolidone) were mixed to a solid weight ratio of 31.5%. The viscosity (ηb) of the obtained coating solution 10C was 2,710 mPa·s, the TI value was 4.2 and the granularity was 30 μm.

Coating solution 9C was coated onto the top side of an aluminum foil with a thickness of 15 μm and coating solution 10C was coated onto the bottom side of the aluminum foil, using a double-side die coater by Toray Engineering Co., Ltd. under conditions with a coating speed of 1 m/s, and they were dried at a drying temperature of 120° C. to obtain positive electrode precursor 8. The obtained positive electrode precursor 8 was pressed using a roll press under conditions with a pressure of 6 kN/cm and a pressed portion surface temperature of 25° C. The film thickness on the top side of the positive electrode active material layer on the positive electrode precursor 8 was 51 μm, the film thickness on the bottom side of the positive electrode active material layer was 49 μm, and the top side was used as the positive electrode precursor Cx1 side while the bottom side was used as the positive electrode precursor Cy1 side.

<Preparation of Negative Electrode Active Material: Preparation Example 2>

The BET specific surface area and pore distribution of commercially available coconut shell activated carbon were measured by the method described above, using a pore distribution measuring apparatus (AUTOSORB-1 AS-1-MP) by Yuasa Ionics Co., Ltd. As a result, the BET specific surface area was 1,790 m²/g, the mesopore volume ($V_1$) was 0.199 cc/g, the micropore volume ($V_2$) was 0.698 cc/g, $V_1/V_{2=0.29}$, and the mean pore size was 20.1 Å.

A 300 g portion of the coconut shell activated carbon was placed into a stainless-steel mesh basket and placed on a stainless-steel vat containing 540 g of coal pitch (softening point: 50° C.), and both were set in an electric furnace (furnace inner usable dimension: 300 mm×300 mm×300 mm). This was increased in temperature to 600° C. for 8 hours under a nitrogen atmosphere and kept at the same temperature for 4 hours for thermal reaction to obtain composite porous carbon material 1b. The obtained composite porous carbon material 1b was cooled to 60° C. by natural cooling, and then removed out from the electric furnace.

The BET specific surface area and pore distribution of the obtained composite porous carbon material 1b were measured by the same methods as described above. As a result, the BET specific surface area was 262 m²/g, the mesopore volume ($V_{m1}$) was 0.186 cc/g, the micropore volume ($V_{m2}$) was 0.082 cc/g and $V_{m1}/V_{m2=2.27}$. Also, for composite porous carbon material 1b, the weight ratio of coal pitch-derived carbonaceous material with respect to activated carbon was 78%.

<Production of Negative Electrode>

Composite porous carbon material 1b was then used as a negative electrode active material to produce a negative electrode.

After mixing 84 parts by weight of composite porous carbon material 1b, 10 parts by weight of acetylene black, 6 parts by weight of PVdF (polyvinylidene fluoride) and NMP (N-methylpyrrolidone) to a solid weight ratio of 24.2%, the mixture was dispersed using a FILMIX® thin-film spinning high-speed mixer by PRIMIX Corp., under conditions with a circumferential speed of 17 m/s, to obtain coating solution 7A.

The viscosity (ηb) of the obtained coating solution 7A was 2,710 mPa·s and the TI value was 4.1. Coating solution 8A was obtained by dispersion by the same method as described above, except that the contents and NMP (N-methylpyrrolidone) were mixed to a solid weight ratio of 23.5%. The viscosity (ηb) of the obtained coating solution 8A was 2,680 mPa·s and the TI value was 4.1.

Coating solution 7A was coated onto the top side of an electrolytic copper foil with a thickness of 10 μm and coating solution 8A was coated onto the bottom side of an electrolytic copper foil, using a die coater by Toray Engineering Co., Ltd. under conditions with a coating speed of 2 m/s, and dried at a drying temperature of 120° C. to obtain negative electrode 7. This was pressed using a roll press under conditions with a pressure of 5 kN/cm and a pressed portion surface temperature of 25° C. The film thickness on the top side of the negative electrode active material layer on the negative electrode 7 was 38 μm, the film thickness on the bottom side of the negative electrode active material layer was 36 μm, and the top side was used as the negative electrode Ay7 side while the bottom side was used as the negative electrode Ax7 side.

[Measurement of Capacitance Per Unit Weight of Negative Electrode]

One piece of the obtained negative electrode 7 was cut out to a size of 1.4 cm×2.0 cm (2.8 cm$^2$), and the negative electrode active material layer on the Ay2 side coated onto the copper foil was removed using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethyl methyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 7 (lithium ion doping amount) was 1460 mAh/g.

<Fabrication and Evaluation of Nonaqueous Lithium Power Storage Element>

Twenty-one of the obtained positive electrode precursors 8 were then cut out, with the positive electrode active material layers at sizes of 10.0 cm×10.0 cm (100 cm$^2$). Next, 20 negative electrodes 7 were cut out, with the negative electrode active material layers at sizes of 10.1 cm×10.1 cm (102 cm$^2$). Also, 40 10.3 cm×10.3 cm (106 cm$^2$) polyethylene separators (by Asahi Kasei Corp., thickness: 10 μm) were prepared. These were laminated in the order: positive electrode precursor 1, separator, negative electrode 1, separator, positive electrode precursor 1, with positive electrode precursors 8 as the outermost layers, and with the positive electrode precursor Cx8 sides and negative electrode Ax7 sides facing each other across separators and the positive electrode precursor Cy8 sides and negative electrode Ay7 sides facing each other across separators, to obtain an electrode laminated body. A nonaqueous lithium power storage element was then fabricated and evaluated by the same method as Example 1.

Example 23

A nonaqueous lithium power storage element was fabricated by the same method as Example 22, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 24

A nonaqueous lithium power storage element was fabricated by the same method as Example 22, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 25

A nonaqueous lithium power storage element was fabricated by the same method as Example 22, except for using lithium oxide instead of lithium carbonate.

Example 26

A nonaqueous lithium power storage element was fabricated by the same method as Example 22, except for using lithium hydroxide instead of lithium carbonate.

Comparative Example 25

Coating solution 11C was prepared by dispersion by the same method as Example 22, except that NMP (N-methylpyrrolidone) was mixed to a solid weight ratio of 28.5% during fabrication of the positive electrode precursor. A nonaqueous lithium power storage element was fabricated by the same method as Example 22, except for fabricating the positive electrode precursor 9 using coating solution 9C and coating solution 11C.

Comparative Example 26

A nonaqueous lithium power storage element was fabricated by the same method as Comparative Example 25, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 27

A nonaqueous lithium power storage element was fabricated by the same method as Comparative Example 25, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 28

Coating solution 12C was prepared by dispersion by the same method as Example 22, except that NMP (N-methylpyrrolidone) was mixed to a solid weight ratio of 38.5% during fabrication of the positive electrode precursor. A nonaqueous lithium power storage element was fabricated by the same method as Example 22, except for fabricating the positive electrode precursor 10 using coating solution 9C and coating solution 12C.

Comparative Example 29

A nonaqueous lithium power storage element was fabricated by the same method as Comparative Example 28, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 30

A nonaqueous lithium power storage element was fabricated by the same method as Comparative Example 28, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 31

A nonaqueous lithium power storage element was fabricated by the same method as Comparative Example 25, except for using lithium oxide instead of lithium carbonate.

Comparative Example 32

A nonaqueous lithium power storage element was fabricated by the same method as Comparative Example 25, except for using lithium hydroxide instead of lithium carbonate.

Example 27

The positive electrode precursor 1 was cut to a size of 12.0 cm×210.0 cm (a positive electrode active material layer size of 10.0 cm×210.0 cm, and a size of 2.0 cm×210.0 cm for the non-coated portion of the positive electrode, where the positive electrode active material layer was not coated on the positive electrode power collector), the negative electrode 1 was cut to a size of 12.1×220.0 cm (a negative electrode active material layer size of 10.1 cm×220.0 cm, and a size of 2.0 cm×220.0 cm for the non-coated portion of the negative electrode, where the negative electrode active material layer was not coated on the negative electrode power collector), and the cut out positive electrode precursor and negative electrode were wound while sandwiching a polyethylene separator (product of ASAHI KASEI KABUSHIKI KAISHA, thickness: 10 μm), to fabricate an electrode laminated body. The winding was in an ellipsoid fashion, with the positive electrode precursor $C_{x1}$ side and negative electrode $A_{x1}$ side facing each other across a separator, and the positive electrode precursor $C_{y1}$ side and negative electrode Ay1 facing each other across a separator. A positive electrode terminal and negative electrode terminal were ultrasonically welded to the obtained electrode laminated body and placed in a vessel formed of an aluminum laminate package material, and 3 sides including the electrode terminal section were sealed by heat sealing. A nonaqueous lithium power storage element was then fabricated by the same method as Example 1.

Example 28

A nonaqueous lithium power storage element was fabricated by the same method as Example 27, except for using negative electrode 7 instead of positive electrode precursor 8.

Comparative Example 33

A nonaqueous lithium power storage element was fabricated by the same method as Example 27, except for using negative electrode 5 instead of positive electrode precursor 4.

Comparative Example 34

A nonaqueous lithium power storage element was fabricated by the same method as Example 27, except for using negative electrode 7 instead of positive electrode precursor 9.

The evaluation results for Examples 22 to 28 and Comparative Examples 25 to 34 are shown in Tables 3 and 4.

TABLE 3

| | Lithium compound | $C_{x2}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ | $C_{y2}/C_{x2}$ | $C_{x2}/C_{y2}$ | $(C_{x1}+A_{x1})/(C_{y1}+A_{y1})$ | $(C_{x1}+C_{x2}+A_{y1})/(C_{y1}+C_{y2}+A_{x1})$ |
|---|---|---|---|---|---|---|---|---|---|---|---|---|---|
| Example 22 | Li₂CO₃ | 25.6 | 24.5 | 4.3 | 4.0 | 23.6 | 24.1 | 1.04 | 0.98 | 0.93 | 1.08 | 1.01 | 1.04 |
| Example 23 | Li₂CO₃ | 25.4 | 24.5 | 7.6 | 7.0 | 23.5 | 24.1 | 1.04 | 0.98 | 0.92 | 1.09 | 1.01 | 1.04 |
| Example 24 | Li₂CO₃ | 25.8 | 24.3 | 12.4 | 11.7 | 23.7 | 24.3 | 1.06 | 0.98 | 0.94 | 1.06 | 1.02 | 1.05 |
| Example 25 | Li₂O | 25.1 | 24.6 | 4.2 | 3.8 | 23.6 | 24.2 | 1.02 | 0.98 | 0.90 | 1.11 | 1.00 | 1.03 |
| Example 26 | LiOH | 25.7 | 24.3 | 4.1 | 3.9 | 23.4 | 24.5 | 1.06 | 0.96 | 0.95 | 1.05 | 1.01 | 1.05 |
| Comp. Ex. 25 | Li₂CO₃ | 25.4 | 21.6 | 4.5 | 2.6 | 23.7 | 24.1 | 1.18 | 0.98 | 0.58 | 1.73 | 1.07 | 1.13 |
| Comp. Ex. 26 | Li₂CO₃ | 25.9 | 21.1 | 7.7 | 4.6 | 23.8 | 24.0 | 1.23 | 0.99 | 0.60 | 1.67 | 1.10 | 1.16 |
| Comp. Ex. 27 | Li₂CO₃ | 25.1 | 21.4 | 12.3 | 7.2 | 23.5 | 24.0 | 1.17 | 0.98 | 0.59 | 1.71 | 1.07 | 1.18 |
| Comp. Ex. 28 | Li₂CO₃ | 25.0 | 30.4 | 4.4 | 6.6 | 23.4 | 24.3 | 0.82 | 0.96 | 1.50 | 0.67 | 0.88 | 0.89 |
| Comp. Ex. 29 | Li₂CO₃ | 25.5 | 30.8 | 7.9 | 11.6 | 24.6 | 24.2 | 0.83 | 1.02 | 1.47 | 0.68 | 0.91 | 0.86 |
| Comp. Ex. 30 | Li₂CO₃ | 26.0 | 31.2 | 12.6 | 18.3 | 23.5 | 24.0 | 0.83 | 0.98 | 1.45 | 0.69 | 0.90 | 0.86 |
| Comp. Ex. 31 | Li₂O | 25.4 | 21.1 | 4.4 | 2.3 | 23.6 | 24.5 | 1.20 | 0.96 | 0.52 | 1.91 | 1.07 | 1.16 |
| Comp. Ex. 32 | LiOH | 25.6 | 21.0 | 4.2 | 2.3 | 23.4 | 24.1 | 1.22 | 0.97 | 0.55 | 1.83 | 1.09 | 1.15 |
| Example 27 | Li₂CO₃ | 28.5 | 27.4 | 5.5 | 5.2 | 25.4 | 26.3 | 1.04 | 0.97 | 0.95 | 1.06 | 1.00 | 1.04 |
| Example 28 | Li₂CO₃ | 25.4 | 24.2 | 4.5 | 4.2 | 23.5 | 24.3 | 1.05 | 0.97 | 0.93 | 1.07 | 1.01 | 1.04 |
| Comp. Ex. 33 | Li₂CO₃ | 28.2 | 23.9 | 5.6 | 3.1 | 32.0 | 25.5 | 1.18 | 1.25 | 0.55 | 1.81 | 1.22 | 1.01 |
| Comp. Ex. 34 | Li₂CO₃ | 25.4 | 21.6 | 4.5 | 2.5 | 23.6 | 24.1 | 1.18 | 0.98 | 0.56 | 1.80 | 1.07 | 1.13 |

TABLE 4

| | Microscopic Raman spectroscopy | | | $C_{y3}$ | $A_{y3}$ | | Initial Properties | | High-temperature storage test | Nail-penetration test | |
|---|---|---|---|---|---|---|---|---|---|---|---|
| | $S_x$ (%) | $S_y$ (%) | $S_x/S_y$ | ($10^{-4}$ mol/g) | ($10^{-4}$ mol/g) | $C_{y3}/A_{y3}$ | Fa (F) | Ra (mΩ) | B ($10^{-3}$ cc/F) | Maximum temperature (° C.) | Condition |
| Example 22 | 6.8 | 6.2 | 1.10 | 78.9 | 49.2 | 1.6 | 1432 | 0.52 | 2.32 | 45 | Splitting |
| Example 23 | 12.3 | 11.2 | 1.10 | 35.6 | 40.2 | 0.9 | 1424 | 0.51 | 2.45 | 42 | Splitting |
| Example 24 | 24.3 | 22.9 | 1.06 | 23.5 | 37.4 | 0.6 | 1475 | 0.52 | 2.76 | 46 | Splitting |
| Example 25 | 6.7 | 5.8 | 1.16 | 79.0 | 47.0 | 1.7 | 1434 | 0.53 | 2.33 | 45 | Splitting |
| Example 26 | 7.2 | 5.9 | 1.22 | 75.6 | 45.8 | 1.7 | 1402 | 0.52 | 2.31 | 49 | Splitting |
| Comp. Ex. 25 | 6.9 | 3.3 | 2.09 | 75.0 | 47.2 | 1.6 | 1376 | 0.54 | 2.19 | 89 | Rupture |
| Comp. Ex. 26 | 12.0 | 6.3 | 1.90 | 38.9 | 40.5 | 1.0 | 1325 | 0.51 | 2.43 | 93 | Rupture |
| Comp. Ex. 27 | 23.2 | 11.3 | 2.05 | 21.8 | 36.5 | 0.6 | 1303 | 0.55 | 2.58 | 92 | Rupture |
| Comp. Ex. 28 | 6.0 | 10.2 | 0.59 | 83.4 | 46.8 | 1.8 | 1472 | 0.52 | 256 | 103 | Rupture |
| Comp. Ex. 29 | 11.7 | 24.3 | 0.48 | 49.4 | 41.5 | 1.2 | 1510 | 0.53 | 2.71 | 94 | Rupture |
| Comp. Ex. 30 | 26.6 | 41.1 | 0.65 | 28.4 | 37.2 | 0.8 | 1504 | 0.51 | 2.80 | 99 | Rupture |
| Comp. Ex. 31 | 6.5 | 3.2 | 2.03 | 75.5 | 46.6 | 1.6 | 1328 | 0.55 | 2.20 | 84 | Rupture |
| Comp. Ex. 32 | 7.7 | 3.4 | 2.26 | 78.9 | 45.1 | 1.7 | 1338 | 0.52 | 2.26 | 82 | Rupture |
| Example 27 | 6.2 | 6.0 | 1.03 | 84.7 | 46.0 | 1.8 | 1803 | 0.56 | 1.76 | 48 | Splitting |
| Example 28 | 6.8 | 6.2 | 1.10 | 71.3 | 47.3 | 1.5 | 1450 | 0.51 | 2.14 | 45 | Splitting |
| Comp. Ex. 33 | 6.3 | 3.1 | 2.03 | 84.1 | 49.0 | 1.7 | 1754 | 0.58 | 1.97 | 124 | Rupture |
| Comp. Ex. 34 | 6.5 | 3.0 | 2.17 | 73.8 | 45.9 | 1.6 | 1324 | 0.52 | 2.43 | 91 | Rupture |

From the evaluation results shown in Tables 1 to 4, it is believed that when $C_{x1}/C_{y1}$ was 0.85 to 1.15, $A_{x1}/A_{y1}$ was 0.85 to 1.15, $C_{y2}/C_{x2}$ and $C_{x2}/C_{y2}$ were 0.60 to 1.70 and $(A_{x1}+C_{x1})/(A_{y1}+C_{y1})$ was 0.80 to 1.20, it was possible to suppress local current concentration during internal short circuiting and uniformly decompose the lithium compound, thereby reducing short-circuit current and suppressing thermal runaway in the nail-penetration test.

Furthermore, it is believed that when a compound represented by formulas (1) to (3) was present in the positive electrode surface, it was possible to suppress reaction between the lithium compound in the positive electrode and the nonaqueous electrolytic solution, and to suppress gas generation in the high-temperature storage test.

The second embodiment will now be explained in detail.

Example 29

<Production of Positive Electrode Precursor>

Activated carbon 2 was used as a positive electrode active material to produce a positive electrode precursor, with lithium carbonate as the lithium compound.

After mixing 55.5 parts by weight of activated carbon 2, 32.0 parts by weight of lithium carbonate, 3.0 parts by weight of Ketchen black, 1.5 parts by weight of PVP (polyvinylpyrrolidone), 8.0 parts by weight of PVDF (polyvinylidene fluoride) and a mixed solvent of NMP (N-methylpyrrolidone) and purified water at 99:1, the mixture was dispersed using a FILMIX® thin-film spinning high-speed mixer by PRIMIX Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,750 mPa·s and the TI value was 4.2. The degree of dispersion of the obtained coating solution was measured using a fineness gauge by Yoshimitsu Seiki Co. As a result, the granularity was 31 μm. The coating solution was coated onto one or both sides of an aluminum foil with a thickness of 15 μm using a die coater by Toray Engineering Co., Ltd. under conditions with a coating speed of 1 m/s and dried at a drying temperature of 120° C. to obtain positive electrode precursor 11. The obtained positive electrode precursor 11 was pressed using a roll press under conditions with a pressure of 6 kN/cm and a pressed portion surface temperature of 25° C. The total thickness of the pressed positive electrode precursor 11 was measured at 10 arbitrary locations of the positive electrode precursor 11 using a Linear Gauge Sensor GS-551 by Ono Sokki Co., Ltd. The thickness of the aluminum foil was subtracted from the mean value for the measured total thickness, to determine the film thickness of the positive electrode active material layer of the positive electrode precursor 11. As a result, the film thickness of the positive electrode active material layer was 55 μm for each side.

<Production of Negative Electrode>

Composite porous carbon material 2a was then used as a negative electrode active material to produce a negative electrode.

After mixing 84 parts by weight of composite porous carbon material 2a, 10 parts by weight of acetylene black, 6 parts by weight of PVdF (polyvinylidene fluoride) and NMP (N-methylpyrrolidone), the mixture was dispersed using a FILMIX thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,310 mPa·s and the TI value was 2.9. The coating solution was coated onto both sides of an electrolytic copper foil with a thickness of 10 μm using a die coater by Toray Engineering Co., Ltd. under conditions with a discharge pressure of 60 kPa for the top face die and bottom face die and a coating speed of 2 m/s and dried at a drying temperature of 120° C. to obtain negative electrode 8. The obtained negative electrode 8 was pressed using a roll press under conditions with a pressure of 5 kN/cm and a pressed portion surface temperature of 25° C. The total thickness of the pressed negative electrode 8 was measured at 10 arbitrary locations of negative electrode 8, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 8. As a result, the film thickness of the negative electrode active material layer was 31 μm for each side.

[Measurement of Capacitance Per Unit Weight of Negative Electrode]

One piece of the obtained negative electrode 8 was cut out to a size of 1.4 cm×2.0 cm (2.8 cm$^2$), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of $LiPF_6$ dissolved to a concentration of 1.0 mol/L in a mixed solvent of ethylene carbonate (EC) and ethyl methyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 8 (lithium ion doping amount) was 545 mAh/g.

<Fabrication of Nonaqueous Lithium Power Storage Element>

Twenty of the obtained positive electrode precursors 11 were then cut out, with the positive electrode active material layers at sizes of 10.0 cm×10.0 cm (100 cm$^2$). Next, 21 negative electrodes 8 were cut out, with the negative electrode active material layers at sizes of 10.1 cm×10.1 cm (102 cm$^2$). Also, 40 10.3 cm×10.3 cm (106 cm$^2$) polyethylene separators (by Asahi Kasei Corp., thickness: 10 μm) were prepared. These were laminated in the order: negative electrode 8, separator, positive electrode precursor 11, separator, negative electrode 8, from the outermost layer, with the positive electrode active material layers and negative electrode active material layers facing each other across the separators, to obtain an electrode laminated body. The two negative electrode active material layer $A_w$ sides not facing the positive electrode precursor 11, situated on the outermost layer of the obtained electrode laminated body, were each contact bonded with 10.6 mg of lithium metal in powder form. A positive electrode terminal and negative electrode terminal were then ultrasonically welded to the electrode laminated body and placed in a vessel formed of an aluminum laminate package material, and 3 sides including the electrode terminal section were sealed by heat sealing.

Approximately 70 g of the nonaqueous electrolytic solution 1 was injected into the electrode laminated body housed in the aluminum laminate package material, in a dry air environment at atmospheric pressure, a temperature of 25° C. and a dew point of no higher than −40° C. Next, the aluminum laminate package material housing the electrode laminated body and nonaqueous electrolytic solution was placed in a pressure reduction chamber and the pressure was reduced from atmospheric pressure to −87 kPa, after which it was restored to atmospheric pressure and allowed to stand for 5 minutes. The step of reducing the pressure of the package material in the chamber from atmospheric pressure to −87 kPa and then restoring to atmospheric pressure was subsequently repeated 4 times, and then it was allowed to stand for 15 minutes. The pressure of the package material in the chamber was again reduced from atmospheric pressure to −91 kPa, and then restored to atmospheric pressure. The step of pressure reduction of the package material and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution 1 by this step.

Next, the electrode laminated body impregnated with the nonaqueous electrolytic solution 1 was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The electrode laminated body obtained after sealing was placed in an argon box at a temperature of 25° C., a dew point of −60° C. and an oxygen concentration of 1 ppm. The excess portion of the aluminum laminate package material was cut to unseal it, and it was subjected to initial charging by a method of constant-current charge using a power source by Matsusada Precision, Inc. (P4LT18-0.2), with a current value of 100 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging Step]

The lithium-doped electrode laminated body was removed from the argon box and subjected to constant-current discharge in an environment of 25° C. at 100 mA until reaching a voltage of 3.8 V, and then constant-current discharge at 3.8 V for 1 hour, to adjust the voltage to 3.8 V. The electrode laminated body was then stored for 48 hours in a thermostatic bath at 60° C.

[Degassing Step]

A portion of the aluminum laminate package material of the aged electrode laminated body was unsealed in a dry air environment with a temperature of 25° C. and a dew point of −40° C. Next, the electrode laminated body was placed in a pressure reduction chamber, and a step of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the electrode laminated body was placed in a pressure-reducing sealing machine, and after pressure reduction to −90 kPa, it was sealed at 200° C. for 10 seconds at a pressure of 0.1 MPa to seal the aluminum laminate package material, to fabricate a nonaqueous lithium power storage element. Four nonaqueous lithium power storage elements were fabricated by this step.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima Ltd. in a thermostatic bath set to 25° C., with a 2 C current value (1.6 A) until reaching 3.8 V, and then constant-voltage charge was carried out with application of a constant voltage of 3.8 V for a total of 30 minutes. Next, with the capacitance after constant-current discharge to 2.2 V at the 2 C current value (1.6 A) as Q [C], F=Q/(3.8−2.2) was calculated as the electrostatic capacitance Fa, to be 1745F.

[Measurement of Internal Resistance Ra]

The same nonaqueous lithium power storage element was subjected to constant-current charge using a charge/discharge apparatus (5 V, 360 A) by Fujitsu Telecom Networks, Fukushima Ltd. in a thermostatic bath set to 25° C., with a 20 C current value (16 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (16 A), to obtain a discharge curve (time-voltage). From the discharge curve, with a voltage of Eo at discharge time=0 seconds, obtained by extrapolating by linear approximation from the voltage values at discharge time points of 2 seconds and 4 seconds, the internal resistance Ra was calculated from the voltage drop $\Delta E = 3.8 - Eo$ and $R = \Delta E/(20\ C$ current value), to be 0.58 mΩ.

[High-load Charge/Discharge Cycle Test]

The nonaqueous lithium power storage element was subjected to constant-current charge using a charge/discharge apparatus (5 V, 360 A) by Fujitsu Telecom Networks, Fukushima Ltd. in a thermostatic bath set to 25° C., with a 200 C current value (160 A) until reaching 3.8 V, followed by constant-current discharge at the 200 C current value until reaching 2.2 V, as a charge/discharge step that was repeated 60,000 times without pause. Upon completion of the cycle, the internal resistance Rb was measured to be 0.64 mΩ, and Rb/Ra=1.10.

[High-temperature Storage Test]

One of the remaining nonaqueous lithium power storage elements obtained by this step was subjected to constant-current charge using a charge/discharge apparatus (5 V, 360 A) by Fujitsu Telecom Networks, Ltd. in a thermostatic bath set to 25° C., with the 100 C current value (80 A) until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging step, and the cell was again stored in a 60° C. environment. This step was repeated for a period of 2 months, and the cell volume Va before start of the storage test and the volume Vb of the cell after two months of the storage test were measured by Archimedes' method in a 25° C. environment, using FLUORINERT (registered trademark of 3M Co. Japan) FC-40 as the measuring solvent. The value of B, as the gas generation volume determined by Vb−Va normalized by the electrostatic capacitance Fa, was $1.81 \times 10^{-3}$ cc/F.

[Nail-penetration Test]

One of the remaining nonaqueous lithium power storage elements obtained by the step described above was subjected to constant-current charge using a power source (ELZ-175) by Takasago, Ltd. in an explosion-proof thermostatic bath set to 25° C., at the 20 C current value (16 A) until reaching 4.0 V, and then constant-voltage charge was carried out with application of a constant voltage of 4.0 V for a total of 10 minutes. The power source was then removed, a thermocouple was attached to the negative electrode terminal, the positive electrode terminal and near the center section of the casing, and an iron nail (N65) was situated at the center section of the nonaqueous lithium power storage element in the direction perpendicular to the planar direction. Measurement was initiated with a 0.1 second interval for the sampling time of the data logger, and the power storage element was penetrated with the nail at a penetration speed of 30 mm/sec. The maximum temperature reached at the negative electrode terminal during the nail-penetration test was 45° C., and the condition of the nonaqueous lithium power storage element after the nail-penetration test was "splitting".

[Calculation of $A_{w1}$, $A_{z1}$, $A_{w2}$, $A_{z2}$, $C_{z1}$ and $C_{z2}$]

The remaining nonaqueous lithium power storage element that had been obtained was adjusted to a voltage of 2.9 V and disassembled in an argon box at a dew point temperature of −72° C., and $A_{w1}$, $A_{z1}$, $A_{w2}$, $A_{z2}$, $C_{z1}$ and $C_{z2}$ were calculated by the method described above, resulting in $A_{w1}/A_{z1}=0.34$, $A_{w2}/A_{z2}=0.97$, $C_{z1}=31.3$ g/m² and $C_{z2}=2.5$ g/m².

[Microscopic Raman Spectroscopy]

The positive electrode was cut out to a size of 10 cm×10 cm from the electrode laminated body obtained by disassembling the nonaqueous lithium power storage element. The obtained positive electrode was immersed in 30 g of a diethyl carbonate solvent and was washed for 10 minutes while occasionally moving the positive electrode with a pincette. The positive electrode was then removed out and air-dried for 5 minutes in an argon box and immersed in 30 g of freshly prepared diethyl carbonate solvent and washed for 10 minutes by the same method as described above. The washed positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 1.

The obtained positive electrode sample 1 was cut into a small 1 cm×1 cm piece while maintaining a state of non-exposure to air and used as a sample for microscopic Raman spectroscopy.

(Measurement)

Carbonate ion mapping was performed using an inVia Reflex Raman microscope by Renishaw Co. The excitation light laser wavelength was 532 nm and focusing was to a power of approximately 0.7 mW at the sample position, using a long-working-distance 50× objective lens. Point scanning was performed at 1 μm intervals in a range of 90 μm in the thickness direction of the positive electrode cross-section and 30 μm in the direction perpendicular to the thickness direction, and a Raman spectrum was obtained for each measurement point. For the peaks due to carbonate ion observed at 1086 cm$^{-1}$ in the Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. A negative sign was assigned to the area appearing on the negative side of the baseline. The carbonate ion peak area was traced as the space distribution, and an imaging representation for carbonate ion was obtained.

(Calculation of Area $S_z$ in Carbonate Ion Mapping)

The area $S_z$ in carbonate ion mapping was calculated as follows. A straight-line baseline was set at positions of 1071 and 1104 cm$^{-1}$ in the Raman spectra for 2700 points obtained at each measurement position on the front side of the sample, setting the area at the portions higher than the baseline as positive and the areas of the lower portions as negative, to construct the mapping data area (a). Next, the region from the maximum value to the minimum value of the area (a) was divided into 100 zones to construct histogram A, and the portion on the negative side from the area value giving the maximum frequency was fitted by the least square method using a Gaussian function, thereby approximating the noise component by a Gaussian function B. The difference obtained by subtracting the fitted Gaussian function B from the original histogram A was used as histogram C for the peak area of $CO_3^{2-}$. In histogram C, the cumulative frequency greater than the area (b) giving the maximum frequency was determined to be 145, as the mapping frequency for $CO_3^{2-}$ ion. This was divided by the total frequency of 2700 to calculate the area $S_y$ of carbonate ion mapping, which was $S_z$=5.4%.

[Calculation of $C_{z3}$ and $A_{z3}$]

While maintaining a state of non-exposure to air in the Ar box, the remaining positive electrode sample 1 was cut to a size of 10 cm×5 cm, and a spatula, brush or bristles were used to remove the positive electrode active material layer on the $C_x$ side. The obtained positive electrode sample 1 was washed for 10 minutes with 30 g of a diethyl carbonate solvent and was vacuum dried in a side box while maintaining a state of non-exposure to air. The dried positive electrode body was transferred from the side box to an Ar box while maintaining a state of non-exposure to air and was immersed and extracted in heavy water to obtain a positive electrode body liquid extract. Analysis of the liquid extract was by ion chromatography (IC) and $^1$H-NMR, and the abundance $C_{z3}$ (mol/g) per unit weight of the positive electrode active material for each compound accumulated on the positive electrode body was determined by the following formula (13), from the concentration $C_2$ (mol/ml) of each compound in the positive electrode body liquid extract, the volume $D_2$ (ml) of heavy water used for extraction and the weight $E_2$ (g) of active material of the positive electrode used for extraction.

$$C_{z3} = C_2 \times D_2 / E_2 \tag{13}$$

The active material weight in the positive electrode active material layer used for extraction was determined by the following method.

The positive electrode active material layer was peeled off from the power collector of the positive electrode body remaining after heavy water extraction, using a spatula, brush or bristles, and the peeled off positive electrode active material layer was washed and then vacuum dried. The positive electrode active material layer obtained by vacuum drying was washed with NMP. Next, the obtained positive electrode active material layer was again vacuum dried and weighed to determine the weight of the positive electrode active material layer used for extraction.

($^1$H-NMR Measurement)

The positive electrode body liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and $^1$H NMR measurement was performed by the double tube method. The measurement results were normalized by the 7.1 ppm (m, 2H) signal of 1, 2, 4, 5-tetrafluorobenzene, and the integral of each observed compound was calculated.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and $^1$H NMR measurement was performed by the double tube method. In the same manner as above, the measurement results were normalized by the 7.1 ppm (m, 2H) signal of 1, 2, 4, 5-tetrafluorobenzene, and the integral of the 2.6 ppm (s, 6H) signal of dimethyl sulfoxide was calculated. The concentration $C_2$ of each compound in the positive electrode body liquid extract was determined based on the relationship between the dimethyl sulfoxide concentration used and the integral.

Assignment for the $^1$H NMR spectrum was as follows.
(For $LiOCH_2CH_2OLi$)

$CH_2$ in $LiOCH_2CH_2OLi$: 3.7 ppm (s, 4H)

$CH_3OLi$: 3.3 ppm (s, 3H)

$CH_3$ in $CH_3CH_2OLi$: 1.2 ppm (t, 3H)

$CH_2O$ in $CH_3CH_2OLi$: 3.7 ppm (q, 2H)

Since the signal for $CH_2$ in $LiOCH_2CH_2OLi$ (3.7 ppm) thus overlaps the signal for $CH_2O$ in $CH_3CH_2OLi$ (3.7 ppm), the amount of $LiOCH_2CH_2OLi$ was calculated without the portion corresponding to $CH_2O$ in $CH_3CH_2OLi$, calculated from the signal for $CH_3$ in $CH_3CH_2OLi$ (1.2 ppm).

From the concentration of each compound in the liquid extract as determined by the analysis described above, as well as the volume of heavy water used for extraction and the active material weight of the positive electrode used for extraction, it was possible to calculate the concentration $C_{z3}$ of $LiOCH_2CH_2OLi$ on the $C_z$ side, as $84.5 \times 10^{-4}$ mol/g.

Using the same method, it was possible to calculate the concentration $A_{z3}$ of $LiOCH_2CH_2OLi$ in the negative electrode active material layer facing the $C_z$ side, as $45.3 \times 10^{-4}$ mol/g.

Example 30

A nonaqueous lithium power storage element was fabricated by the same method as Example 29, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 31

A nonaqueous lithium power storage element was fabricated by the same method as Example 29, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 32

A nonaqueous lithium power storage element was fabricated by the same method as Example 29, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 72 hours, for lithium doping at the negative electrode.

Example 33

A nonaqueous lithium power storage element was fabricated by the same method as Example 32, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 36 hours, for lithium doping at the negative electrode.

Example 34

A nonaqueous lithium power storage element was fabricated by the same method as Example 32, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 12 hours, for lithium doping at the negative electrode.

Example 35

A nonaqueous lithium power storage element was fabricated by the same method as Example 29, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 72 hours, for lithium doping at the negative electrode.

Example 36

A nonaqueous lithium power storage element was fabricated by the same method as Example 35, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 36 hours, for lithium doping at the negative electrode.

Example 37

A nonaqueous lithium power storage element was fabricated by the same method as Example 35, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 12 hours, for lithium doping at the negative electrode.

Example 38

A nonaqueous lithium power storage element was fabricated by the same method as Example 29, except that 13.8 mg of lithium metal in powder form was contact bonded onto each of the two negative electrode active material layer $A_w$ sides situated on the outermost layers of the electrode laminated body.

Example 39

A nonaqueous lithium power storage element was fabricated by the same method as Example 38, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 40

A nonaqueous lithium power storage element was fabricated by the same method as Example 38, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 41

A nonaqueous lithium power storage element was fabricated by the same method as Example 29, except that 2.7 mg of lithium metal in powder form was contact bonded onto each of the two negative electrode active material layer $A_w$ sides situated on the outermost layers of the electrode laminated body.

Example 42

A nonaqueous lithium power storage element was fabricated by the same method as Example 41, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 43

A nonaqueous lithium power storage element was fabricated by the same method as Example 41, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 44

A nonaqueous lithium power storage element was fabricated by the same method as Example 29, except that 1.1 mg of lithium metal in powder form was contact bonded onto each of the two negative electrode active material layer $A_w$ sides situated on the outermost layers of the electrode laminated body.

Example 45

A nonaqueous lithium power storage element was fabricated by the same method as Example 44, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 46

A nonaqueous lithium power storage element was fabricated by the same method as Example 44, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 35

A nonaqueous lithium power storage element was fabricated by the same method as Example 29, except that 18.6 mg of lithium metal in powder form was contact bonded onto each of the two negative electrode active material layer $A_w$ sides situated on the outermost layers of the electrode laminated body.

Comparative Example 36

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 37

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 38

A nonaqueous lithium power storage element was fabricated by the same method as Example 29, except that 26.6 mg of lithium metal in powder form was contact bonded onto each of the two negative electrode active material layer $A_w$ sides situated on the outermost layers of the electrode laminated body.

Comparative Example 39

A nonaqueous lithium power storage element was fabricated by the same method as Comparative Example 38, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 40

A nonaqueous lithium power storage element was fabricated by the same method as Comparative Example 38, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 41

A nonaqueous lithium power storage element was fabricated by the same method as Example 29, except that the negative electrode active material layers on the outermost layers of the electrode laminated body before the lithium doping step were removed using a spatula, bristles or a brush.

Comparative Example 42

A nonaqueous lithium power storage element was fabricated by the same method as Comparative Example 41, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 43

A nonaqueous lithium power storage element was fabricated by the same method as Comparative Example 41, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 44

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 45

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 46

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 47

Negative electrode 9 was fabricated with a discharge pressure of 45 kPa for the top face die and a discharge pressure of 60 kPa for the bottom face die during coating of the negative electrode. When the film thickness of the negative electrode active material layer was measured by the same method as Example 29, one side was 23 µm and the other side was 31 µm. A nonaqueous lithium power storage element was fabricated by the same method as Comparative Example 35, except that during fabrication of the electrode laminated body, negative electrode 8 on the outermost layer was replaced with Negative electrode 9, the negative electrode active material layer with a film thickness of 23 µm being used as the $A_w$ side, without it facing the positive electrode precursor.

Comparative Example 48

A nonaqueous lithium power storage element was fabricated by the same method as Comparative Example 47, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 49

A nonaqueous lithium power storage element was fabricated by the same method as Comparative Example 47, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 50

Negative electrode 10 was fabricated with a discharge pressure of 75 kPa for the top face die and a discharge pressure of 60 kPa for the bottom face die during coating of the negative electrode. When the film thickness of the negative electrode active material layer was measured by the same method as Example 29, one side was 40 µm and the other side was 31 µm. A nonaqueous lithium power storage element was fabricated by the same method as Comparative Example 35, except that during fabrication of the electrode laminated body, negative electrode 8 on the outermost layer was replaced with negative electrode 10, the negative electrode active material layer with a film thickness of 40 µm being used as the $A_w$ side, without it facing the positive electrode precursor.

Comparative Example 51

A nonaqueous lithium power storage element was fabricated by the same method as Comparative Example 50, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 52

A nonaqueous lithium power storage element was fabricated by the same method as Comparative Example 50, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 53

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 5.0 V, and then constant-voltage charge was carried out at 5.0 V continuously for 72 hours, for lithium doping at the negative electrode.

Comparative Example 54

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 5.1 V, and then constant-voltage charge was carried out at 5.1 V continuously for 72 hours, for lithium doping at the negative electrode.

Comparative Example 55

A nonaqueous lithium power storage element was fabricated by the same method as Comparative Example 35, except that for initial charging of the nonaqueous lithium power storage element in the lithium doping step, constant-current charge was carried out at a current value of 100 mA until reaching a voltage of 5.2 V, and then constant-voltage charge was carried out at 5.2 V continuously for 72 hours, for lithium doping at the negative electrode.

The evaluation results for Examples 29 to 46 and Comparative Examples 35 to 55 are shown in Table 5.

TABLE 5

| | | | | | | Microscopic Raman spectroscopy Sz (%) | $C_{z3}$ ($10^{-4}$ mol/g) | $A_{z3}$ ($10^{-4}$ mol/g) | $C_{z3}/A_{z3}$ | Initial properties | | | High-load charge/discharge cycle test | | | High-temperature storage test B ($10^{-3}$ cc/F) | Nail-penetration test | |
|---|---|---|---|---|---|---|---|---|---|---|---|---|---|---|---|---|---|---|
| | $A_{w1}/A_{z1}$ | $A_{w2}/A_{z2}$ | $C_{z1}$ (g/m²) | $C_{z2}$ (g/m²) | $C_{z2}/C_{z1}$ | | | | | Fa (F) | Ra (mΩ) | | Rb (mΩ) | Rb/Ra | | | Maximum temperature (°C.) | Condition |
| Example 29 | 0.34 | 0.97 | 31.3 | 2.5 | 0.08 | 5.4 | 84.5 | 45.3 | 1.9 | 1745 | 0.58 | | 0.64 | 1.10 | 1.81 | 45 | Splitting |
| Example 30 | 0.32 | 1.02 | 30.3 | 5.6 | 0.18 | 10.1 | 45.5 | 39.9 | 1.1 | 1775 | 0.56 | | 0.63 | 1.13 | 2.41 | 42 | Splitting |
| Example 31 | 0.33 | 1.05 | 31.2 | 9.5 | 0.30 | 20.1 | 21.7 | 35.9 | 0.6 | 1811 | 0.58 | | 0.64 | 1.10 | 2.84 | 47 | Splitting |
| Example 32 | 0.30 | 1.12 | 29.5 | 1.3 | 0.04 | 2.6 | 270.3 | 41.8 | 6.5 | 1835 | 0.60 | | 0.67 | 1.12 | 1.31 | 45 | Splitting |
| Example 33 | 0.37 | 0.95 | 30.9 | 4.0 | 0.13 | 7.3 | 210.9 | 21.4 | 9.9 | 1785 | 0.55 | | 0.63 | 1.15 | 1.76 | 41 | Splitting |
| Example 34 | 0.28 | 0.89 | 30.5 | 7.1 | 0.23 | 13.5 | 144.4 | 7.7 | 18.8 | 1815 | 0.56 | | 0.64 | 1.14 | 2.03 | 40 | Splitting |
| Example 35 | 0.34 | 1.01 | 31.8 | 5.7 | 0.18 | 10.6 | 33.2 | 39.7 | 0.8 | 1767 | 0.57 | | 0.64 | 1.12 | 2.50 | 40 | Splitting |
| Example 36 | 0.31 | 1.07 | 29.4 | 10.1 | 0.34 | 22.0 | 10.0 | 20.4 | 0.5 | 1712 | 0.58 | | 0.62 | 1.07 | 2.89 | 45 | Splitting |
| Example 37 | 0.29 | 0.97 | 32.0 | 15.7 | 0.49 | 30.7 | 2.5 | 10.6 | 0.2 | 1722 | 0.60 | | 0.64 | 1.07 | 3.14 | 43 | Splitting |
| Example 38 | 0.42 | 0.90 | 30.3 | 2.0 | 0.07 | 7.4 | 93.0 | 38.7 | 2.4 | 1834 | 0.60 | | 0.67 | 1.12 | 1.89 | 45 | Splitting |
| Example 39 | 0.43 | 1.13 | 31.2 | 5.6 | 0.18 | 11.3 | 41.2 | 36.8 | 1.1 | 1710 | 055 | | 0.61 | 1.11 | 2.24 | 40 | Splitting |
| Example 40 | 0.44 | 1.02 | 29.8 | 10.3 | 0.35 | 20.4 | 18.3 | 37.1 | 0.5 | 1816 | 0.57 | | 0.61 | 1.07 | 2.56 | 44 | Splitting |
| Example 41 | 0.08 | 0.99 | 31.0 | 2.2 | 0.07 | 5.6 | 80.9 | 40.2 | 2.0 | 1745 | 0.56 | | 0.63 | 1.13 | 1.67 | 42 | Splitting |
| Example 42 | 0.10 | 0.86 | 30.5 | 4.9 | 0.16 | 9.9 | 36.9 | 37.7 | 1.0 | 1715 | 0.54 | | 0.61 | 1.13 | 2.54 | 39 | Splitting |
| Example 43 | 0.08 | 1.10 | 31.5 | 9.7 | 0.31 | 14.5 | 16.8 | 40.1 | 0.4 | 1816 | 0.58 | | 0.63 | 1.09 | 2.70 | 44 | Splitting |
| Example 44 | 0.03 | 0.98 | 29.0 | 1.8 | 0.06 | 4.5 | 81.1 | 49.8 | 1.6 | 1816 | 0.60 | | 0.67 | 1.12 | 1.80 | 44 | Splitting |
| Example 45 | 0.04 | 1.03 | 30.1 | 6.0 | 0.20 | 8.6 | 39.7 | 37.9 | 1.0 | 1710 | 0.54 | | 0.60 | 1.11 | 2.35 | 41 | Splitting |
| Example 46 | 0.02 | 1.05 | 29.8 | 10.8 | 0.36 | 10.4 | 12.5 | 29.1 | 0.4 | 1835 | 0.58 | | 0.62 | 1.07 | 2.66 | 45 | Splitting |
| Comp. Example 35 | 0.57 | 1.05 | 30.5 | 2.5 | 0.08 | 6.1 | 89.3 | 49.0 | 1.8 | 1723 | 0.56 | | 0.67 | 1.20 | 2.21 | 134 | Rupture |
| Comp. Example 36 | 0.55 | 0.90 | 31.3 | 5.6 | 0.18 | 9.7 | 47.0 | 35.6 | 1.3 | 1732 | 0.58 | | 0.67 | 1.16 | 2.43 | 141 | Rupture |
| Comp. Example 37 | 0.58 | 1.01 | 32.0 | 10.3 | 0.32 | 15.3 | 26.3 | 32.0 | 0.8 | 1756 | 0.58 | | 0.65 | 1.12 | 2.98 | 130 | Rupture |
| Comp. Example 38 | 0.80 | 1.13 | 29.5 | 2.4 | 0.08 | 6.9 | 84.3 | 50.5 | 1.7 | 1767 | 0.60 | | 0.67 | 1.12 | 2.01 | 156 | Rupture |
| Comp. Example 39 | 0.83 | 0.98 | 29.9 | 4.6 | 0.15 | 10.4 | 48.0 | 42.4 | 1.1 | 1743 | 0.59 | | 0.66 | 1.12 | 2.45 | 150 | Rupture |
| Comp. Example 40 | 0.82 | 1.01 | 30.6 | 9.5 | 0.31 | 18.9 | 22.3 | 35.8 | 0.6 | 1730 | 0.58 | | 0.63 | 1.09 | 2.78 | 155 | Rupture |
| Comp. Example 41 | 0.00 | 0.00 | 30.1 | 2.1 | 0.07 | 7.1 | 82.0 | 46.8 | 1.8 | 1705 | 0.60 | | 0.69 | 1.15 | 2.11 | 148 | Rupture |
| Comp. Example 42 | 0.00 | 0.00 | 29.6 | 5.7 | 0.19 | 11.4 | 45.6 | 42.3 | 1.1 | 1698 | 0.60 | | 0.69 | 1.15 | 2.50 | 158 | Rupture |
| Comp. Example 43 | 0.00 | 0.00 | 31.0 | 11.0 | 0.35 | 18.9 | 21.1 | 33.5 | 0.6 | 1668 | 0.61 | | 0.68 | 1.11 | 2.89 | 151 | Rupture |
| Comp. Example 44 | 0.55 | 1.01 | 32.5 | 18.3 | 0.56 | 43.5 | 1.3 | 34.3 | 0.04 | 1232 | 0.74 | | 1.03 | 1.39 | 3.98 | 118 | Rupture |
| Comp. Example 45 | 0.58 | 0.90 | 32.0 | 20.3 | 0.63 | 46.7 | 0.9 | 28.4 | 0.03 | 1140 | 0.85 | | 1.24 | 1.46 | 5.12 | 108 | Rupture |
| Comp. Example 46 | 0.55 | 1.07 | 30.8 | 23.2 | 0.75 | 49.5 | 0.4 | 20.3 | 0.02 | 1021 | 0.96 | | 1.50 | 1.56 | 7.70 | 106 | Rupture |
| Comp. Example 47 | 0.56 | 0.78 | 31.0 | 2.5 | 0.08 | 7.1 | 80.4 | 47.2 | 1.70 | 1723 | 0.57 | | 0.63 | 1.11 | 1.89 | 140 | Rupture |
| Comp. Example 48 | 0.53 | 0.81 | 31.4 | 5.6 | 0.18 | 12.2 | 46.0 | 40.0 | 1.15 | 1734 | 0.58 | | 0.63 | 1.09 | 2.43 | 131 | Rupture |
| Comp. Example 49 | 0.58 | 0.80 | 32.0 | 9.9 | 0.31 | 20.4 | 23.3 | 35.2 | 0.66 | 1701 | 0.54 | | 0.61 | 1.13 | 2.89 | 129 | Rupture |
| Comp. Example 50 | 0.55 | 1.25 | 29.7 | 2.3 | 0.08 | 6.5 | 89.3 | 52.4 | 1.7 | 1754 | 0.59 | | 0.68 | 1.15 | 1.90 | 137 | Rupture |
| Comp. Example 51 | 0.58 | 1.23 | 31.3 | 4.8 | 0.15 | 10.4 | 50.4 | 41.0 | 1.2 | 1721 | 0.55 | | 0.63 | 1.15 | 2.34 | 138 | Rupture |
| Comp. Example 52 | 0.57 | 1.26 | 30.4 | 10.2 | 0.34 | 17.9 | 24.5 | 31.4 | 0.8 | 1680 | 0.57 | | 0.64 | 1.12 | 2.87 | 130 | Rupture |
| Comp. Example 53 | 0.55 | 1.01 | 31.3 | 0.08 | 0.00 | 0.3 | 332.0 | 52.5 | 6.3 | 1587 | 0.83 | | 1.43 | 1.72 | 2.43 | 130 | Rupture |
| Comp. Example 54 | 0.58 | 1.06 | 32.1 | 0.05 | 0.00 | 0.2 | 376.0 | 46.0 | 8.2 | 1530 | 0.93 | | 1.70 | 1.83 | 2.76 | 135 | Rupture |
| Comp. Example 55 | 0.57 | 0.99 | 30.5 | 0.03 | 0.00 | 0.1 | 422.0 | 36.9 | 11.4 | 1439 | 1.02 | | 2.01 | 1.97 | 3.10 | 132 | Rupture |

Example 47

<Production of Positive Electrode Precursor>

Positive electrode precursor 12 was fabricated by the same method as in Example 29, except for using 50.5 parts by weight of activated carbon 1, 38.0 parts by weight of lithium carbonate having a mean particle diameter of 2.5 µm, 2.7 parts by weight of Ketchen black, 1.4 parts by weight of PVP (polyvinylpyrrolidone) and 7.4 parts by weight of PVDF (polyvinylidene fluoride). The obtained positive electrode precursor 12 was pressed using a roll press under conditions with a pressure of 6 kN/cm and a pressed portion surface temperature of 25° C. The total thickness of the pressed positive electrode precursor 12 was measured at 10 arbitrary locations of the positive electrode precursor 12 using a Linear Gauge Sensor GS-551 by Ono Sokki Co., Ltd. The thickness of the aluminum foil was subtracted from the mean value for the measured total thickness, to determine the film thickness of the positive electrode active material layer of the positive electrode precursor 12, and as a result the film thickness of the positive electrode active material layer was 53 µm for each side.

<Production of Negative Electrode>

Composite porous carbon material 1b was then used as a negative electrode active material to produce a negative electrode.

After mixing 84 parts by weight of composite porous carbon material 1b, 10 parts by weight of acetylene black, 6 parts by weight of PVdF (polyvinylidene fluoride) and NMP (N-methylpyrrolidone), the mixture was dispersed using a FILMIX® thin-film spinning high-speed mixer by PRIMIX Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 µm using a die coater by Toray Engineering Co., Ltd. under conditions with a coating speed of 2 m/s and dried at a drying temperature of 120° C. to obtain negative electrode 11. The obtained negative electrode 11 was pressed using a roll press under conditions with a pressure of 5 kN/cm and a pressed portion surface temperature of 25° C. The total thickness of the pressed negative electrode 11 was measured at 10 arbitrary locations of negative electrode 11, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 11. As a result, the film thickness of the negative electrode active material layer was 40 µm for each side.

[Measurement of Capacitance Per Unit Weight of Negative Electrode]

One piece of the obtained negative electrode 11 was cut out to a size of 1.4 cm×2.0 cm (2.8 cm$^2$), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethyl methyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 11 (lithium ion doping amount) was 1460 mAh/g.

<Fabrication of Nonaqueous Lithium Power Storage Element>

Twenty of the obtained positive electrode precursors 12 were then cut out, with the positive electrode active material layers at sizes of 10.0 cm×10.0 cm (100 cm$^2$). Next, 21 negative electrodes 11 were cut out, with the negative electrode active material layers at sizes of 10.1 cm×10.1 cm (102 cm$^2$). Also, 40 10.3 cm×10.3 cm (106 cm$^2$) polyethylene separators (by Asahi Kasei Corp., thickness: 10 µm) were prepared. These were laminated in the order: negative electrode 11, separator, positive electrode precursor 12, separator, negative electrode 11, from the outermost layer, with the positive electrode active material layers and negative electrode active material layers facing each other across the separators, to obtain an electrode laminated body. The two negative electrode active material layer $A_w$ sides not facing the positive electrode precursor 12, situated on the outermost layer of the obtained electrode laminated body, were each contact bonded with 10.6 mg of lithium metal in powder form. A positive electrode terminal and negative electrode terminal were then ultrasonically welded to the electrode laminated body and placed in a vessel formed of an aluminum laminate package material, and 3 sides including the electrode terminal section were sealed by heat sealing. A nonaqueous lithium power storage element was then fabricated by the same method as Example 29.

Example 48

A nonaqueous lithium power storage element was fabricated by the same method as Example 47, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 49

A nonaqueous lithium power storage element was fabricated by the same method as Example 47, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 50

A nonaqueous lithium power storage element was fabricated by the same method as Example 47, except for using lithium oxide instead of lithium carbonate.

Example 51

A nonaqueous lithium power storage element was fabricated by the same method as Example 47, except for using lithium hydroxide instead of lithium carbonate.

Comparative Example 56

A nonaqueous lithium power storage element was fabricated by the same method as Example 47, except that 18.6 mg of lithium metal in powder form was contact bonded onto each of the two negative electrode active material layer $A_w$ sides situated on the outermost layers of the electrode laminated body.

Comparative Example 57

A nonaqueous lithium power storage element was fabricated by the same method as Comparative Example 56, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 58

A nonaqueous lithium power storage element was fabricated by the same method as Comparative Example 56, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 59

A nonaqueous lithium power storage element was fabricated by the same method as Example 50, except that 18.6 mg of lithium metal in powder form was contact bonded onto each of the two negative electrode active material layer $A_w$ sides situated on the outermost layers of the electrode laminated body.

Comparative Example 60

A nonaqueous lithium power storage element was fabricated by the same method as Example 51, except that 18.6 mg of lithium metal in powder form was contact bonded onto each of the two negative electrode active material layer $A_w$ sides situated on the outermost layers of the electrode laminated body.

Example 52

The positive electrode precursor 11 was cut to a size of 12.0 cm×210.0 cm (a positive electrode active material layer size of 10.0 cm×210.0 cm, and a size of 2.0 cm×210.0 cm for the non-coated portion of the positive electrode, where the positive electrode active material layer was not coated on the positive electrode power collector), the negative electrode 8 was cut to a size of 12.1×220.0 cm (a negative electrode active material layer size of 10.1 cm×220.0 cm, and a size of 2.0 cm×220.0 cm for the non-coated portion of the negative electrode, where the negative electrode active material layer was not coated on the negative electrode power collector), and the cut out positive electrode precursor and negative electrode were wound while sandwiching a polyethylene separator (product of ASAHI KASEI KABUSHIKI KAISHA, thickness: 10 μm), to fabricate an electrode laminate body. During the procedure, the positive electrode active material layer and negative electrode active material layer were facing across the separator, the non-coated portion of the positive electrode and the non-coated portion of the negative electrode protruded from opposite directions of the electrode laminated body, and winding was in an ellipsoid fashion with the negative electrode 8 situated on the outermost layer of the electrode laminated body. The negative electrode active material layer $A_w$ sides on the outermost layer not facing the positive electrode precursor 11, situated on the outermost layer of the obtained electrode laminated body, were each contact bonded with a total of 21.2 mg of lithium metal in powder form. A positive electrode terminal and negative electrode terminal were ultrasonically welded to the obtained electrode laminated body and placed in a vessel formed of an aluminum laminate package material, and 3 sides including the electrode terminal section were sealed by heat sealing. A nonaqueous lithium power storage element was then fabricated by the same method as Example 29.

Example 53

A nonaqueous lithium power storage element was fabricated by the same method as Example 52, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 54

A nonaqueous lithium power storage element was fabricated by the same method as Example 52, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 61

A nonaqueous lithium power storage element was fabricated by the same method as Example 52, except that a total of 37.2 mg of lithium metal in powder form was contact bonded onto each of the negative electrode active material layer $A_w$ sides on the outermost layers, situated on the outermost layers of the electrode laminated body.

Comparative Example 62

A nonaqueous lithium power storage element was fabricated by the same method as Comparative Example 51, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 63

A nonaqueous lithium power storage element was fabricated by the same method as Comparative Example 61, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

The evaluation results for Examples 47 to 54 and Comparative Examples 56 to 63 are shown in Table 6.

electrode surface, it was possible to suppress reaction between the lithium compound in the positive electrode and the nonaqueous electrolytic solution, and to suppress gas generation in the high-temperature storage test.

The third embodiment will now be explained in detail.

Example 55

<Production of Positive Electrode Precursor>
[Activated Carbon 1b]

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating

TABLE 6

| | Lithium compound | $A_{w1}/A_{z1}$ | $A_{w2}/A_{z2}$ | $C_{z1}$ (g/m$^2$) | $C_{z2}$ (g/m$^2$) | $C_{z2}/C_{z1}$ | Microscopic Raman spectroscopy $S_z$ (%) | $C_{z3}$ (10$^{-4}$ mol/g) | $A_{z3}$ (10$^{-4}$ mol/g) |
|---|---|---|---|---|---|---|---|---|---|
| Example 47 | Li$_2$CO$_3$ | 0.32 | 0.99 | 24.3 | 0.8 | 0.03 | 2.3 | 65.4 | 48.4 |
| Example 48 | Li$_2$CO$_3$ | 0.33 | 0.90 | 23.5 | 3.5 | 0.15 | 7.6 | 35.6 | 34.3 |
| Example 49 | Li$_2$CO$_3$ | 0.30 | 1.03 | 25.6 | 10.4 | 0.41 | 15.6 | 13.4 | 30.8 |
| Example 50 | Li$_2$O | 0.34 | 1.04 | 23.2 | 1.2 | 0.05 | — | 60.5 | 40.8 |
| Example 51 | LiOH | 0.32 | 1.10 | 23.6 | 1.1 | 0.05 | — | 65.0 | 37.4 |
| Comp. Example 56 | Li$_2$CO$_3$ | 0.56 | 0.98 | 25.6 | 1.3 | 0.05 | 2.4 | 69.8 | 47.4 |
| Comp. Example 57 | Li$_2$CO$_3$ | 0.58 | 1.03 | 23.3 | 4.5 | 0.19 | 6.8 | 30.4 | 40.5 |
| Comp. Example 58 | Li$_2$CO$_3$ | 0.55 | 0.89 | 25.6 | 7.9 | 0.31 | 16.7 | 12.2 | 36.0 |
| Comp. Example 59 | Li$_2$O | 0.57 | 1.08 | 24.3 | 1.3 | 0.05 | — | 65.0 | 47.0 |
| Comp. Example 60 | LiOH | 0.57 | 1.11 | 22.3 | 1.1 | 0.05 | — | 64.9 | 45.5 |
| Example 52 | Li$_2$CO$_3$ | 0.32 | 1.08 | 26.4 | 1.3 | 0.05 | 1.7 | 68.4 | 47.5 |
| Example 53 | Li$_2$CO$_3$ | 0.30 | 1.04 | 22.1 | 5.4 | 0.24 | 6.8 | 38.6 | 40.4 |
| Example 54 | Li$_2$CO$_3$ | 0.32 | 0.96 | 22.5 | 9.4 | 0.42 | 16.7 | 14.3 | 37.0 |
| Comp. Example 61 | Li$_2$CO$_3$ | 0.56 | 1.11 | 23.3 | 1.0 | 0.04 | 2.4 | 64.5 | 45.5 |
| Comp. Example 62 | Li$_2$CO$_3$ | 0.57 | 0.99 | 25.4 | 4.5 | 0.18 | 8.7 | 30.5 | 42.0 |
| Comp. Example 63 | Li$_2$CO$_3$ | 0.56 | 0.98 | 22.4 | 8.8 | 0.39 | 16.8 | 12.2 | 35.9 |

| | | Initial properties | | High-load charge/discharge cycle test | | High-temperature storage test | Nail-penetration test | |
|---|---|---|---|---|---|---|---|---|
| | $C_{z3}/A_{z3}$ | Fa (F) | Ra (mΩ) | Rb (mΩ) | Rb/Ra | B (10$^{-3}$ cc/F) | Maximum temperature (° C.) | Condition |
| Example 47 | 1.4 | 1343 | 0.50 | 0.56 | 1.12 | 2.32 | 42 | Splitting |
| Example 48 | 1.0 | 1354 | 0.49 | 0.54 | 1.10 | 2.54 | 44 | Splitting |
| Example 49 | 0.4 | 1348 | 0.52 | 0.56 | 1.08 | 2.98 | 45 | Splitting |
| Example 50 | 1.5 | 1389 | 0.48 | 0.54 | 1.13 | 2.43 | 42 | Splitting |
| Example 51 | 1.7 | 1314 | 0.51 | 0.58 | 1.14 | 2.45 | 45 | Splitting |
| Comp. Example 56 | 1.5 | 1343 | 0.52 | 0.60 | 1.15 | 2.54 | 134 | Rupture |
| Comp. Example 57 | 0.8 | 1328 | 0.51 | 0.59 | 1.16 | 2.87 | 135 | Rupture |
| Comp. Example 58 | 0.3 | 1350 | 0.52 | 0.61 | 1.17 | 3.10 | 131 | Rupture |
| Comp. Example 59 | 1.4 | 1332 | 0.53 | 0.60 | 1.13 | 2.76 | 139 | Rupture |
| Comp. Example 60 | 1.4 | 1310 | 0.50 | 0.60 | 1.20 | 2.67 | 128 | Rupture |
| Example 52 | 1.4 | 1345 | 0.51 | 0.58 | 1.14 | 2.40 | 41 | Splitting |
| Example 53 | 1.0 | 1389 | 0.50 | 0.57 | 1.14 | 2.71 | 44 | Splitting |
| Example 54 | 0.4 | 1340 | 0.48 | 0.54 | 1.13 | 2.90 | 42 | Splitting |
| Comp. Example 61 | 1.4 | 1360 | 0.50 | 0.58 | 1.16 | 2.30 | 141 | Rupture |
| Comp. Example 62 | 0.7 | 1303 | 0.51 | 0.59 | 1.16 | 2.67 | 127 | Rupture |
| Comp. Example 63 | 0.3 | 1305 | 0.52 | 0.61 | 1.17 | 2.95 | 135 | Rupture |

Without being limited to theory, it is believed that lowering the amount of lithium ion on the $A_w$ side of the negative electrode active material layers situated on the outermost layers increased the potential of the negative electrode during internal short circuiting, allowing reaction between the lithium ions pre-doped in the negative electrode and the nonaqueous electrolytic solution to be suppressed, thereby suppressing drastic temperature increase.

Furthermore, it is believed that when a compound represented by formulas (1) to (3) was present in the positive furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 1b.

A laser diffraction particle size distribution analyzer (SALD-2000J) by Shimadzu Corp. was used to measure the mean particle diameter of the activated activated carbon 1b, which was found to be 4.2 μm. Also, a pore distribution measuring apparatus (AUTOSORB-1 AS-1-MP) by Yuasa Ionics Co., Ltd. was used to measure the pore distribution of the activated activated carbon 1b. As a result, the BET specific surface area was 2360 m$^2$/g, the mesopore volume ($V_1$) was 0.52 cc/g, the micropore volume ($V_2$) was 0.88 cc/g, and $V_1/V_2$=0.59.

[Activated Carbon 2b]

A phenol resin was placed in a firing furnace and subjected to carbonization at 600° C. for 2 hours under a nitrogen atmosphere, and was then pulverized with a ball mill and sorted, to obtain a carbide having a mean particle diameter of 7.0 μm. The obtained carbide was mixed with KOH at a weight ratio of 1:5, and the mixture was placed in a firing furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2b.

A laser diffraction particle size distribution analyzer (SALD-2000J) by Shimadzu Corp. was used to measure the mean particle diameter of the activated carbon 2b, which was found to be 7.1 μm. Also, a pore distribution measuring apparatus (AUTOSORB-1 AS-1-MP) by Yuasa Ionics Co., Ltd. was used to measure the pore distribution of the activated carbon 2b. As a result, the BET specific surface area was 3627 m$^2$/g, the mesopore volume ($V_1$) was 1.50 cc/g, the micropore volume ($V_2$) was 2.28 cc/g, and $V_1/V_2$=0.66.

Activated carbon 1b obtained above was used as the positive electrode active material to produce a positive electrode precursor.

After mixing 62.5 parts by weight of activated activated carbon 1b, 25.0 parts by weight of lithium carbonate having a mean particle diameter of 2.0 μm, as a lithium compound, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film spinning high-speed mixer by PRIMIX Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,820 mPa·s and the TI value was 3.2. The degree of dispersion of the obtained coating solution was measured using a fineness gauge by Yoshimitsu Seiki Co. As a result, the granularity was 35 μm. The coating solution was coated onto one or both sides of an aluminum foil with a thickness of 15 μm using a die coater by Toray Engineering Co., Ltd. under conditions with a coating speed of 1 m/s and dried at a drying temperature of 100° C. to obtain positive electrode precursor 13 (hereunder referred to as "single-sided positive electrode precursor" and "double-sided positive electrode precursor", respectively). The obtained positive electrode precursor 13 was pressed using a roll press under conditions with a pressure of 4 kN/cm and a pressed portion surface temperature of 25° C.

<Preparation of Negative Electrode Active Material>

[Preparation Example 3]

A 100 g portion of silicon with a mean particle diameter of 0.9 μm was placed into a stainless-steel mesh basket and placed on a stainless-steel vat containing 30 g of coal pitch (softening point: 50° C.), and both were set in an electric furnace (furnace inner usable dimension: 300 mm×300 mm×300 mm). The silicon and coal pitch were increased in temperature to 1000° C. over 15 hours under a nitrogen atmosphere and were kept at the same temperature for 6 hours for thermal reaction to obtain composite material 1. The obtained composite material 1 was cooled to 60° C. by natural cooling, and then removed out from the electric furnace. The mean particle diameter of the obtained composite material 1 was 1.1 μm.

[Preparation Example 4]

Composite material 2 was produced in the same manner as Preparation Example 3, except that silicon monoxide with a mean particle diameter of 1.0 μm was used instead of silicon. The mean particle diameter of the obtained composite material 2 was 1.2 μm.

[Preparation Example 5]

Composite material 3 was produced in the same manner as Preparation Example 3, except that tin with a mean particle diameter of 0.8 μm was used instead of silicon. The mean particle diameter of the obtained composite material 3 was 1.0 μm.

[Preparation Example 6]

Composite material 4 was produced in the same manner as Preparation Example 1, except that tin dioxide with a mean particle diameter of 1.1 μm was used instead of silicon. The mean particle diameter of the obtained composite material 4 was 1.3 μm.

<Production of Negative Electrode>

After mixing 75 parts by weight of silicon with a mean particle diameter of 0.9 μm, 10 parts by weight of Ketchen black, 15 parts by weight of a polyimide binder and NMP (N-methylpyrrolidone), the mixture was dispersed using a FILMIX® thin-film spinning high-speed mixer by PRIMIX Corp., under conditions with a circumferential speed of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,982 mPa·s and the TI value was 3.2. The coating solution was coated onto both sides of an electrolytic copper foil with a thickness of 10 μm and a $R_{zjis}$ of 1.5 μm using a die coater by Toray Engineering Co., Ltd. under conditions with a coating speed of 1 m/s and dried at a drying temperature of 85° C. to obtain negative electrode 12 (hereunder also referred to as "double-sided negative electrode"). The obtained negative electrode 12 was pressed using a roll press under conditions with a pressure of 4 kN/cm and a pressed portion surface temperature of 25° C. The total thickness of the obtained negative electrode 12 was measured at 10 arbitrary locations of negative electrode 12, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 12. As a result, the film thickness of the negative electrode active material layer of the negative electrode 12 was 10 μm per side.

<Preparation of Nonaqueous Electrolytic Solution>

As an organic solvent there was used a mixed solvent of ethylene carbonate (EC): methyl ethyl carbonate (EMC) =33:67 (volume ratio), each electrolyte salt was dissolved so that the concentration ratio of LiN (SO$_2$F)$_2$ and LiPF$_6$ was 75:25 (molar ratio) with respect to the total nonaqueous electrolytic solution and the total concentration of LiN (SO$_2$F)$_2$ and LiPF$_6$ was 1.2 mol/L, and the obtained solution was used as nonaqueous electrolytic solution 2.

The concentrations of LiN (SO$_2$F)$_2$ and LiPF$_6$ in the prepared nonaqueous electrolytic solution 2 were 0.9 mol/L and 0.3 mol/L, respectively.

<Production of Nonaqueous Lithium Power Storage Element>

The obtained positive electrode precursor 13 and negative electrode 12 were used to produce a plurality of nonaqueous lithium power storage elements under the conditions described below.

[Assembly]

The obtained double-sided negative electrode 12 and double-sided positive electrode precursor 13 were cut to 10 cm×10 cm (100 cm$^2$). Using single-sided positive electrode precursors 13 for the uppermost side and lowermost side, 21 double-sided negative electrodes 12, and 20 double-sided positive electrode precursors 13, they were stacked, sandwiching microporous film separators each with a thickness of 15 μm between the negative electrodes 12 and positive electrode precursors 13. Next, a negative electrode terminal and positive electrode terminal were connected to the negative electrodes 12 and positive electrode precursors 13, respectively, by ultrasonic welding to obtain an electrode laminated body. The electrode laminated body was housed in a casing composed of an aluminum laminate package material, and the 3 sides of the casing at the electrode terminal section and bottom section were heat sealed under conditions with a temperature of 180° C., a seal time of 20 sec and a seal pressure of 1.0 MPa, and vacuum dried under conditions with a temperature of 80° C., a pressure of 50 Pa and a drying time of 60 hr.

[Filling, Impregnation and Sealing Step]

Approximately 80 g of the nonaqueous electrolytic solution 2 was injected into the electrode laminated body housed in the aluminum laminate package material, in a dry air environment at atmospheric pressure, a temperature of 25° C. and a dew point of no higher than −40° C. Next, the package material was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure of the package material was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution by this procedure.

Next, the aluminum laminate package material containing the electrode laminated body impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and fabricate a nonaqueous lithium power storage element.

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 25° C. with a current value of 50 mA until reaching a voltage of 4.0 V, followed by constant-voltage charge at 4.0 V continued for 120 hours, for lithium doping of the negative electrode.

[Aging Step]

The lithium-doped nonaqueous lithium power storage element was subjected to a constant-current/constant-voltage charge step, with constant-current discharge in a 25° C. environment at 100 mA until reaching a voltage of 2.0 V, followed by constant-current charge at 100 mA until reaching a voltage of 4.0 V, and further constant-current discharge at 4.0 V for 48 hours.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

<Evaluation of Nonaqueous Lithium Power Storage Elements>

One of the obtained nonaqueous lithium power storage elements was subjected to [Electrostatic capacitance and Ra measurement] and [High-load charge/discharge cycle test], as described below. The remaining nonaqueous lithium power storage element was used to carry out [Quantitation of lithium compound in positive electrode] and [Quantitation of compounds in positive electrode active material layer], below.

[Measurement of Electrostatic Capacitance and Ra]

Each of the obtained nonaqueous lithium power storage elements was used in the method described above in a thermostatic bath set to 25° C., using a charge/discharge apparatus (5 V, 360 A) by Fujitsu Telecom Networks, Ltd., to calculate the electrostatic capacitance Fa and the internal resistance Ra at 25° C., and the energy density Wh/V$_i$ was obtained. The results are shown in Table 7.

[High-load Charge/Discharge Cycle Test]

Each of the obtained nonaqueous lithium power storage elements was used in the method described above in a thermostatic bath set to 25° C., using a charge/discharge apparatus (5 V, 360 A) by Fujitsu Telecom Networks, Ltd., for a high-load charge/discharge cycle test, the internal resistance Rb at ordinary temperature after the high-temperature storage test was measured, and Rb/Ra was obtained. The results are shown in Table 7.

[Quantitation of Lithium Compound in Positive Electrode]

The obtained nonaqueous lithium power storage element was disassembled in an argon box with a dew point temperature of −72° C., and the positive electrode coated on both sides with the positive electrode active material layer was cut out to a size of 10 cm×5 cm. The cut out positive electrode was immersed in 30 g of a diethyl carbonate solvent and was washed for 10 minutes while occasionally moving the positive electrode with a pincette. The positive electrode was then removed out and air-dried for 5 minutes in an argon box and immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

A positive electrode sample cut out to a size of 5 cm×5 cm was immersed in methanol, and the vessel was capped and allowed to stand for 3 days in an environment of 25° C. The positive electrode was then removed out and vacuum dried for 10 hours under conditions of 120° C., 5 kPa. The methanol solution after washing was measured by GC/MS under conditions with a pre-drawn calibration curve, and a diethyl carbonate abundance of less than 1% was confirmed. After then measuring the positive electrode weight $M_0$, the positive electrode sample was impregnated with distilled water, and the vessel was capped and allowed to stand for 3 days in an environment of 45° C. The positive electrode sample was then removed out and vacuum dried for 12 hours under conditions of 150° C., 3 kPa. The distilled water after washing was measured by GC/MS under conditions with a pre-drawn calibration curve, and a methanol abundance of less than 1% was confirmed. The positive electrode weight $M_1$ was then measured, a spatula, brush or bristles were used to remove the active material layer on the positive electrode power collector, and the weight $M_2$ of the positive electrode power collector was measured. The obtained $M_0$, $M_1$ and $M_2$ values were used to quantify the amount of lithium compound N (weight %) in the positive electrode, by the method described above. The results are shown in Table 7.

[Quantitation of Compounds of Formulas (1) to (3) in Positive Electrode Active Material Layer]

After adjusting the obtained nonaqueous lithium power storage element to 2.9 V, the nonaqueous lithium power storage element was disassembled in an argon (Ar) box set in a room at 23° C. and controlled to a dew point of no higher than −90° C. and an oxygen concentration of no greater than 1 ppm, and the positive electrode body was removed. The removed positive electrode body was immersed and rinsed in dimethyl carbonate (DMC), and then vacuum dried in a side box while maintaining a state of non-exposure to air.

The dried positive electrode was transferred from the side box to an Ar box while maintaining a state of non-exposure to air and was immersed and extracted in heavy water to obtain a positive electrode liquid extract. Analysis of the liquid extract was by (i) IC and (ii) $^1$H-NMR, and the abundance per unit weight of the positive electrode active material layer (mol/g) for each compound accumulated on the positive electrode body was determined by the following formula 13:

$$\text{Abundance per unit weight(mol/g)} = C \times D \div E \quad (13)$$

From the concentration of each compound in the positive electrode liquid extract C (mol/ml), the volume of heavy water used for extraction D (ml) and the weight of active material of the positive electrode active material layer used for extraction E (g).

The active material weight in the positive electrode active material layer used for extraction was determined by the following method. The mixture (positive electrode active material layer) was peeled off from the power collector of the positive electrode remaining after heavy water extraction, and the peeled mixture was rinsed with water and vacuum dried. The mixture obtained by vacuum drying was washed with NMP or DMF. Next, the obtained positive electrode active material layer was again vacuum dried and weighed to determine the weight of the positive electrode active material layer used for extraction.

The positive electrode liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and $^1$H NMR measurement was performed by the double tube method. The measurement results were normalized by the 7.1 ppm (m, 2H) signal of 1,2,4,5-tetrafluorobenzene, and the integral of each observed compound was calculated.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and $^1$H NMR measurement was performed by the double tube method. In the same manner as above, the measurement results were normalized by the 7.1 ppm (m, 2H) signal of 1,2,4,5-tetrafluorobenzene, and the integral of the 2.6 ppm (s, 6H) signal of dimethyl sulfoxide was calculated. The concentration C of each compound in the positive electrode liquid extract was determined based on the relationship between the dimethyl sulfoxide concentration used and the integral.

Assignment for the $^1$H NMR spectrum was as follows.
[For XOCH$_2$CH$_2$OX]
CH$_2$ in XOCH$_2$CH$_2$OX: 3.7 ppm (s, 4H)
CH$_3$OX: 3.3 ppm (s, 3H)
CH$_3$ in CH$_3$CH$_2$OX: 1.2 ppm (t, 3H)
CH$_2$O in CH$_3$CH$_2$OX: 3.7 ppm (q, 2H)

As mentioned above, the signal for CH$_2$ in XOCH$_2$CH$_2$OX (3.7 ppm) overlaps with the signal of CH$_2$O in CH$_3$CH$_2$OX (3.7 ppm), and therefore the amount of XOCH$_2$CH$_2$OX was calculated by excluding the portion corresponding to CH$_2$O in CH$_3$CH$_2$OX calculated from the signal for CH$_3$ in CH$_3$CH$_2$OX (1.2 ppm).

Here, X is —(COO)$_n$Li or —(COO)$_n$R$^1$ (where n is 0 or 1, and R$^1$ is an alkyl group of 1 to 4 carbon atoms or a halogenated alkyl group of 1 to 4 carbon atoms).

The amount of each of the compounds of formulas (1) to (3) in the positive electrode active material layer was calculated from the concentration of each compound in the liquid extract determined by the aforementioned analyses (i) and (ii), and also the volume of the heavy water used for extraction and the weight of the positive electrode active material layer used for extraction. The results are shown in Table 7.

Examples 56 and 57

<Production of Negative Electrode>

After mixing 65 parts by weight of silicon microparticles with a mean particle diameter of 0.2 μm, 15 parts by weight of Ketchen black, 20 parts by weight of a polyimide binder and NMP (N-methylpyrrolidone), the mixture was dispersed using a FILMIX® thin-film spinning high-speed mixer by PRIMIX Corp., under conditions with a circumferential speed of 15 m/s, to obtain a coating solution. A negative electrode was produced in the same manner as Example 55, except that this coating solution was used, and the film thickness per side of the negative electrode active material layer was adjusted to the values listed in Table 7.

<Production and Evaluation of Nonaqueous Lithium Power Storage Element>

A nonaqueous lithium power storage element was produced and evaluated in the same manner as Example 55, except that the positive electrode precursor was produced in the same manner as Example 55 but with the positive electrode active material, lithium compound and parts by weight listed in Table 7 and was combined with the negative electrode obtained as described above. The results are shown in Table 7.

Examples 58 to 68, 71 and 72

<Production of Negative Electrode>

A negative electrode was produced in the same manner as Example 55, except that the negative electrode active materials and the film thicknesses on each side of the negative electrode active material layers were as shown in Table 7.

<Production and Evaluation of Nonaqueous Lithium Power Storage Element>

A nonaqueous lithium power storage element was produced and evaluated in the same manner as Example 55, except that the positive electrode precursor was produced in the same manner as Example 55 but with the positive electrode active material, lithium compound and parts by weight listed in Table 7 and was combined with the negative electrode obtained as described above. The results are shown in Table 7.

Example 69

A nonaqueous lithium power storage element was produced and evaluated in the same manner as Example 64, except the aging step described below was carried out. The results are shown in Table 7.

[Aging Step]

The lithium-doped nonaqueous lithium power storage element was subjected to a constant-current/constant-voltage charge step, with constant-current discharge in a 0° C. environment at 100 mA until reaching a voltage of 2.0 V, followed by constant-current charge at 100 mA until reaching a voltage of 4.0 V, and further constant-current discharge at 4.0 V for 10 hours.

Example 70

A nonaqueous lithium power storage element was produced and evaluated in the same manner as Example 64, except the aging step described below was carried out. The results are shown in Table 7.

[Aging Step]

The lithium-doped nonaqueous lithium power storage element was subjected to a constant-current/constant-voltage charge step, with constant-current discharge in a 75° C. environment at 100 mA until reaching a voltage of 2.0 V, followed by constant-current charge at 100 mA until reaching a voltage of 4.0 V, and further constant-current discharge at 4.0 V for 120 hours.

Comparative Example 64

<Production of Positive Electrode Precursor>

After mixing 87.5 parts by weight of activated carbon 2, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX thin-film spinning high-speed mixer by PRIMIX Corp., under conditions with a circumferential speed of 17 m/s, to obtain a coating solution. A positive electrode precursor was obtained in the same manner as Example 55, except for using the coating solution obtained above.

<Production of Negative Electrode>

A negative electrode was produced in the same manner as Example 55, except that the negative electrode active material and the film thickness on each side of the negative electrode active material layers were as shown in Table 7.

<Production and Evaluation of Nonaqueous Lithium Power Storage Element>

Assembly, filling, impregnation and sealing of a nonaqueous lithium power storage element were carried out in the same manner as Example 55, except for using the obtained positive electrode precursor, and the negative electrode comprising a metal lithium foil corresponding to 1300 mAh/g per unit weight of the negative electrode active material, attached to the front side of the first negative electrode active material layer.

Next, as the lithium doping step, the obtained nonaqueous lithium power storage element was stored for 120 hours in a thermostatic bath with an environmental temperature of 45° C., for ionization of the metal lithium and doping in the negative electrode. The obtained nonaqueous lithium power storage element was produced and evaluated as a nonaqueous lithium power storage element in the same manner as Example 55. The results are shown in Table 7.

Comparative Example 65

A nonaqueous lithium power storage element was produced and evaluated in the same manner as Comparative Example 64, except for using a composite material 2 as the negative electrode active material, and using a negative electrode comprising a metal lithium foil corresponding to 750 mAh/g per unit weight of the negative electrode active material, attached to the negative electrode active material layer surface. The results are shown in Table 7.

Comparative Example 66

<Production of Positive Electrode Precursor>

A positive electrode precursor was produced in the same manner as Example 55, except that the positive electrode active material and lithium compound, and their parts by weight, were as shown in Table 7.

<Production of Negative Electrode>

After mixing 80 parts by weight of artificial graphite with a mean particle diameter of 5.2 µm, 5 parts by weight of Ketchen black, 15 parts by weight of PVdF (polyvinylidene fluoride) and NMP (N-methylpyrrolidone), the mixture was dispersed using a FILMIX thin-film spinning high-speed mixer by PRIMIX Corp., under conditions with a circumferential speed of 15 m/s, to obtain a coating solution. A negative electrode was produced in the same manner as Example 55, except that this coating solution was used, and the film thickness per side of the negative electrode active material layer was adjusted as shown in Table 7.

<Production and Evaluation of Nonaqueous Lithium Power Storage Element>

A nonaqueous lithium power storage element was produced and evaluated in the same manner as Example 55, except for using the combination of positive electrode precursor and negative electrode shown in Table 7. The results are shown in Table 7.

Comparative Example 67

A nonaqueous lithium power storage element was produced and evaluated in the same manner as Comparative Example 66, except for using natural graphite with a mean particle diameter of 7.1 μm. The results are shown in Table 7.

The results are summarized in Table 7 below.

TABLE 7

| | Positive electrode precursor | | | | Negative electrode | | Positive electrode | | Properties of nonaqueous lithium power storage elements | |
|---|---|---|---|---|---|---|---|---|---|---|
| | Positive electrode active material | Lithium compound | Positive electrode active material (parts by weight) | Lithium compound (parts by weight) | Negative electrode active material | Film thickness of negative electrode active material layer per side (μm) | Amount of lithium compound N (wt %) | Total amount of compounds of formulas (1) to (3) ($\times 10^{-4}$ mol/g) | $Wh/V_i$ (Wh/L) | $Rd/Ra$ |
| Example 55 | Activated carbon 1 | Lithium carbonate | 62.5 | 25 | Silicon | 10 | 8.2 | 161.2 | 33 | 1.46 |
| Example 56 | Activated carbon 2 | Lithium carbonate | 62.5 | 25 | Silicon microparticles | 0.5 | 17.3 | 142.1 | 46 | 1.81 |
| Example 57 | Activated carbon 2 | Lithium carbonate | 62.5 | 25 | Silicon microparticles | 1 | 14.1 | 171.2 | 45 | 1.72 |
| Example 58 | Activated carbon 2 | Lithium carbonate | 62.5 | 25 | Silicon | 10 | 7.8 | 153.1 | 40 | 1.42 |
| Example 59 | Activated carbon 2 | Lithium carbonate | 62.5 | 25 | Silicon | 25 | 3.2 | 182.3 | 36 | 1.62 |
| Example 60 | Activated carbon 2 | Lithium carbonate | 62.5 | 25 | Silicon | 35 | 0.8 | 328.2 | 32 | 1.75 |
| Example 61 | Activated carbon 2 | Lithium carbonate | 62.5 | 25 | Tin | 10 | 14.2 | 174.4 | 39 | 1.55 |
| Example 62 | Activated carbon 2 | Lithium carbonate | 62.5 | 25 | Tin dioxide | 10 | 17.7 | 146.2 | 38 | 1.52 |
| Example 63 | Activated carbon 2 | Lithium carbonate | 62.5 | 25 | Composite material 1 | 10 | 9.2 | 163.2 | 40 | 1.36 |
| Example 64 | Activated carbon 2 | Lithium carbonate | 62.5 | 25 | Composite material 2 | 10 | 12.4 | 144.3 | 40 | 1.21 |
| Example 65 | Activated carbon 2 | Lithium oxide | 62.5 | 25 | Composite material 2 | 10 | 13.8 | 146.3 | 40 | 1.20 |
| Example 66 | Activated carbon 2 | Lithium hydroxide | 62.5 | 25 | Composite material 2 | 10 | 11.8 | 148.2 | 40 | 1.22 |
| Example 67 | Activated carbon 2 | Lithium carbonate | 72.5 | 15 | Composite material 2 | 10 | 2.1 | 163.8 | 40 | 1.68 |
| Example 68 | Activated carbon 2 | Lithium carbonate | 29.5 | 58 | Composite material 2 | 10 | 42.1 | 159.4 | 39 | 1.71 |
| Example 69 | Activated carbon 2 | Lithium carbonate | 62.5 | 25 | Composite material 2 | 10 | 15.6 | 3.4 | 40 | 1.38 |
| Example 70 | Activated carbon 2 | Lithium carbonate | 62.5 | 25 | Composite material 2 | 10 | 10.5 | 291.2 | 40 | 1.36 |
| Example 71 | Activated carbon 2 | Lithium carbonate | 62.5 | 25 | Composite material 3 | 10 | 16.3 | 146.3 | 39 | 1.49 |
| Example 72 | Activated carbon 2 | Lithium carbonate | 62.5 | 25 | Composite material 4 | 10 | 18.9 | 155.7 | 38 | 1.45 |
| Comp. Example 64 | Activated carbon 2 | None | 87.5 | — | Silicon | 10 | 0 | 0.9 | 40 | 11.2 |
| Comp. Example 65 | Activated carbon 2 | None | 87.5 | — | Composite material 2 | 10 | 0 | 1.1 | 40 | 8.93 |
| Comp. Example 66 | Activated carbon 2 | Lithium carbonate | 62.5 | 25 | Artificial graphite | 10 | 19.1 | 115.3 | 13 | 2.27 |
| Comp. Example 67 | Activated carbon 2 | Lithium carbonate | 62.5 | 25 | Natural graphite | 10 | 18.3 | 120.4 | 14 | 4.27 |

From Examples 55 to 72 and Comparative Examples 64 to 67 it is seen that, when the positive electrode active material layer has a lithium compound other than the positive electrode active material and the negative electrode active material comprises an alloy-type negative electrode material that forms an alloy with lithium, such as silicon, the high-load charge/discharge cycle characteristic can be improved and both high energy density and a high-load charge/discharge cycle characteristic can be obtained, even if the film thickness of the negative electrode active material layer is small.

INDUSTRIAL APPLICABILITY

With the nonaqueous lithium power storage element of the invention, a plurality of nonaqueous lithium power storage elements may be connected in series or in parallel to create a power storage module, for example. The nonaqueous lithium power storage element and power storage module of the invention may be suitably utilized in a power regenerating system of an automobile hybrid drive system, a power load-leveling system for natural power generation such as solar power generation or wind power generation, or in a microgrid, an uninterruptable power source system for factory production equipment or the like, a non-contact power supply system designed for leveling of voltage fluctuation in microwave power transmission or electrolytic resonance, or energy storage, or an energy harvesting system designed for utilization of electric power generated by vibration or the like, which are purposes that require a high-load charge/discharge cycle characteristic.

The nonaqueous lithium power storage element of the invention is preferably applied in a lithium ion capacitor or lithium ion secondary battery, for example, where the effect of the invention will be maximally exhibited.

EXPLANATION OF SYMBOLS

1 Positive electrode active material layer $C_x$ side
2 Positive electrode active material layer $C_y$ side
3 Positive electrode power collector
4 Negative electrode active material layer $A_x$ side
5 Negative electrode active material layer $A_y$ side
6 Negative electrode power collector
7 Separator
8 Electrode laminated body
9 Casing
10 Negative electrode active material layer $A_w$ side 11 Negative electrode active material layer $A_z$ side
12 Positive electrode active material layer $C_z$ side

The invention claimed is:
1. A nonaqueous lithium power storage element comprising:
   at least one positive electrode that contains a lithium compound other than an active material;
   at least one negative electrode;
   a separator; and
   a lithium ion-containing nonaqueous electrolytic solution;
   wherein the active material is coated onto both sides of a nonporous positive electrode power collector of the positive electrode,
   a negative electrode active material capable of intercalating and releasing lithium ions is coated onto both sides of a nonporous negative electrode power collector of the negative electrode,
   $C_{x1}/C_{y1}$ is 0.85 to 1.15, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side),
   $A_{x1}/A_{y1}$ is 0.85 to 1.15, and $(A_{x1}+C_{x1})/(A_{y1}+C_{y1})$ is 0.80 to 1.20, where $A_{y1}$ (g/m$^2$) is the basis weight of the negative electrode active material layer of one side ($A_y$ side) of the negative electrode that is facing the $C_y$ side, and $A_{x1}$ (g/m$^2$) is the basis weight of the negative electrode active material layer on the other side ($A_x$ side),
   $C_{x2}$ and $C_{y2}$ are each 0.1 to 18, and $C_{y2}/C_{x2}$ and $C_{x2}/C_{y2}$ are each 0.60 to 1.70, where $C_{x2}$ (g/m$^2$) is an amount of the lithium compound per area on the $C_x$ side and $C_{y2}$ (g/m$^2$) is an amount of the lithium compound per area on the $C_y$ side,
   the lithium compound is lithium carbonate, and
   $S_x$ and $S_y$ are each 1% to 40% and $S_x/S_y$ is 0.5 to 1.5, where $S_x$ (%) is an area ratio (%) of carbonate ion mapping of the $C_x$ side in an image obtained by microscopic Raman spectroscopy of the $C_x$ side, and $S_y$ (%) is an area ratio (%) of carbonate ion mapping of the $C_y$ side in an image obtained by microscopic Raman spectroscopy of the Cy side,
   the nonaqueous lithium power storage element contains an electrode laminated body or wound electrode comprising the at least one positive electrode and the at least one negative electrode either laminated or wound via the separator,
   the electrode laminated body or wound electrode contains the negative electrode as at least one outermost layer having a negative electrode active material layer $A_w$ side that does not face the positive electrode, and
   $A_{w1}/A_{z1}$ is 0.01 to 0.45, where $A_{w1}$ (mol/m$^2$) is the amount of lithium ion per area on the $A_w$ side, the $A_z$ side is the negative electrode active material layer on the back side of the $A_w$ side, and $A_{z1}$ (mol/m$^2$) is the amount of lithium ion per area on the $A_z$ side.
2. The nonaqueous lithium power storage element according to claim 1, wherein $(C_{x1}+C_{x2}+A_{y1})/(C_{y1}+C_{y2}+A_{x1})$ is 0.70 to 1.30.
3. The nonaqueous lithium power storage element according to claim 1, wherein $(C_{x1}+C_{x2}+A_{y1})/(C_{y1}+C_{y2}+A_{x1})$ is 0.80 to 1.20.
4. The nonaqueous lithium power storage element according to claim 1, wherein
   the positive electrode contains one or more compounds selected from the group consisting of compounds represented by the following formulas (1) to (3):

$$LiX^1—OR^1O—X^2Li \tag{1}$$

where $R^1$ is an alkylene group of 1 to 4 carbon atoms or a halogenated alkylene group of 1 to 4 carbon atoms, and $X^1$ and $X^2$ are each independently —(COO)$_n$ (where n is 0 or 1),

$$LiX^1—OR^1O—X^2R^2 \tag{2}$$

where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ are each independently —(COO)$_n$ (where n is 0 or 1), and

$$R^2X^1—OR^1O—X^2R^3 \tag{3}$$

where $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ are each independently —(COO)$_n$ (where n is 0 or 1),
   at $1.60 \times 10^{-4}$ mol/g to $300 \times 10^{-4}$ mol/g per unit weight of the positive electrode active material layer.
5. The nonaqueous lithium power storage element according to claim 4, wherein
   $C_{y3}$ is $1.60 \times 10^{-4}$ to $300 \times 10^{-4}$, where $C_{y3}$ (mol/g) is the content of compounds represented by formulas (1) to (3) per unit weight of the $C_y$ side.
6. The nonaqueous lithium power storage element according to claim 5, wherein
   $C_{y3}/A_{y3}$ is 0.2 to 20, where $A_{y3}$ (mol/g) is the content of the compound represented by formulas (1) to (3) on the $A_y$ side.
7. The nonaqueous lithium power storage element according to claim 1, wherein the amount of active material $C_{z1}$ (g/m$^2$) per area on the $C_z$ side is 10 to 50, the amount of lithium compound $C_{z2}$ (g/m$^2$) per area on the $C_z$ side is 0.1 to 18.0, and $C_{z2}/C_{z1}$ is 0.03 to 0.5, where the $C_z$ side is the positive electrode active material layer facing the $A_z$ side.
8. The nonaqueous lithium power storage element according to claim 7, wherein
   the lithium compound is lithium carbonate, and
   in an image obtained by microscopic Raman spectroscopy of the $C_z$ side, $S_z$ is 1% to 40%, where $S_z$ (%) is the area ratio of carbonate ion mapping.
9. The nonaqueous lithium power storage element according to claim 7, wherein
   the $C_z$ side contains one or more compounds selected from the group consisting of compounds represented by the following formulas (1) to (3):

$$LiX^1—OR^1O—X^2Li \tag{1}$$

where $R^1$ is an alkylene group of 1 to 4 carbon atoms or a halogenated alkylene group of 1 to 4 carbon atoms, and $X^1$ and $X^2$ are each independently —(COO)$_n$ (where n is 0 or 1),

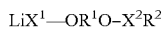
$$LiX^1—OR^1O-X^2R^2 \tag{2}$$

where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ are each independently —$(COO)_n$ (where n is 0 or 1), and

$$R^2X^1\text{—}OR^1O\text{—}X^2R^3 \qquad (3)$$

where $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ are each independently —$(COO)_n$ (where n is 0 or 1), and $C_{z3}$ is $1.60\times10^{-4}$ to $300\times10^{-4}$, where $C_{z3}$ (mol/g) is the content of the compound represented by formulas (1) to (3) per unit weight on the $C_z$ side.

10. The nonaqueous lithium power storage element according to claim 9, wherein $C_{z3}/A_{z3}$ is 0.2 to 20, where $A_{z3}$ (mol/g) is the content of the compound represented by formulas (1) to (3) per unit weight on the $A_z$ side of the negative electrode active material layer.

11. The nonaqueous lithium power storage element according to claim 1, wherein the ratio $A_{w2}/A_{z2}$, of the amount of negative electrode active material $A_{w2}$ (g/m$^2$) per area on the $A_w$ side and the amount of negative electrode active material $A_{z2}$ (g/m$^2$) per area on the $A_z$ side, is 0.85 to 1.15.

12. The nonaqueous lithium power storage element according to claim 1, wherein the lithium ion doping amount in the negative electrode active material is 530 mAh/g to 2,500 mAh/g per unit weight of the negative electrode active material.

13. The nonaqueous lithium power storage element according to claim 12, wherein the BET specific surface area of the negative electrode active material is 100 m$^2$/g to 1,500 m$^2$/g.

14. The nonaqueous lithium power storage element according to claim 1, wherein the lithium ion doping amount in the negative electrode active material is 50 mAh/g to 700 mAh/g per unit weight of the negative electrode active material.

15. The nonaqueous lithium power storage element according to claim 14, wherein the BET specific surface area of the negative electrode active material is 1 m$^2$/g to 50 m$^2$/g.

16. The nonaqueous lithium power storage element according to claim 1, wherein the mean particle diameter of the negative electrode active material is 1 μm to 10 μm.

17. The nonaqueous lithium power storage element according to claim 1, wherein
the positive electrode active material in the positive electrode active material layer contains activated carbon, and
the negative electrode active material contains an alloy-type negative electrode material that forms an alloy with lithium.

18. The nonaqueous lithium power storage element according to claim 17, wherein the alloy-type negative electrode material is one or more selected from the group consisting of silicon, silicon compounds, tin, tin compounds, and composite materials of these with carbon or carbonaceous materials.

19. The nonaqueous lithium power storage element according to claim 17, wherein the content ratio of the lithium compound in the positive electrode is 1 weight % to 50 weight % based on the total weight of the positive electrode active material layer.

20. The nonaqueous lithium power storage element according to claim 17, wherein the mean particle diameter of the lithium compound is 0.1 μm to 10 μm.

21. The nonaqueous lithium power storage element according to claim 17, wherein the thickness of the negative electrode active material layer is 1 μm to 30 μm for each side.

22. The nonaqueous lithium power storage element according to claim 17, wherein
Wh/Vi is 15 to 50, where Wh (Wh) is the electrical energy of the nonaqueous lithium power storage element and Vi (L) is the volume of the power storage element, and
for charge/discharge cycling of the nonaqueous lithium power storage element conducted 60,000 times at an environmental temperature of 25° C. and a rate of 300C, in a cell voltage range from 2.2 V to 3.8 V, Rb/Ra is 0.9 to 2.0, where Rb (Ω) is the internal resistance after the charge/discharge cycling and Ra (Ω) is the internal resistance before the charge/discharge cycling.

23. The nonaqueous lithium power storage element according to claim 17, wherein the activated carbon is activated carbon satisfying $0.3<V_1\leq0.8$ and $0.5\leq V_2\leq1.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

24. The nonaqueous lithium power storage element according to claim 17, wherein the activated carbon is activated carbon satisfying $0.8<V_1\leq2.5$ and $0.8<V_2\leq3.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 2,300 m$^2$/g to 4,000 m$^2$/g, as measured by the BET method.

25. A power storage module containing the nonaqueous lithium power storage element according to claim 1.

26. A power regenerating system containing the nonaqueous lithium power storage element according to claim 1.

27. A power load-leveling system containing the nonaqueous lithium power storage element according to claim 1.

28. An uninterruptable power source system containing the nonaqueous lithium power storage element according to claim 1.

29. A non-contact power supply system containing the nonaqueous lithium power storage element according to claim 1.

30. An energy harvesting system containing the nonaqueous lithium power storage element according to claim 1.

31. A power storage system containing the nonaqueous lithium power storage element according to claim 1.

* * * * *